United States Patent [19]

Caudel

[11] 3,938,094

[45] Feb. 10, 1976

[54] COMPUTING SYSTEM BUS

[75] Inventor: Edward R. Caudel, Houston, Tex.

[73] Assignee: Texas Instruments Incorporated, Dallas, Tex.

[22] Filed: Aug. 28, 1973

[21] Appl. No.: 392,405

Related U.S. Application Data

[63] Continuation of Ser. No. 176,670, Aug. 31, 1971, abandoned.

[52] U.S. Cl. .............. 340/172.5; 307/241; 307/279

[51] Int. Cl.[2] .......................................... G06F 13/00

[58] Field of Search .......... 307/241, 279; 340/172.5

[56] References Cited

UNITED STATES PATENTS

| | | | |
|---|---|---|---|
| 3,395,393 | 7/1968 | Githens | 340/172.5 |
| 3,411,139 | 11/1968 | Lynch et al. | 340/172.5 |
| 3,466,611 | 9/1969 | Weinberger | 340/172.5 |
| 3,553,541 | 1/1971 | King | 307/279 |
| 3,582,682 | 6/1971 | Carroll | 307/241 |

*Primary Examiner*—Leo H. Boudreau
*Attorney, Agent, or Firm*—Harold Levine; Edward J. Connors, Jr.; Stephen S. Sadacca

[57] ABSTRACT

A single parallel bus interconnects the various portions of a central processing unit. Data transmission between the various portions of the processor is based on sequential use of the common bus, and is synchronized by control circuitry. Circuit means are included for providing access of the various portions of the processor to the bus, and includes means for generating data on the bus for transmission, and for detecting data transmitted by the bus. To minimize access time to the bus whenever data is to be transmitted, means are provided for precharging the bus to a reference potential and then selectively discharging the bus to correspond to the data to be transmitted. In a different aspect of the invention a common bus is used to transmit data between the processor and computing equipment separate from the processor. In this aspect of the invention, circuitry is provided for detecting current on the bus corresponding to data, and for amplifying this current to a suitable level, and then generating a voltage suitable for transmission by the bus.

23 Claims, 55 Drawing Figures

*RAM
$\phi_1$
250a
250b
254
$\phi_1$
$V_{DD}$
BUSS
$\phi_2$
222
$\phi_1$
252
226
G
H
J
K
L
M
234
248
221
220a
220b N
236
P
R
S
T
U
V
W
X
Y
Z
AA
BB
CC
DD
EE
$A_i$
$B_i$
$C_i$
$D_i$
$E_i$
$H_i$
$L_i$
$M_i$
$PH_i$
$HS1_i$
$HS2_i$
$HS3_i$
$HS4_i$
$HS5_i$
$HS6_i$
$HS7_i$
$PL_i$
$LS1_i$
LS2
$LS3_i$
$LS4_i$
$LS5_i$
$LS6_i$
$LS7_i$
244
242
232
200
$\phi_2$
$V_{DD}$

CLOCKED INVERTER DETAIL

COUNTER DETAILS

STACK POINTER

REFRESH COUNTER

FLIP-FLOP LOGIC

CHIP SELECT SAMPLE AND HOLD

COMPUTING SYSTEM BUS

This is a continuation of application Ser. No. 176,670, filed Aug. 31, 1971.

The present invention pertains to computing systems in general, and more particularly to bus circuits for interconnecting various elements of a computing system.

Numerous combinations of CPU's and external memory are available in industry, respectively offering a variety of advantages such as size, speed, cost, etc. Recently it has become particularly advantageous, especially from a cost viewpoint, to utilize a memory circuit that includes predominantly insulated-gate-field-effect-transistor devices. For most applications the memory must be compatible with transistor-transistor-logic (TTL) circuits. Problems typically associated with such a memory system relate to speed of operation, flexibility of use, and general size, it being desirable to reduce the area of semiconductor material required for the systems. From a fabrication and reliability viewpoint, it is desirable to minimize the number of external interconnections between various chips in the system.

A particular problem relating to computing systems involves external bus circuits and techniques to read data from these buses and write data on them. The problem is compounded by the fact it is desirable to have the flexibility of adding additional memory units to the bus without adding more interface circuitry.

Additionally, in a computing system where the central processor unit is formed on a single chip and a common bus is utilized to interconnect the functional elements of the CPU, such as a parallel arithmetic logic unit, internal memory, instruction register, etc, the time required to generate signals on the bus must be minimized to optimize speed of operation. For such a system it would be advantageous to precharge the bus and selectively discharge it (since using insulated-gate-field-effect transistors, a capacitive load can be discharged much faster than it can be charged).

Accordingly, an object of the invention is to provide a computing system having an improved bus system.

A further object of the invention is to provide a circuit for sensing the current in the external bus and generating the voltage clock signals for sourcing the bus.

In accordance with the invention a computing system includes a central processing unit interconnected by a common external bus with a plurality of memory units. Circuitry is connected to the external bus for detecting the current output thereof and for generating a voltage input for the bus. In the preferred embodiment, the central processor of the computing system is formed on a single chip. The processor includes a parallel arithmetic logic unit, a random access memory that defines the data registers of the CPU, an instruction register and control circuitry. The functional elements of the CPU are interconnected by a common parallel bus. Operation of the CPU is based on sequential use of the internal bus.

In one aspect of the invention a circuit is provided for precharging the internal bus and selectively discharging its responsive to control signals from the various functional elements of the CPU. The discharge circuitry in essence forms logic OR circuits, the number of which having access to the bus may be varied according to design considerations. Any number of these OR circuits may be used in accordance with the invention.

The CPU operates on a two-phase clock system. As is common, the twophases have a slight interval between them. The precharge circuit operates during phase one of the clock, simultaneously charging up the bus and setting up the logic for selective discharge. Control logic means are provided to block discharge of the bus for the duration of the first phase of the clock. As soon as phase one of the clock terminates and returns to its most positive level (for positive logic systems), the bus is selectively discharged prior to phase two depending upon the logic of the input signals. This precharge technique has the advantage of increased speed of operation since access to the bus is extremely fast.

In a different aspect of the invention a circuit is provided for detecting the current output of the external bus during one phase and for generating a voltage signal thereon during the subsequent phase. The circuit, includes means for gating current onto the bus from a selectable data source during one phase. This current is sensed by a differential amplifier which sets a latch at the end of the first phase corresponding to the logic level of the current sensed. A logic gate receives the latch output and gates it during phase two of a clock signal. This signal is applied to an emitter follower transistor which is coupled to the bus. The emitter resistor of the transistor generates a voltage on the bus. This voltage is clocked into a selectable data source during phase two.

Other objects and advantages of the invention will be apparent upon reading the following detailed description of an illustrative embodiment of the invention in a computing system in conjunction with the drawings wherein.

FIG. **3*a*** is a block diagram illustrating the internal bus interface of the CPU.

FIG. **3*b*** is a logic diagram of the CPU illustrating internal bus interconnects to the various functional elements of the CPU.

FIG. **4*a*** is a schematic of a dynamic random access memory cell that may be used in the present invention.

Figure 4A:
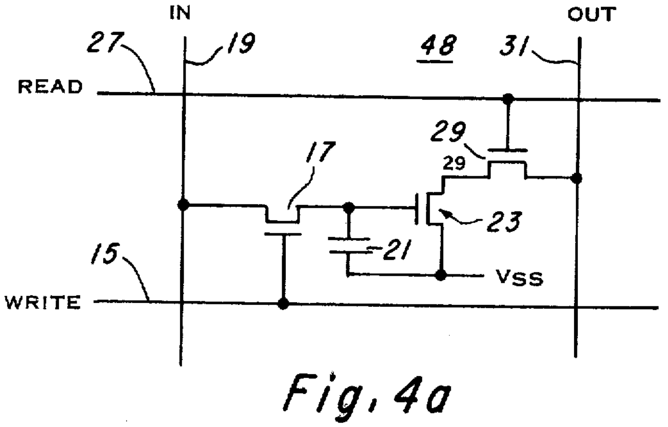

FIG. **4*b* is an integrated circuit layout of the dynamic random access memory cell of FIG. 4A.**

Figure 5:
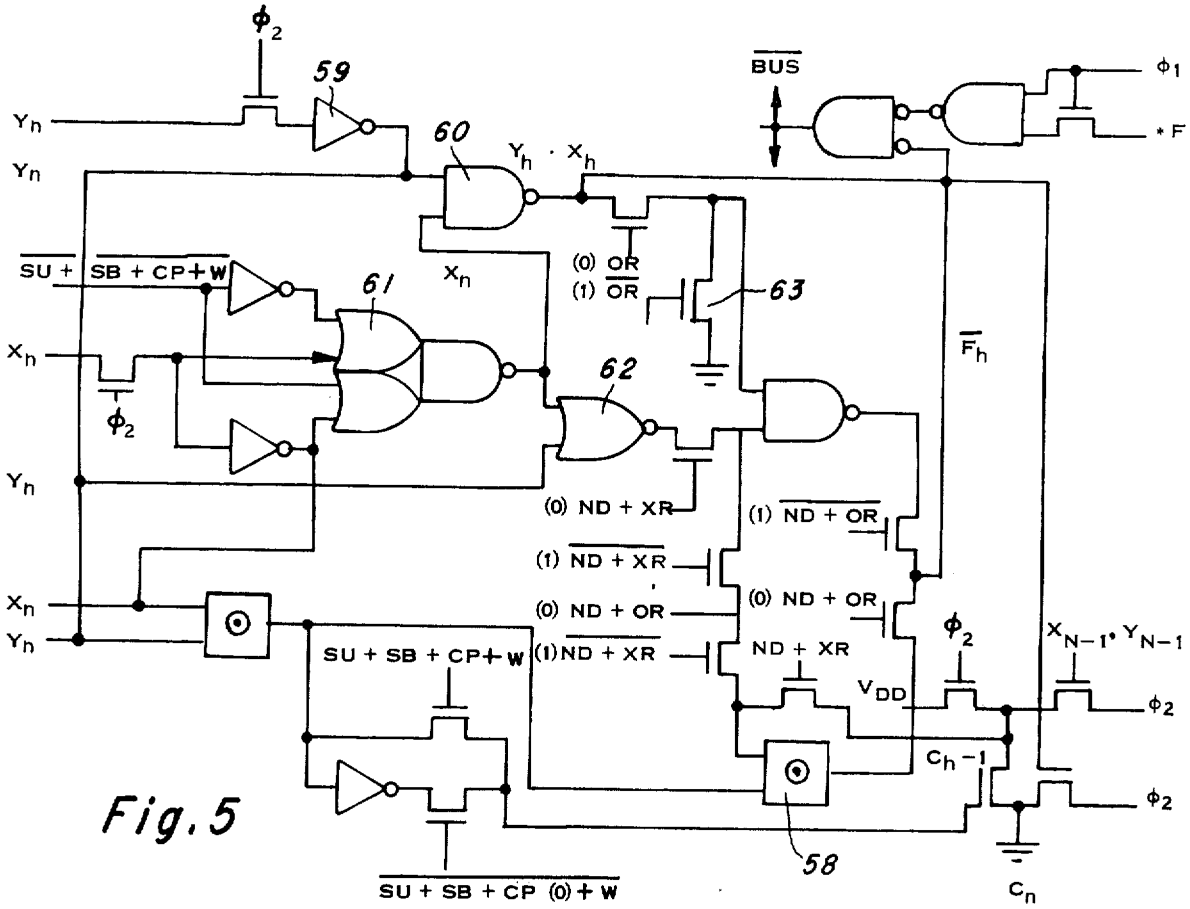

FIG. 5 is a logic diagram of one bit of the arithmetic logic unit of the single chip central processing unit of the present invention.

Figure 6:
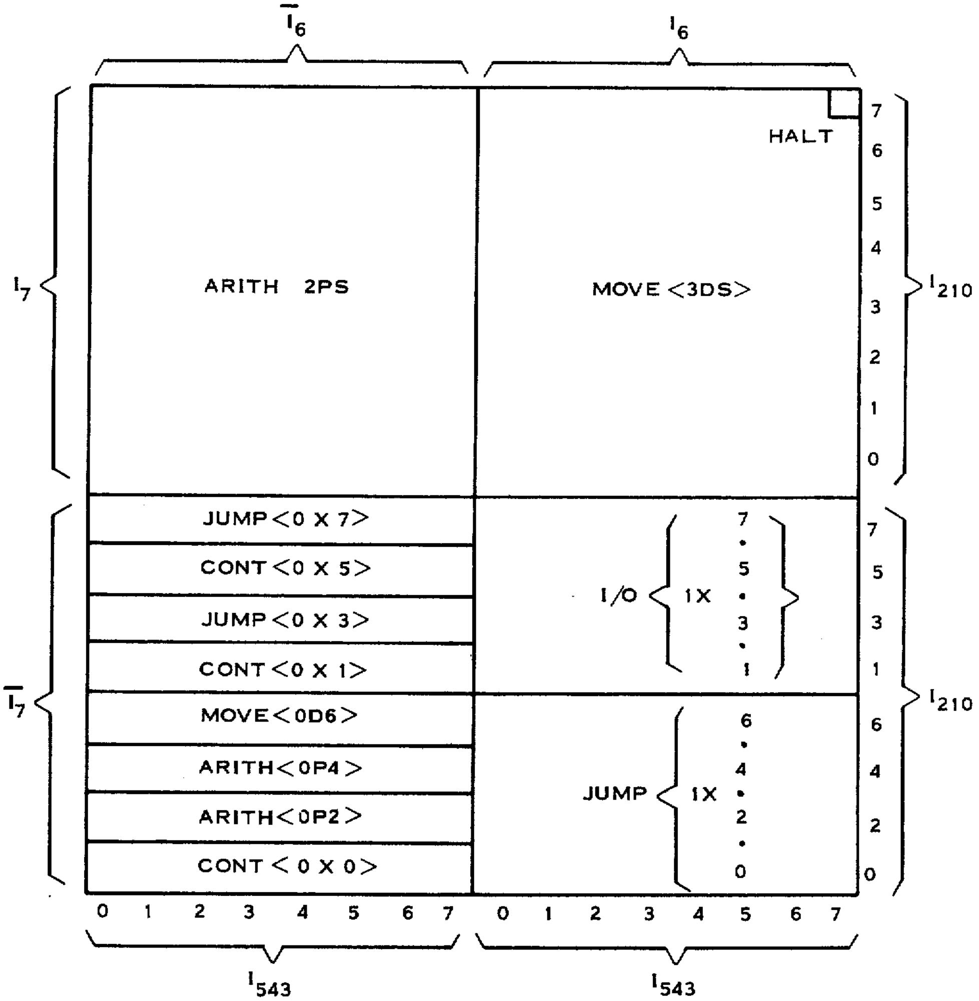

FIG. 6 is an instruction map of the various classes of instructions executed by the CPU in accordance with the present invention.

Figure 7:
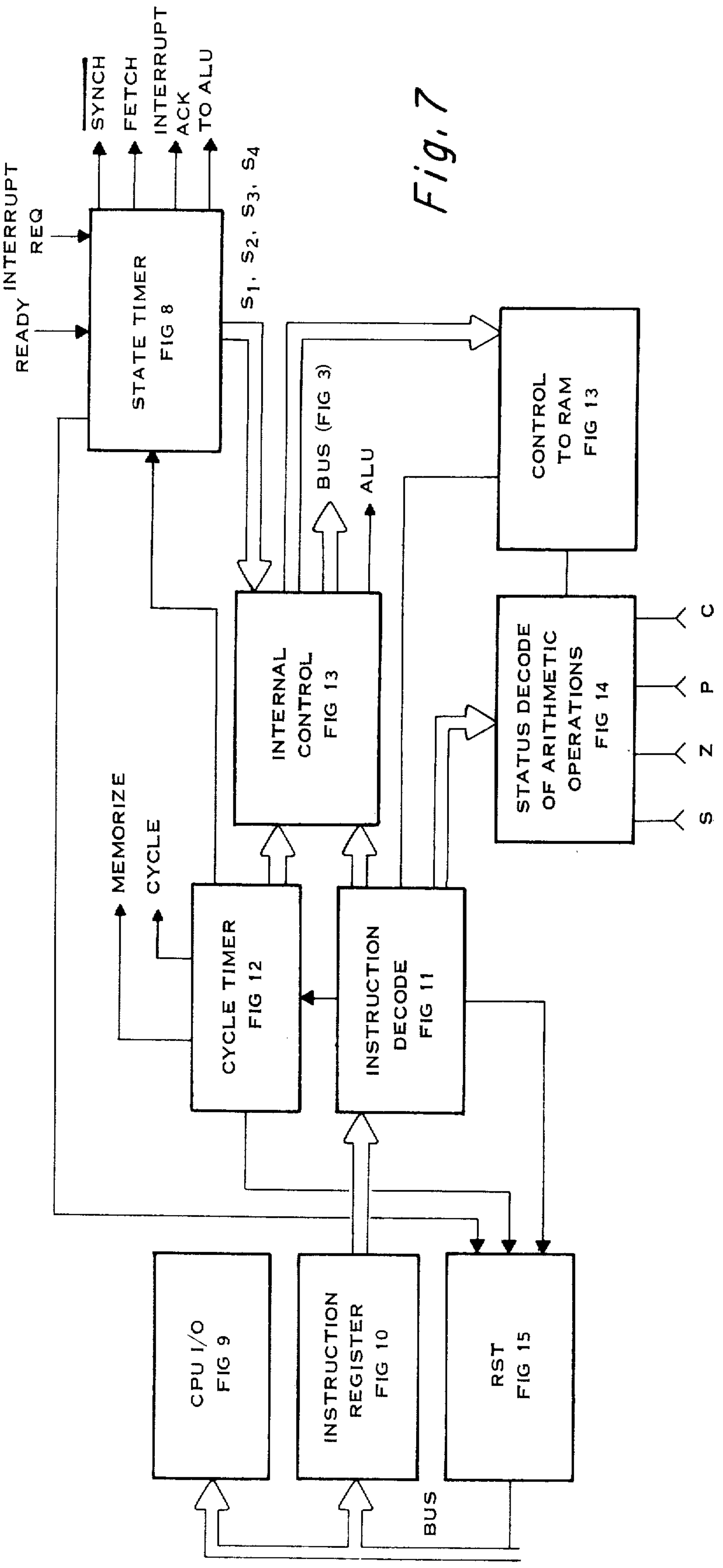

FIG. 7 is a functional block diagram of the CPU sequence and control.

Figure 8:
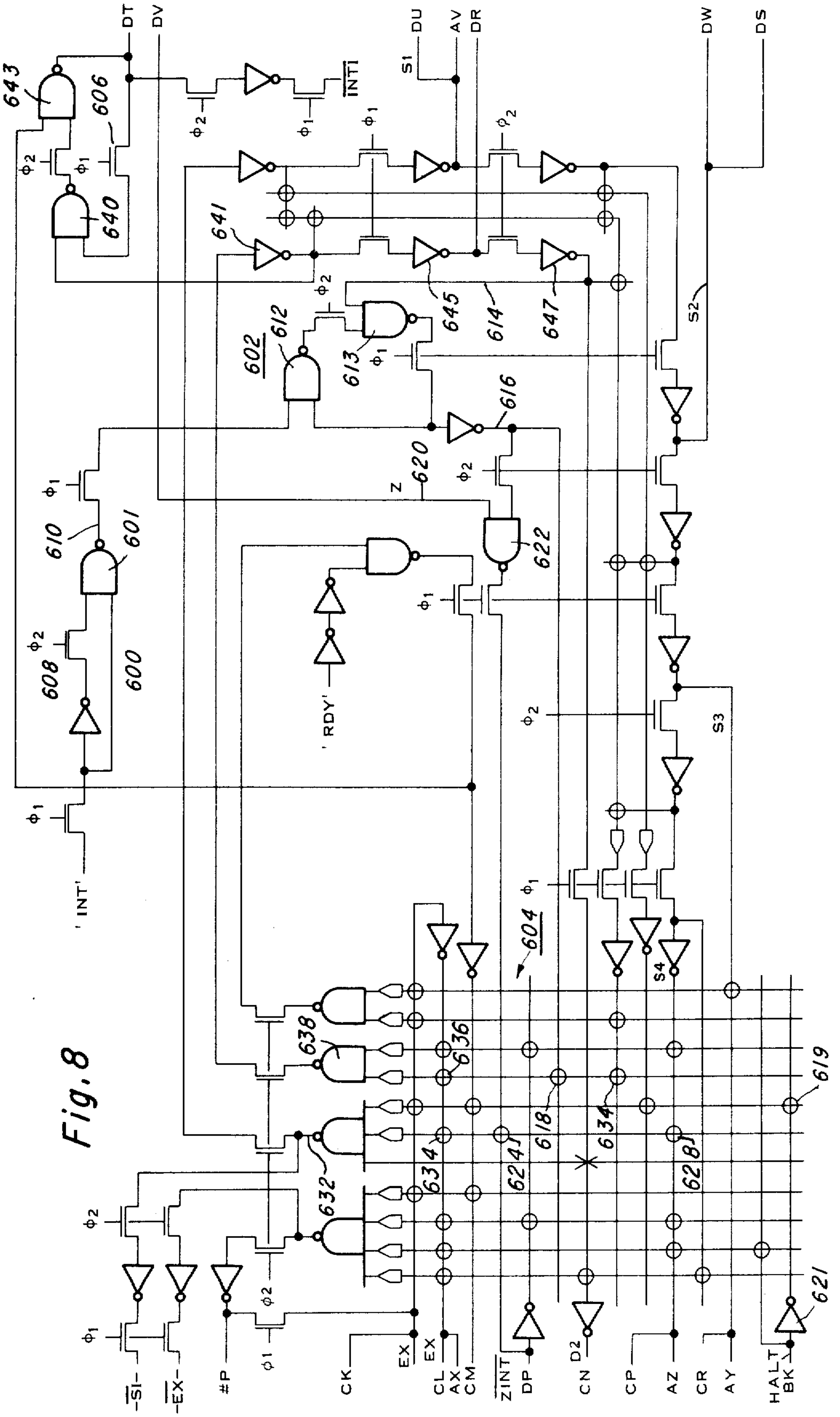

FIG. 8 is a logic diagram of a state timer circuit which may be used in the CPU sequence and control.

Figure 9:
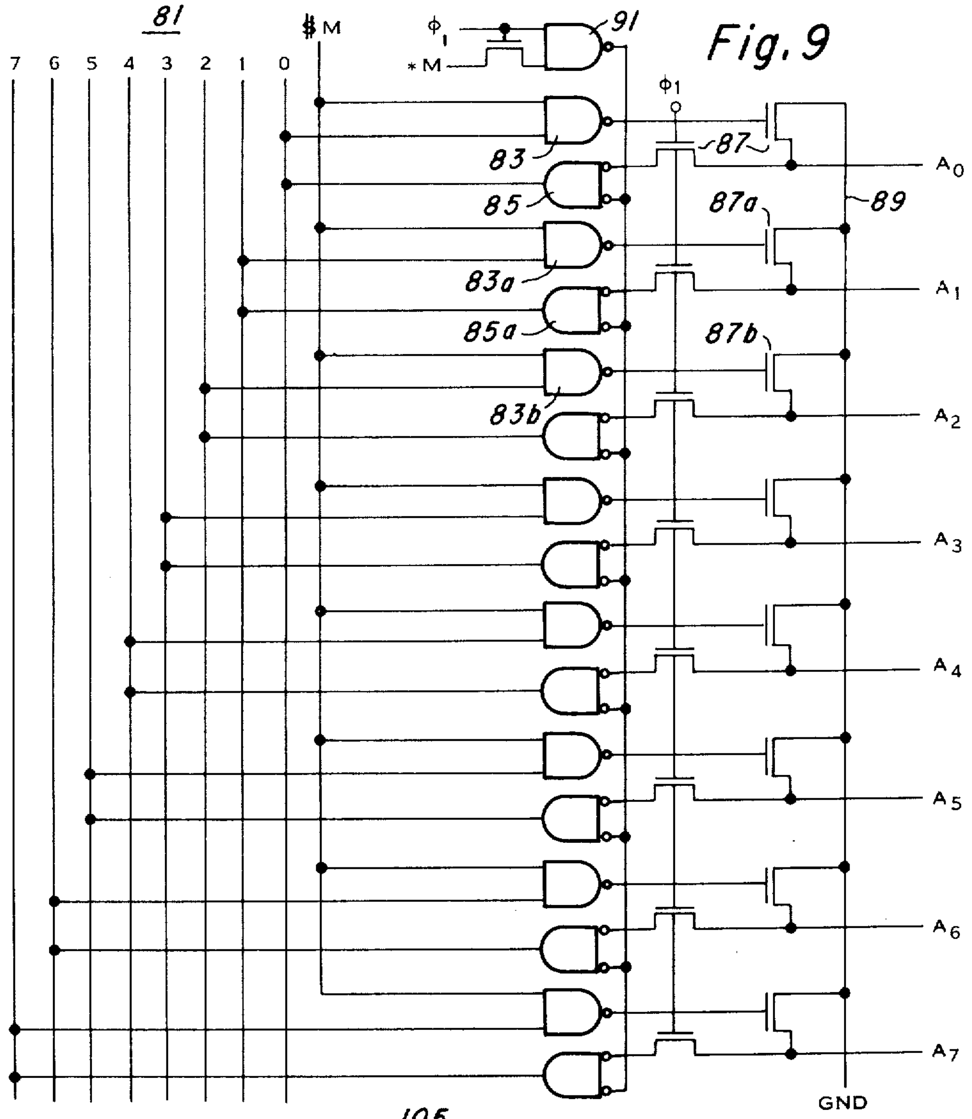

FIG. 9 is a logic circuit which may be used for the CPU input/output.

Figure 10:
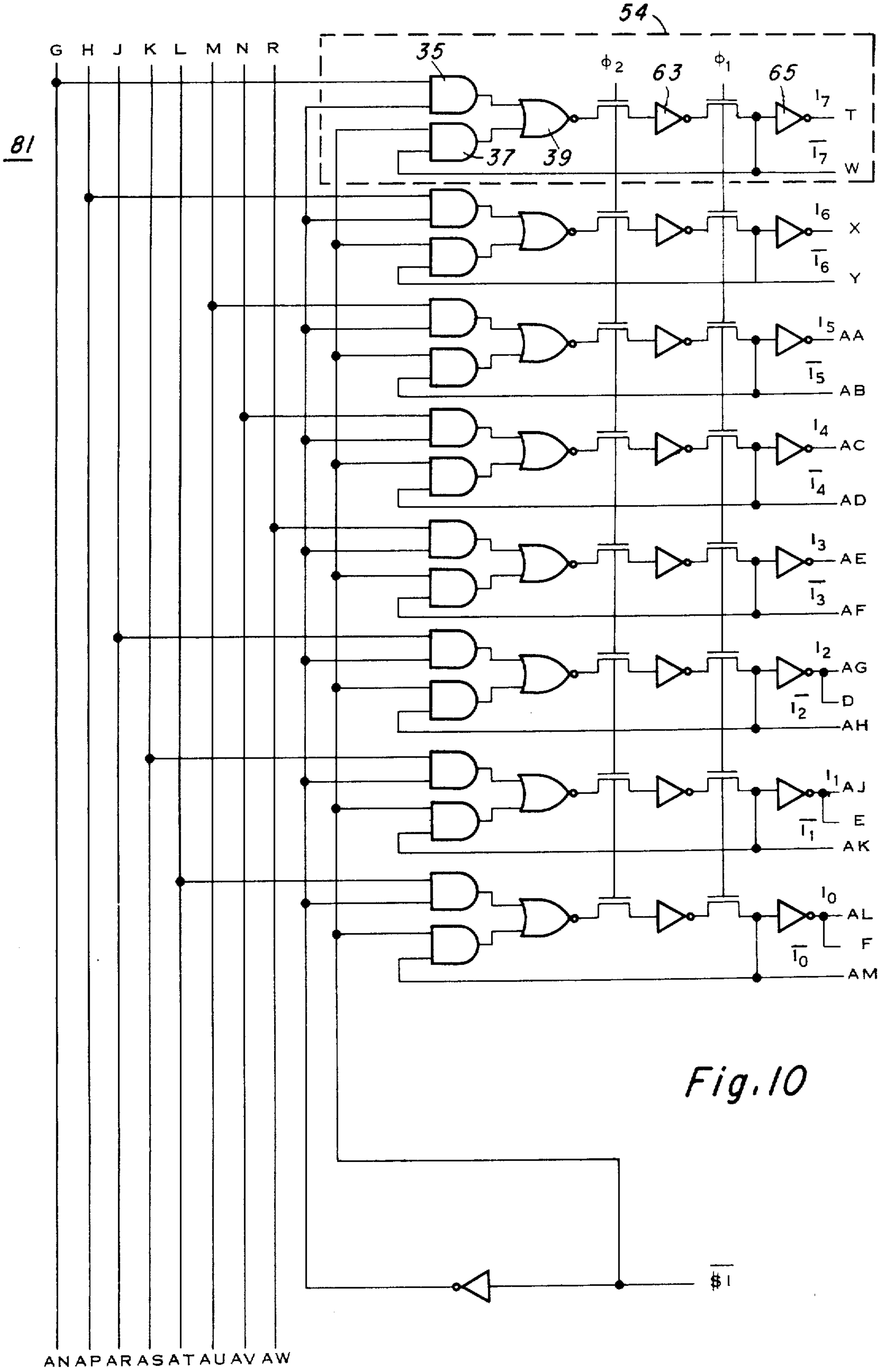

FIG. 10 is a logic diagram of the instruction register of the CPU of the present invention.

Figures 11, 13A:
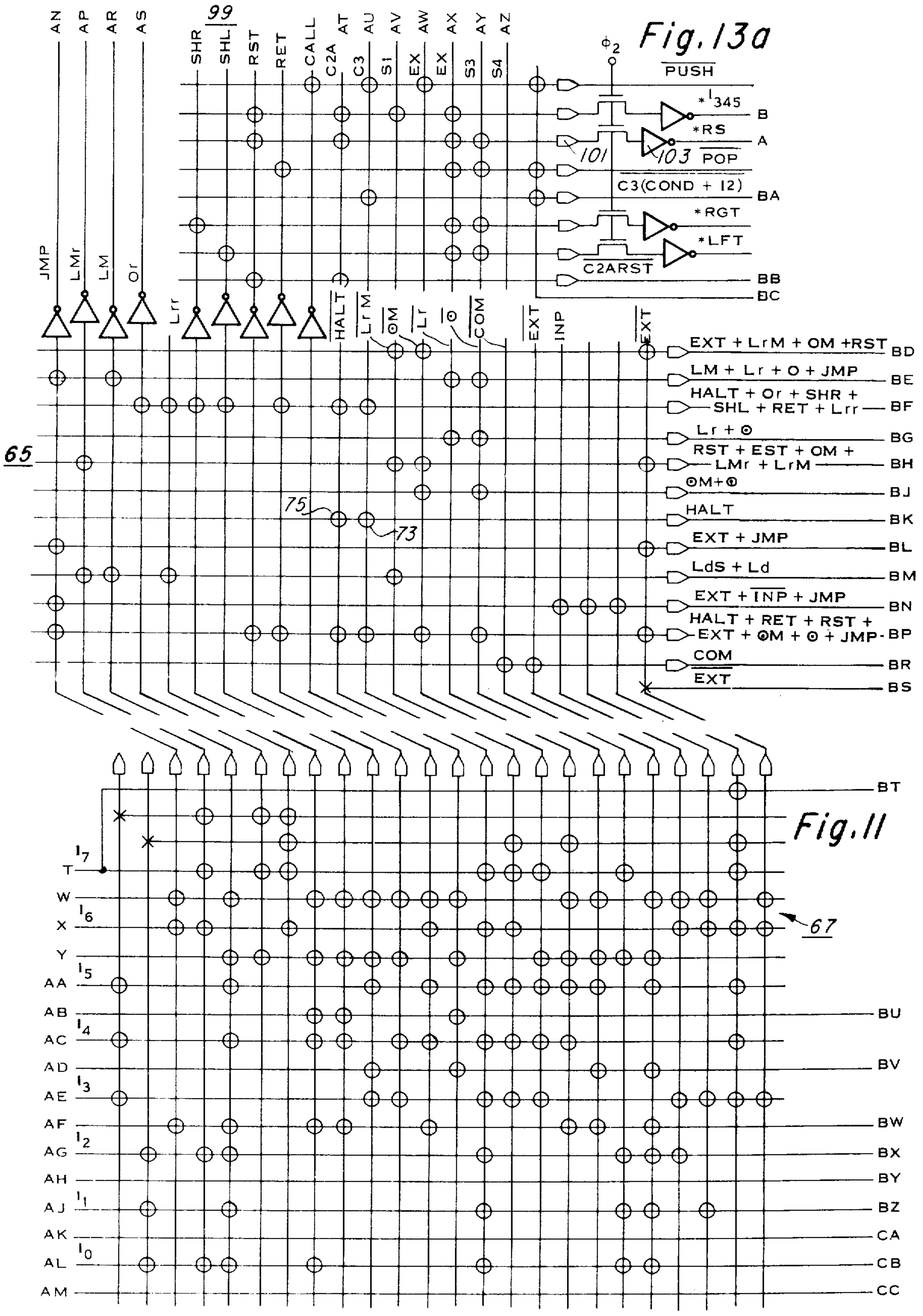

FIG. 11 illustrates the logic of the instruction decode portion of the CPU.

Figure 12:
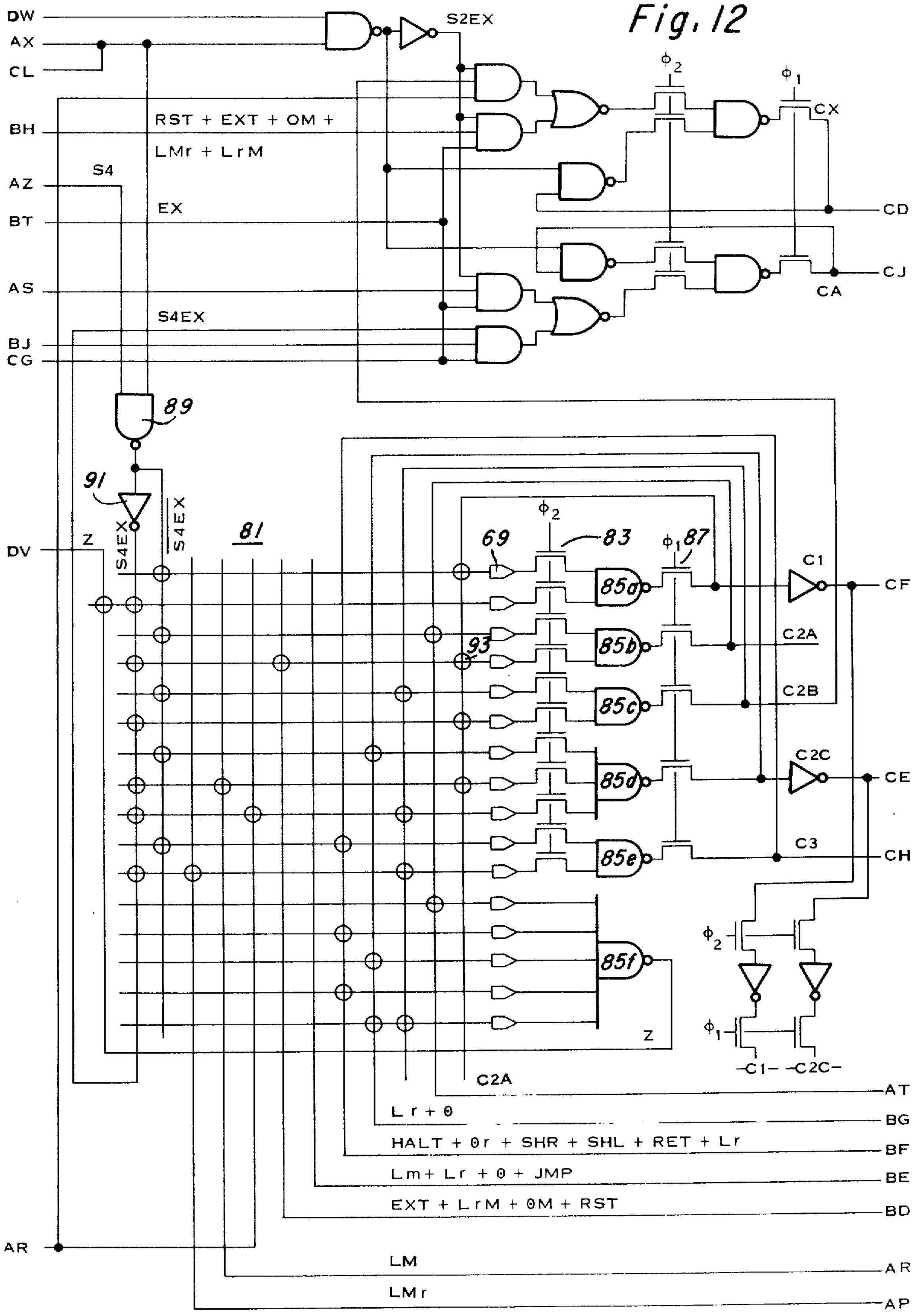

FIG. 12 is a logic diagram of the cycle timer shown in block form in FIG. 7.

Figure 13B:
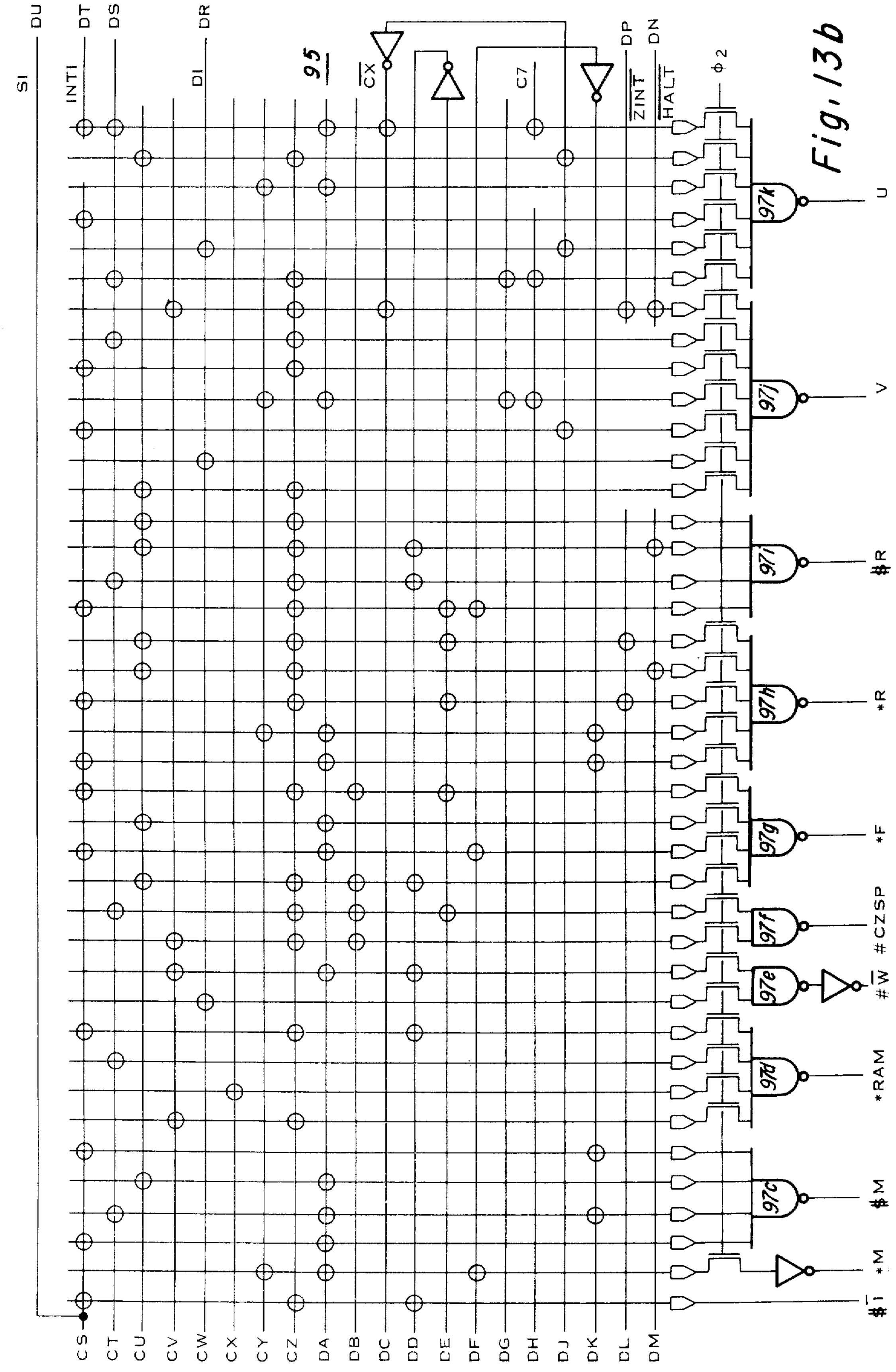
Figure 13C:
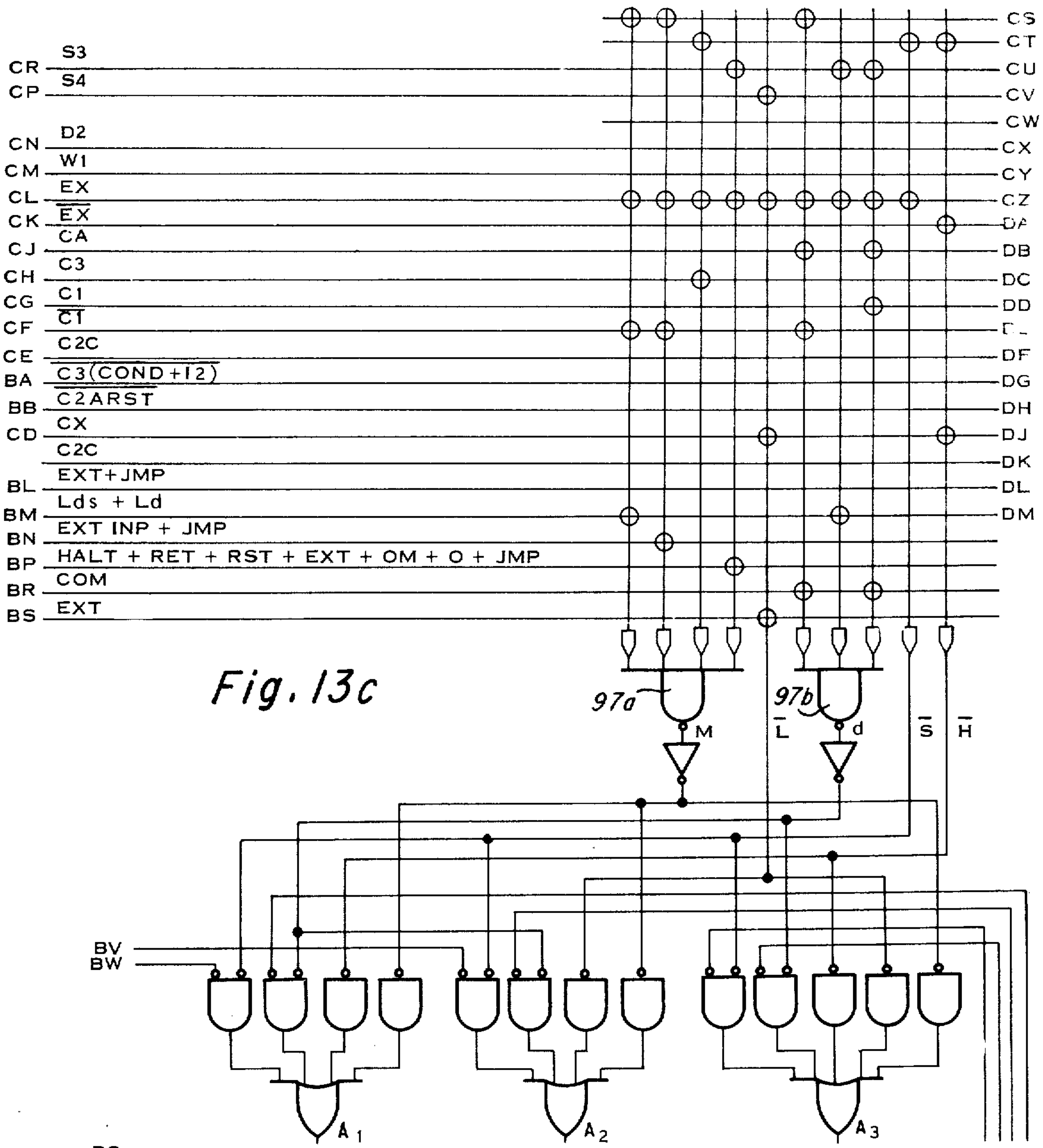

FIGS. 13*a*, 13*b*, and 13*c* contain a logic definition of the internal control of the CPU.

Figure 14:
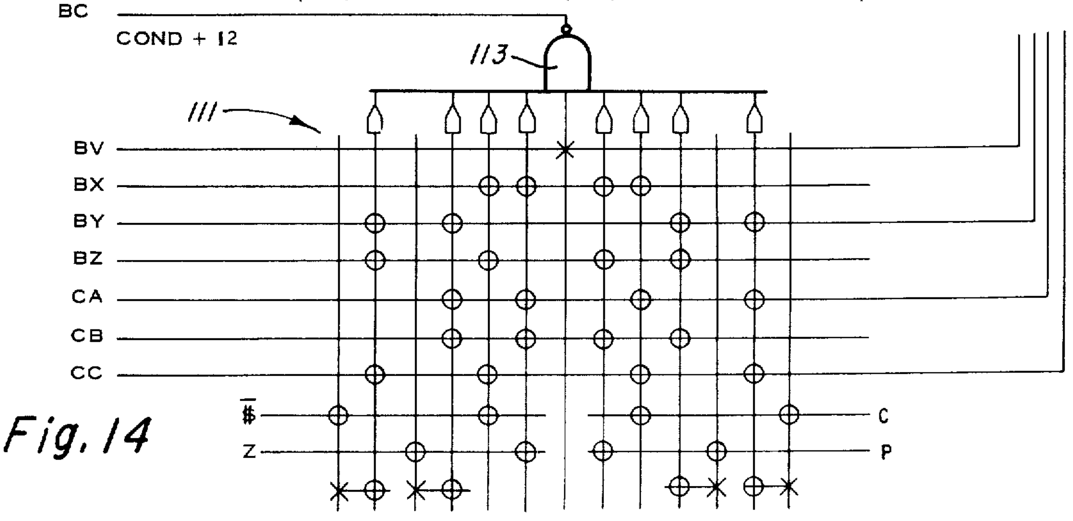

FIG. 14 illustrates the logic of the status decode of arithmetic operations of the ALU.

Figure 15:
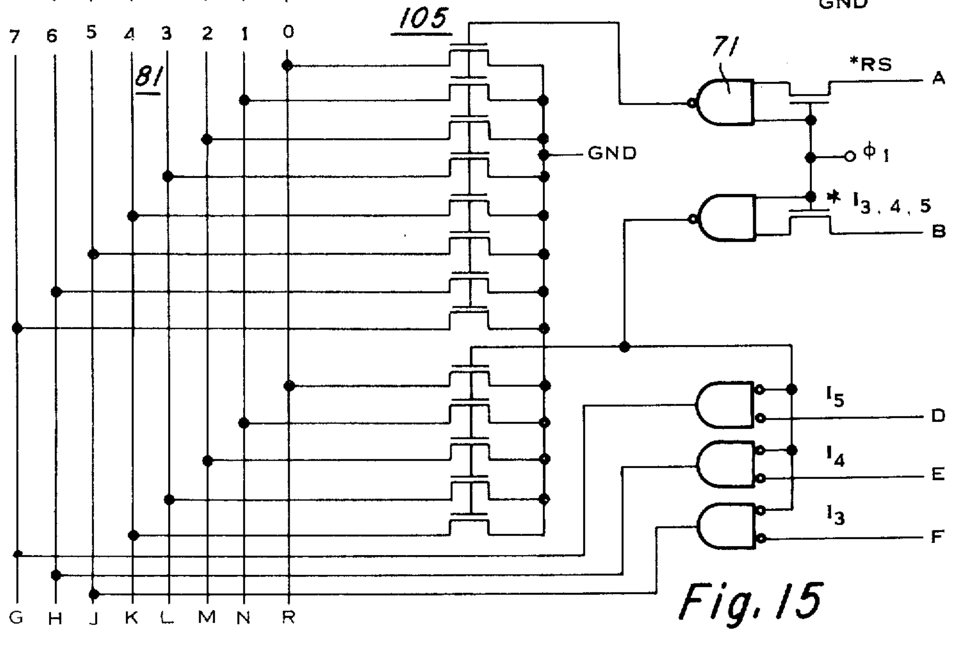

FIG. 15 is a logic diagram of the restart operation.

Figure 16:
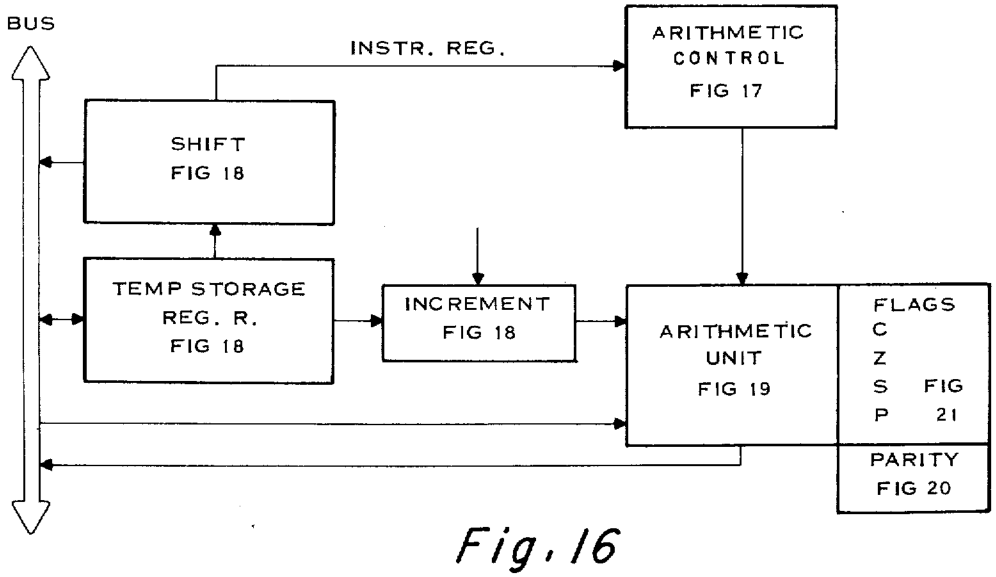

FIG. 16 is a functional block diagram of the arithmetic logic unit of the CPU.

Figure 17:
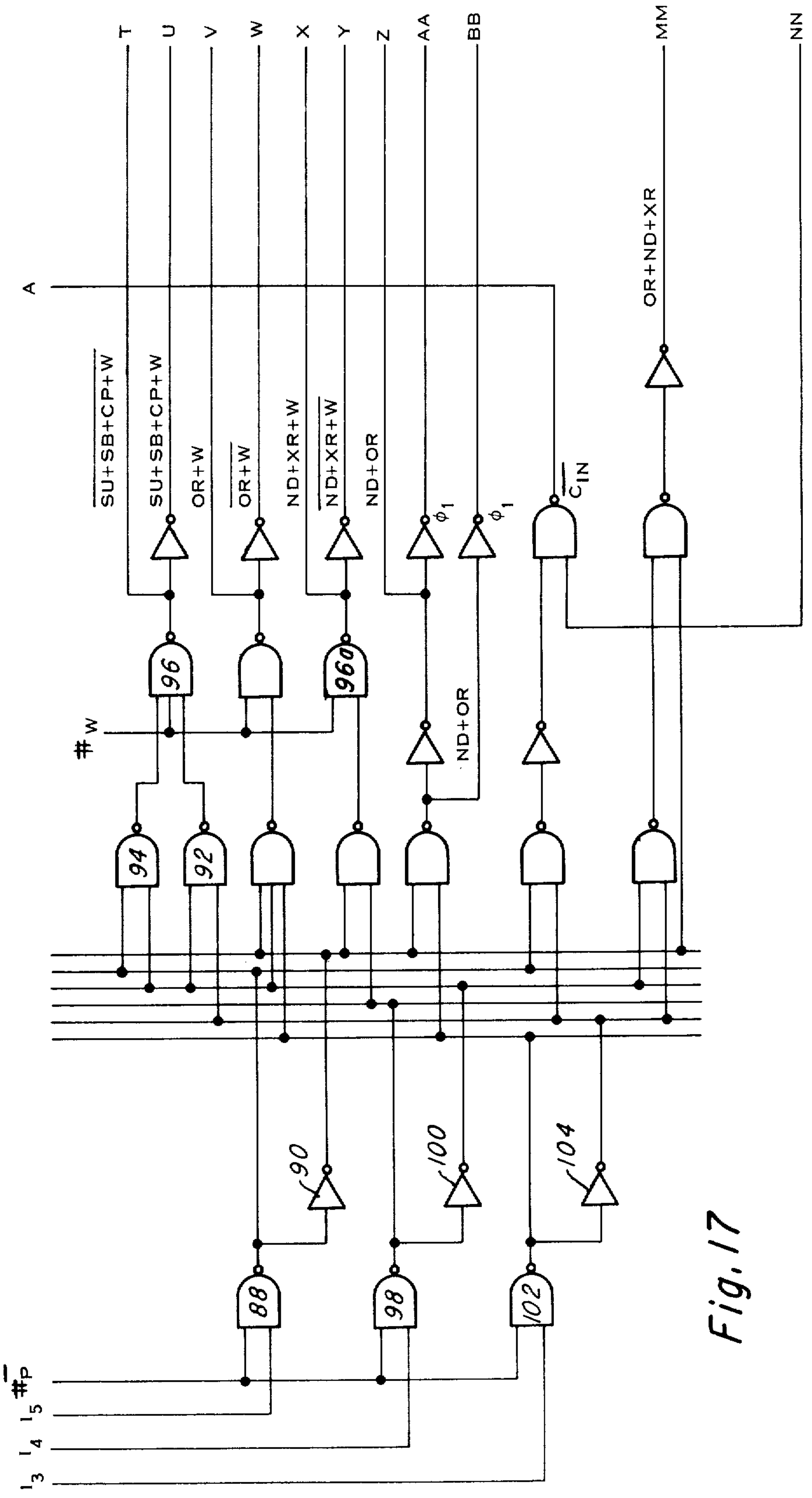

FIG. 17 is a logic diagram of the arithmetic control section of the ALU.

Figure 18:
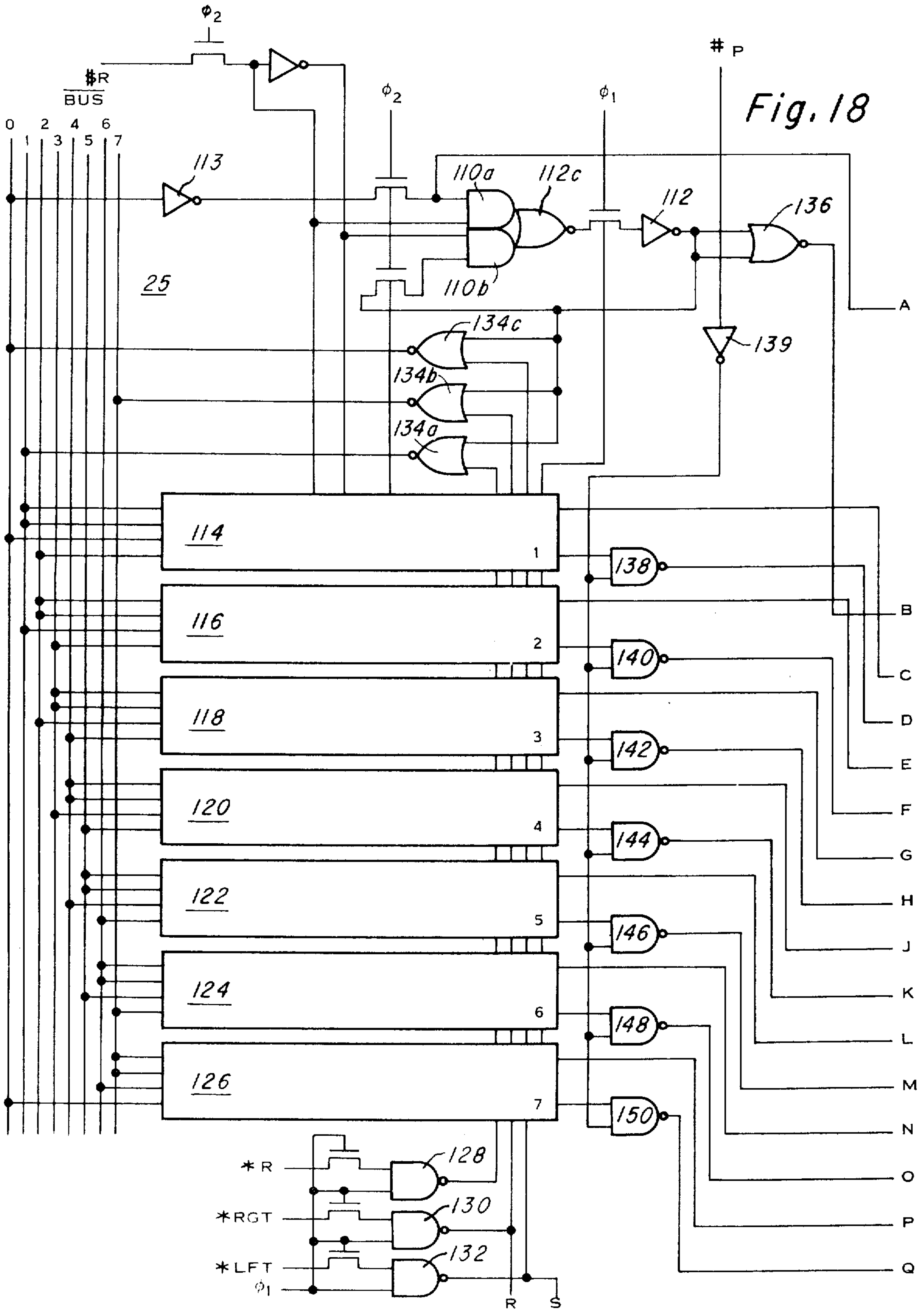

FIG. 18 illustrates the logic of the temporary storage register, shift circuitry, and increment logic.

Figure 19:
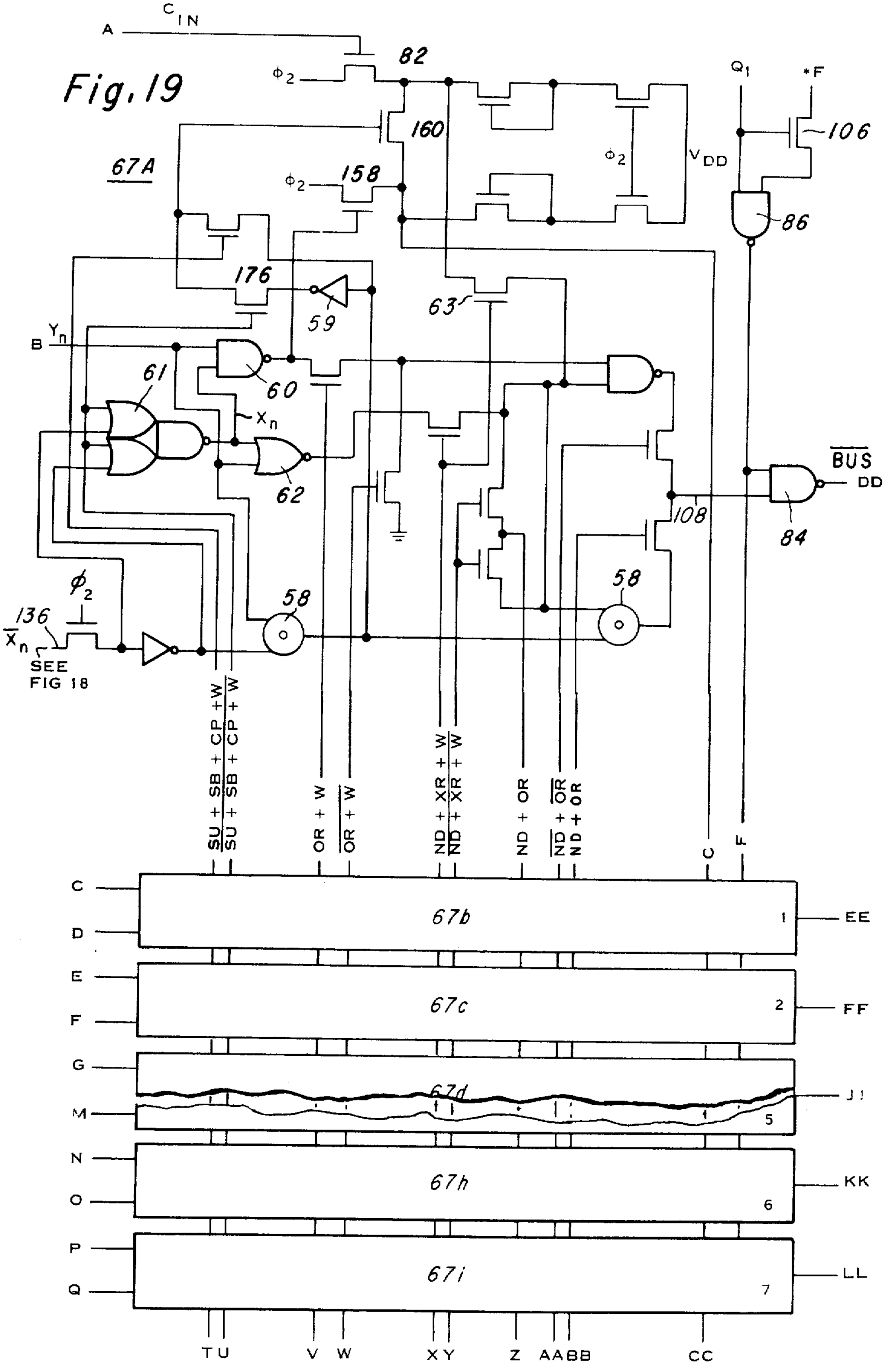

FIG. 19 is a logic diagram of the arithmetic unit.

Figure 20:
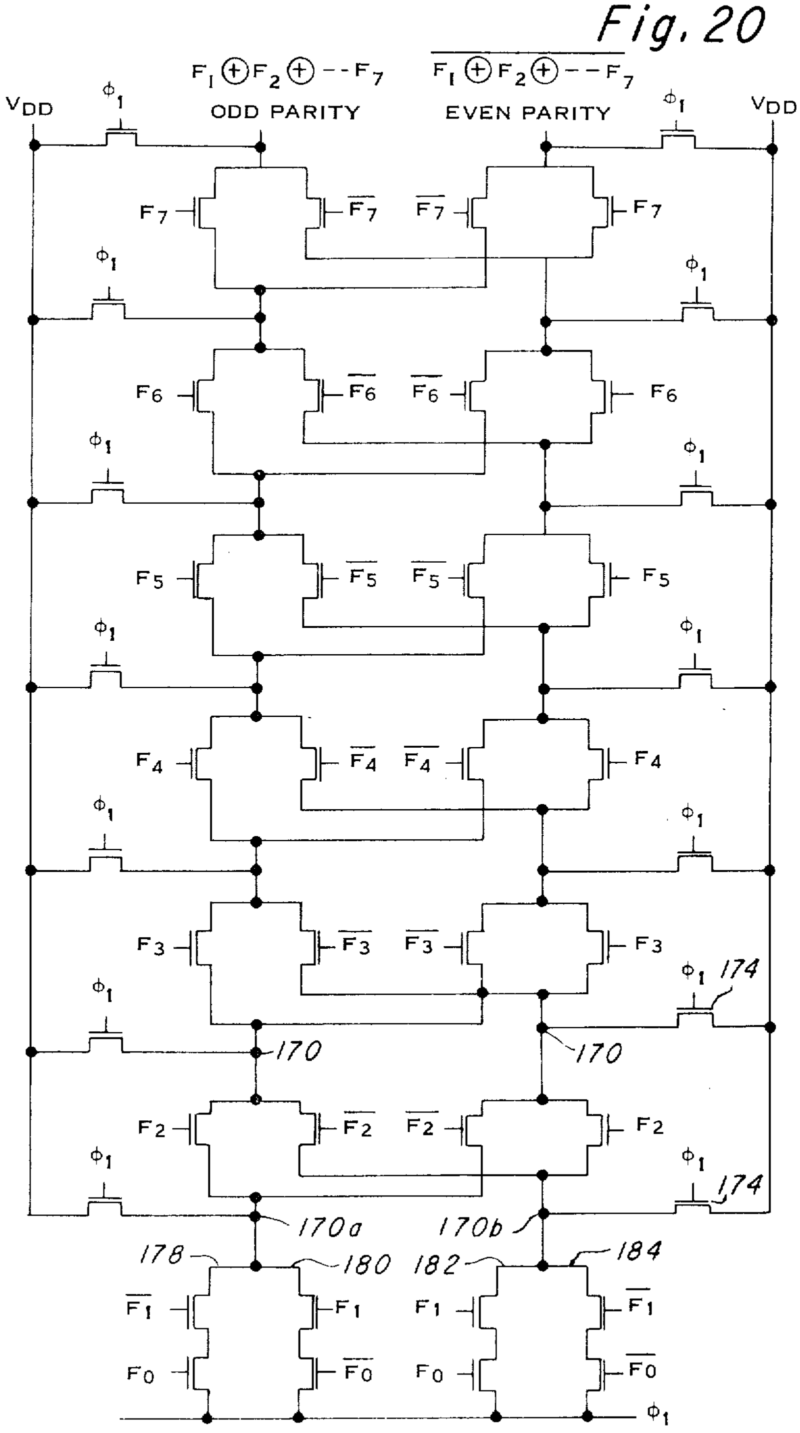

FIG. 20 is a schematic of an 8-bit parity precharge circuit used in accordance with the present invention.

Figure 21:
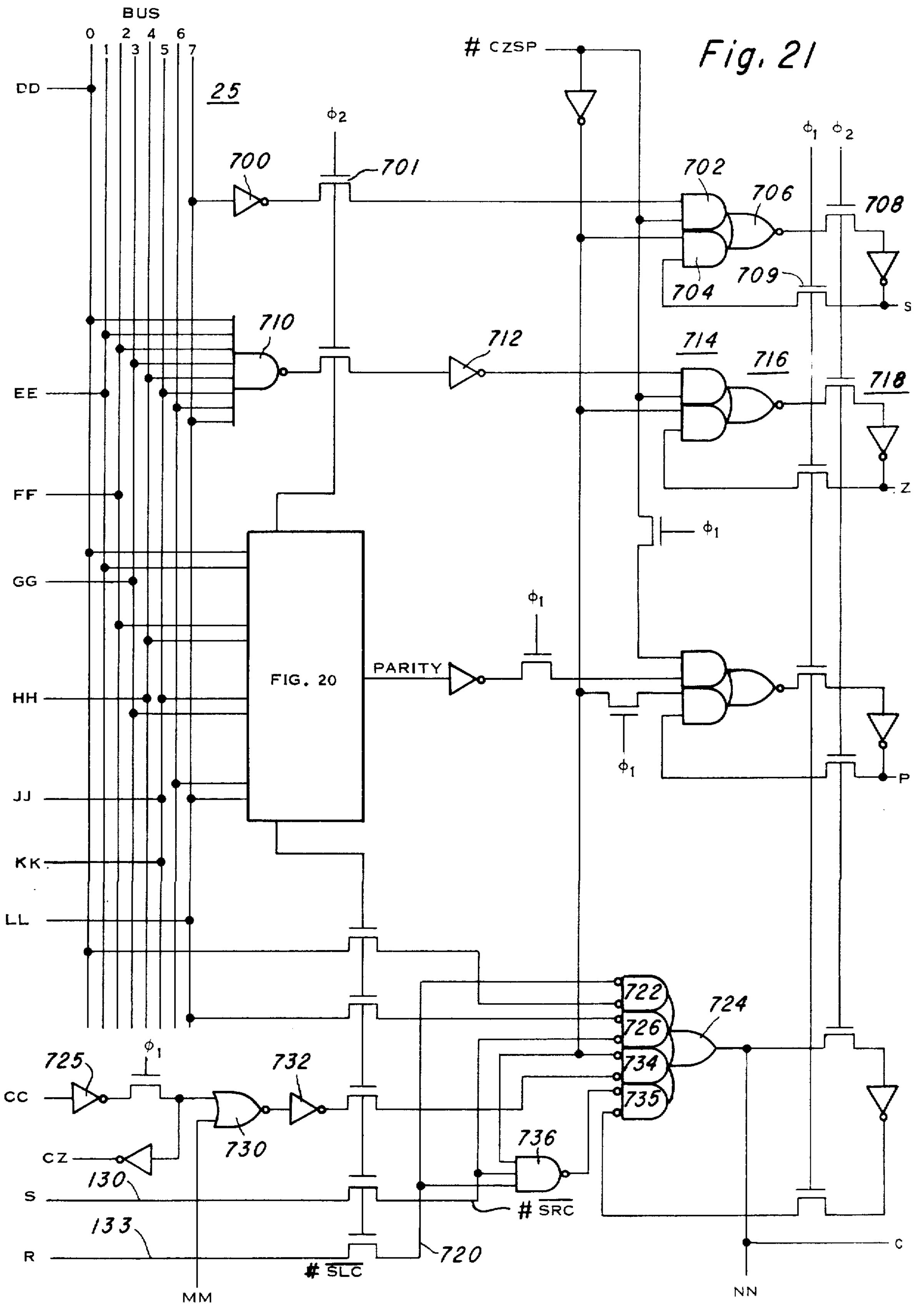

FIG. 21 illustrates the logic associated with the arithmetic flags of the ALU.

Figure 22:
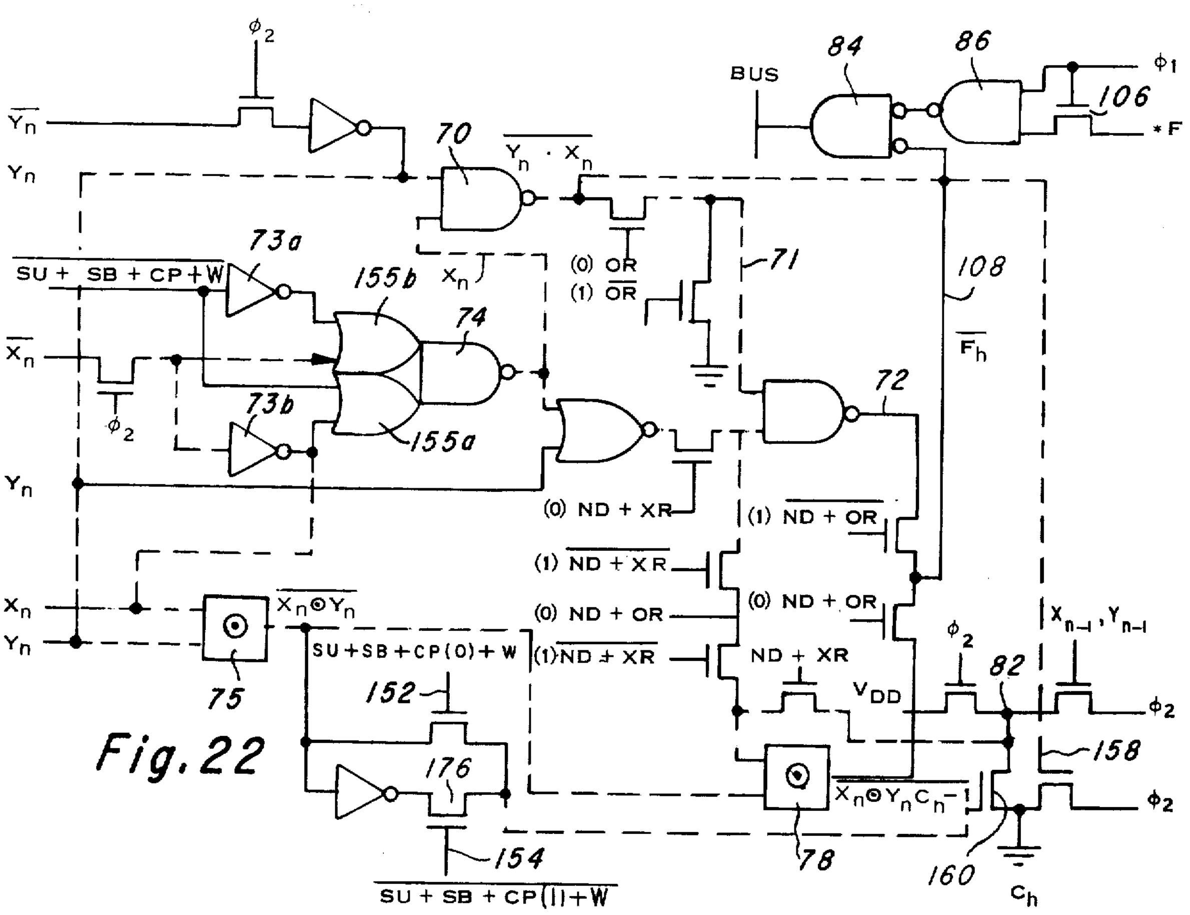

FIG. 22 is a logic diagram illustrating the arithmetic operation add.

Figure 23:
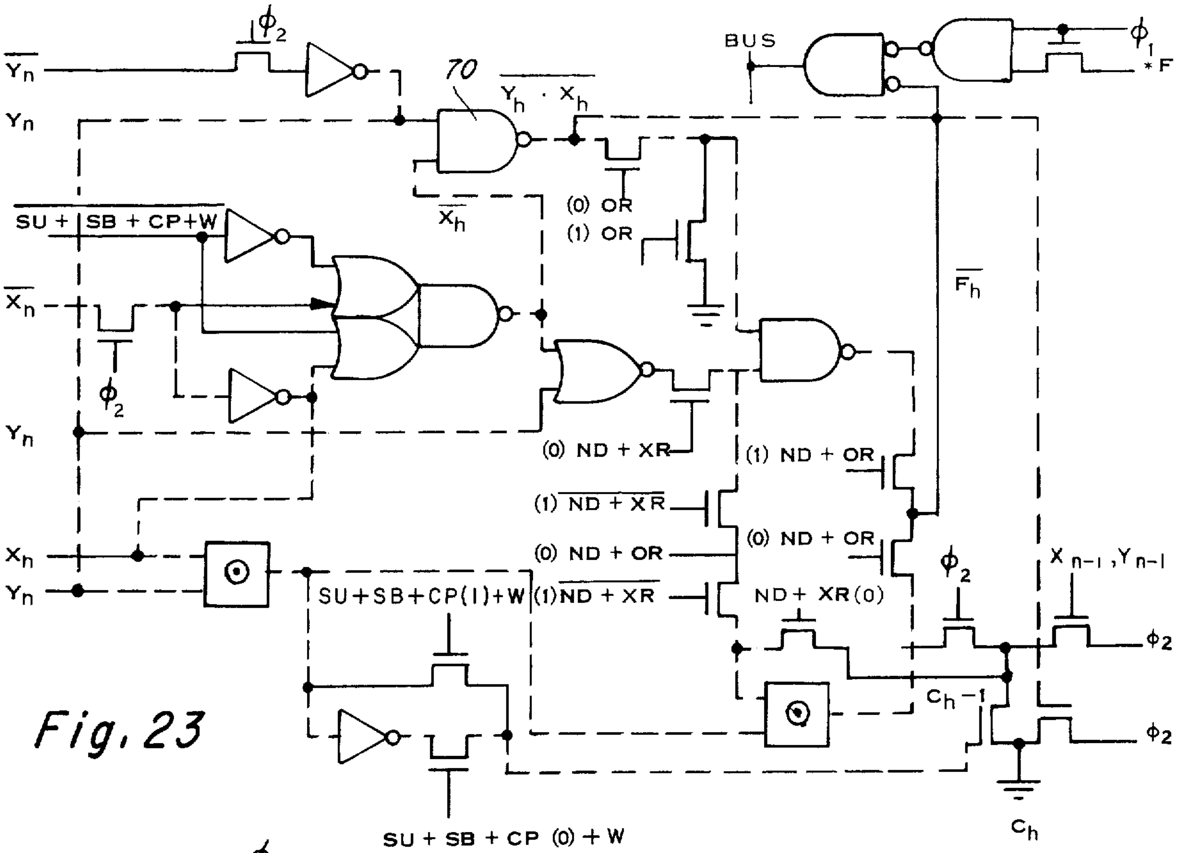

FIG. 23 is a logic diagram illustrating the arithmetic logic for subtract.

Figure 24:
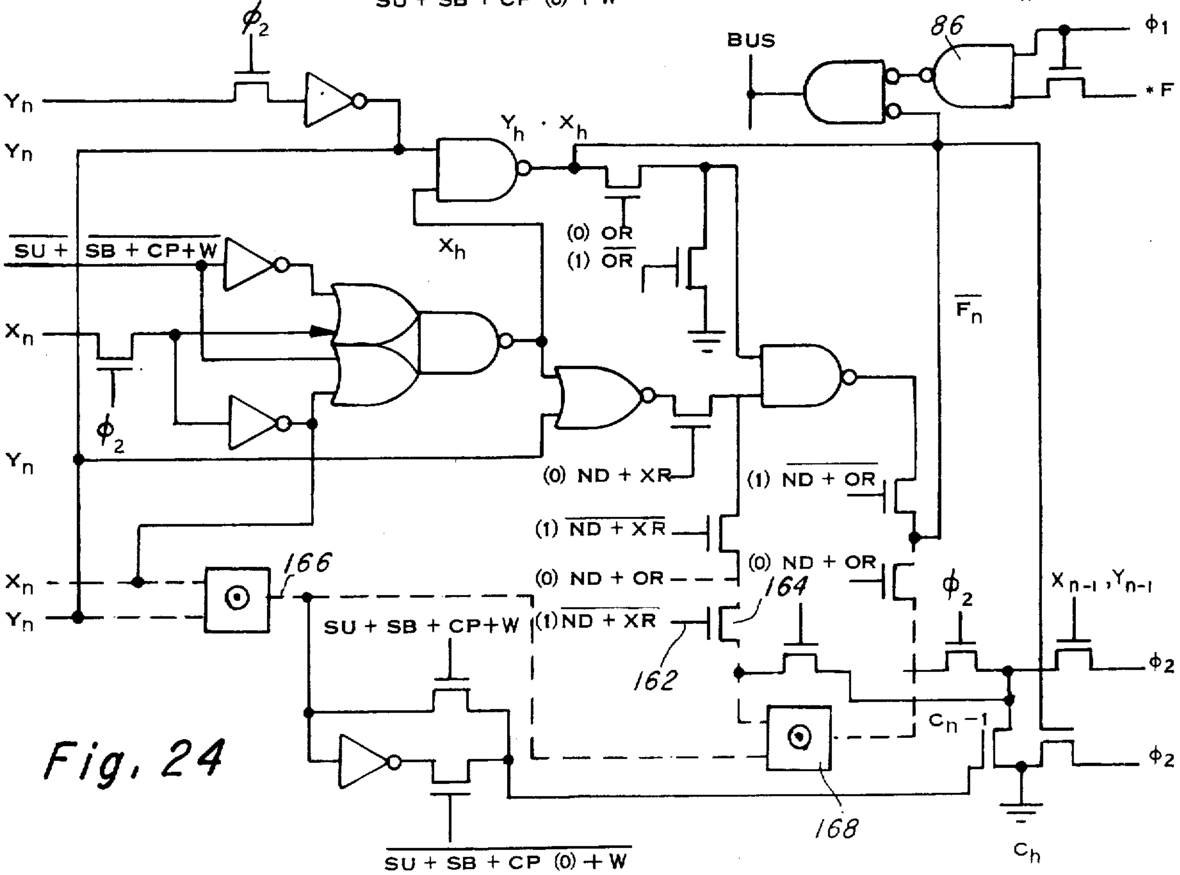

FIG. 24 is a logic diagram illustrating the logic of exclusive OR.

Figure 25A:
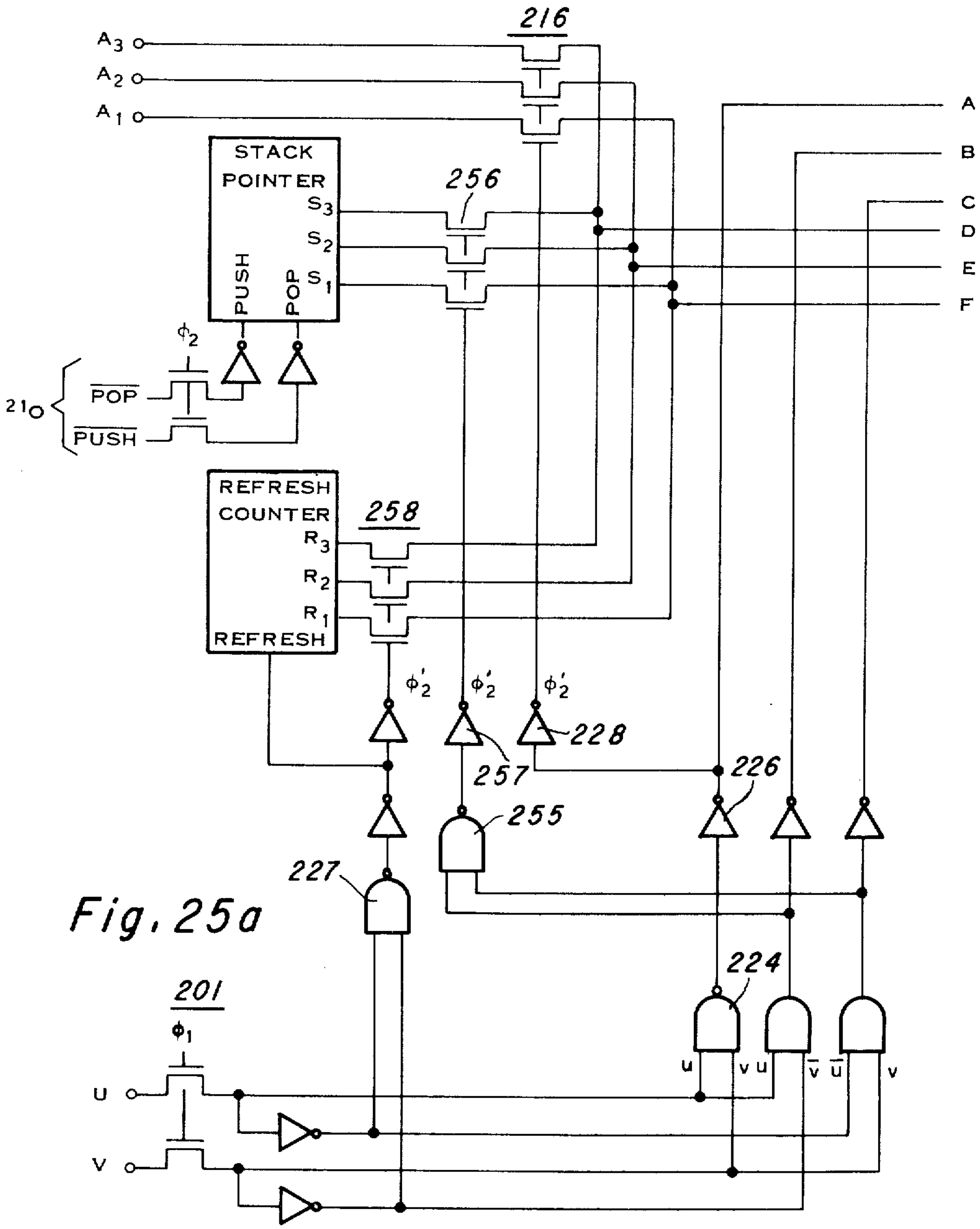
Figure 25B:
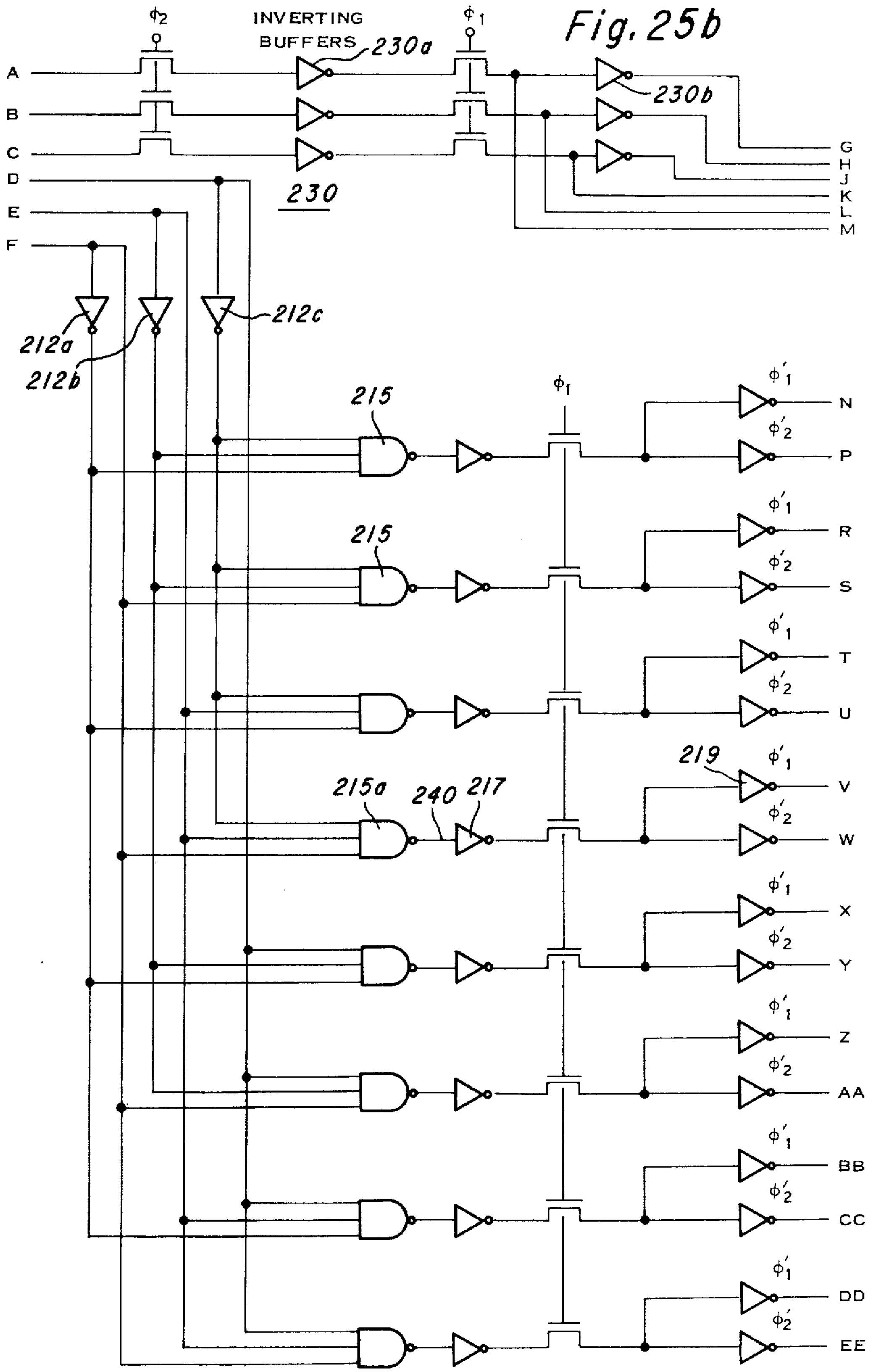
Figure 25C:
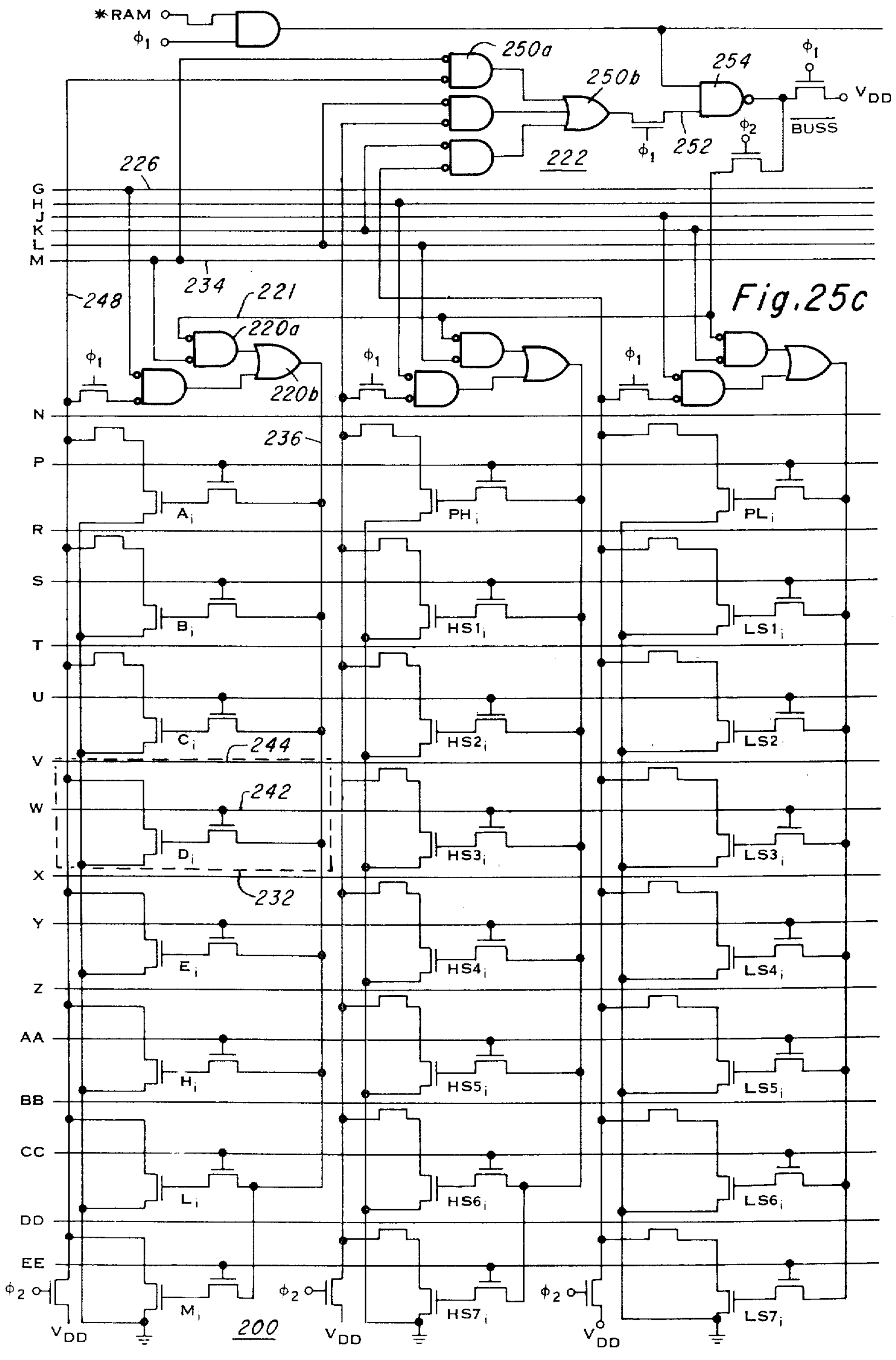

FIGS. 25*a*, 25*b* and 25*c* are logic and schematic diagrams illustrating operation of the random access memory of one chip CPU.

Figure 26:
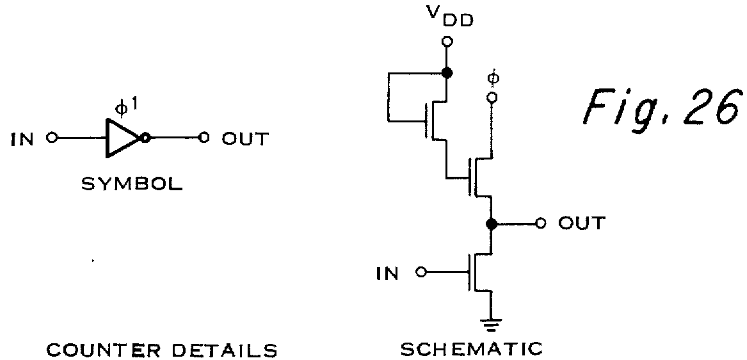

FIG. 26 is a schematic diagram of a clocked inverter that may be used in the RAM logic circuit of FIG. 25.

Figure 27:
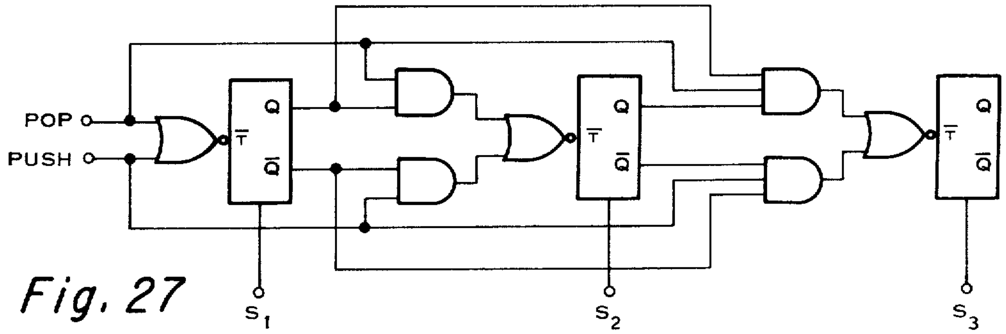

FIG. 27 is a logic diagram illustrating operation of the stack pointer logic.

Figure 28:
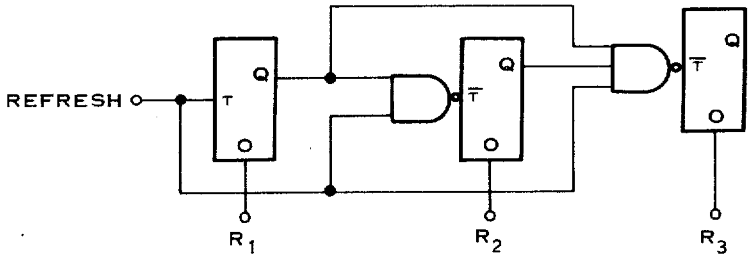

FIG. 28 illustrates the logic associated with the refresh counter of the random access memory of the one chip CPU.

Figure 29:
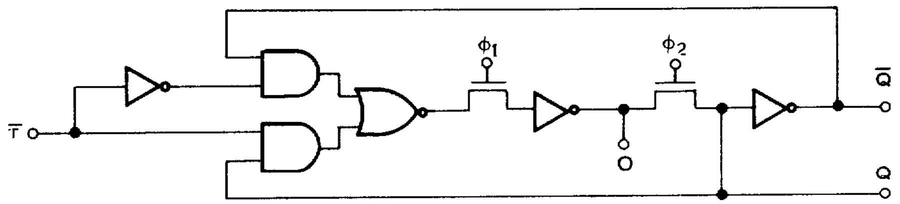

FIG. 29 illustrates the logic of the flip-flop utilized in the logic of circuit 25.

Figure 30:
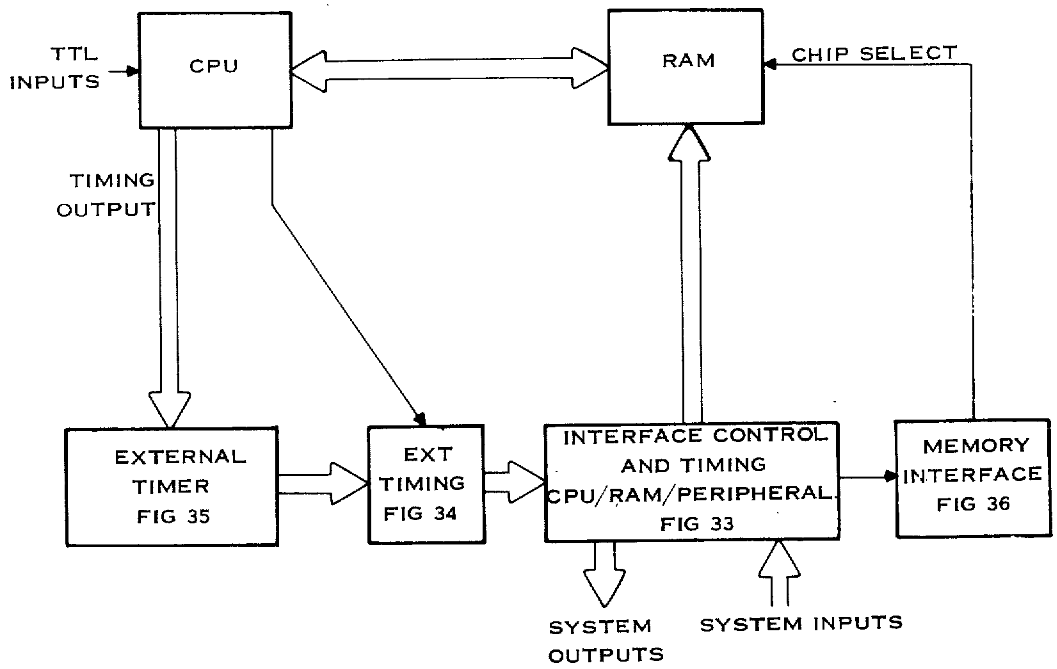

FIG. 30 is a functional block diagram illustrating operation of the interface between the one chip CPU and the external memory of the present invention.

Figure 31A:
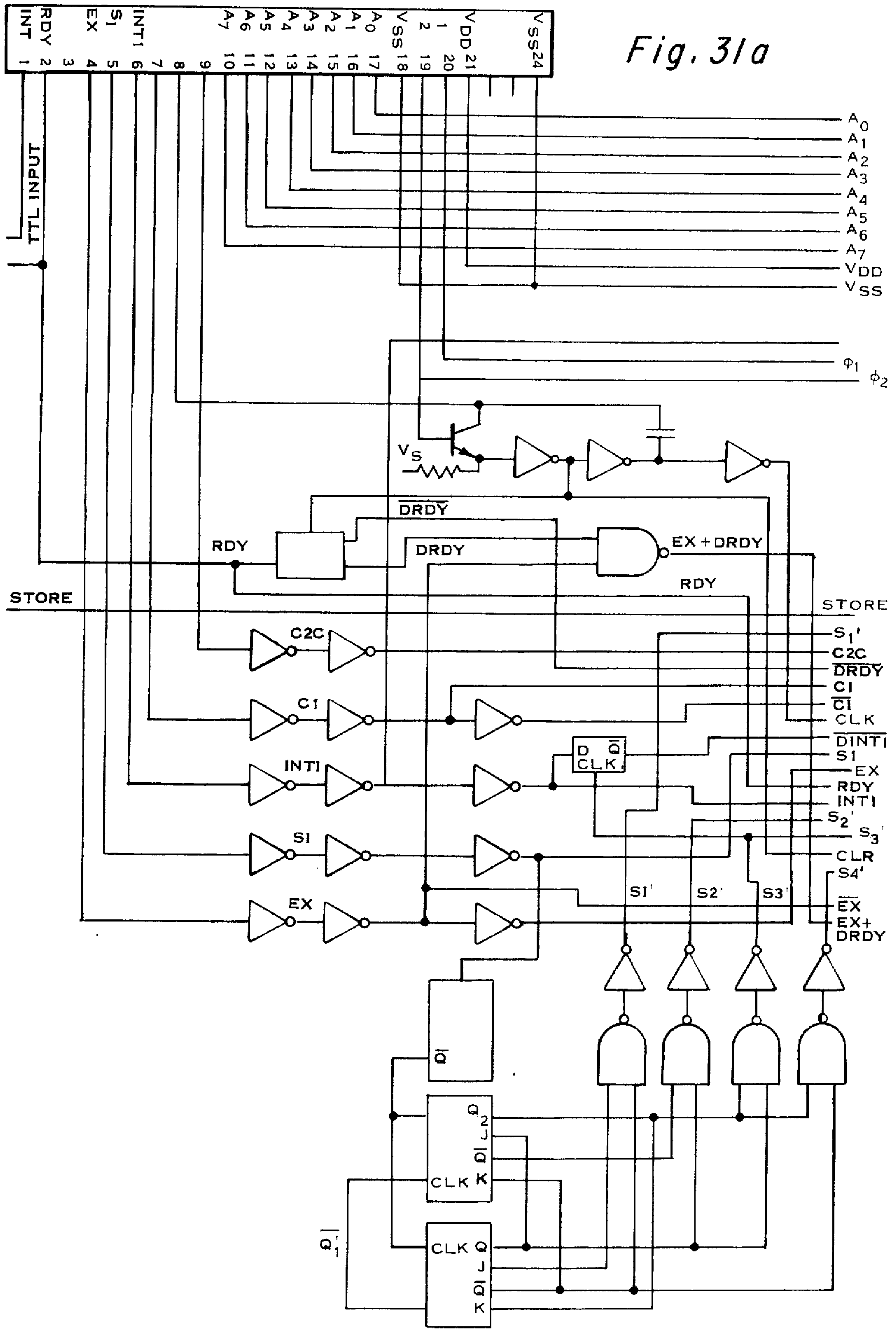
Figure 31B:
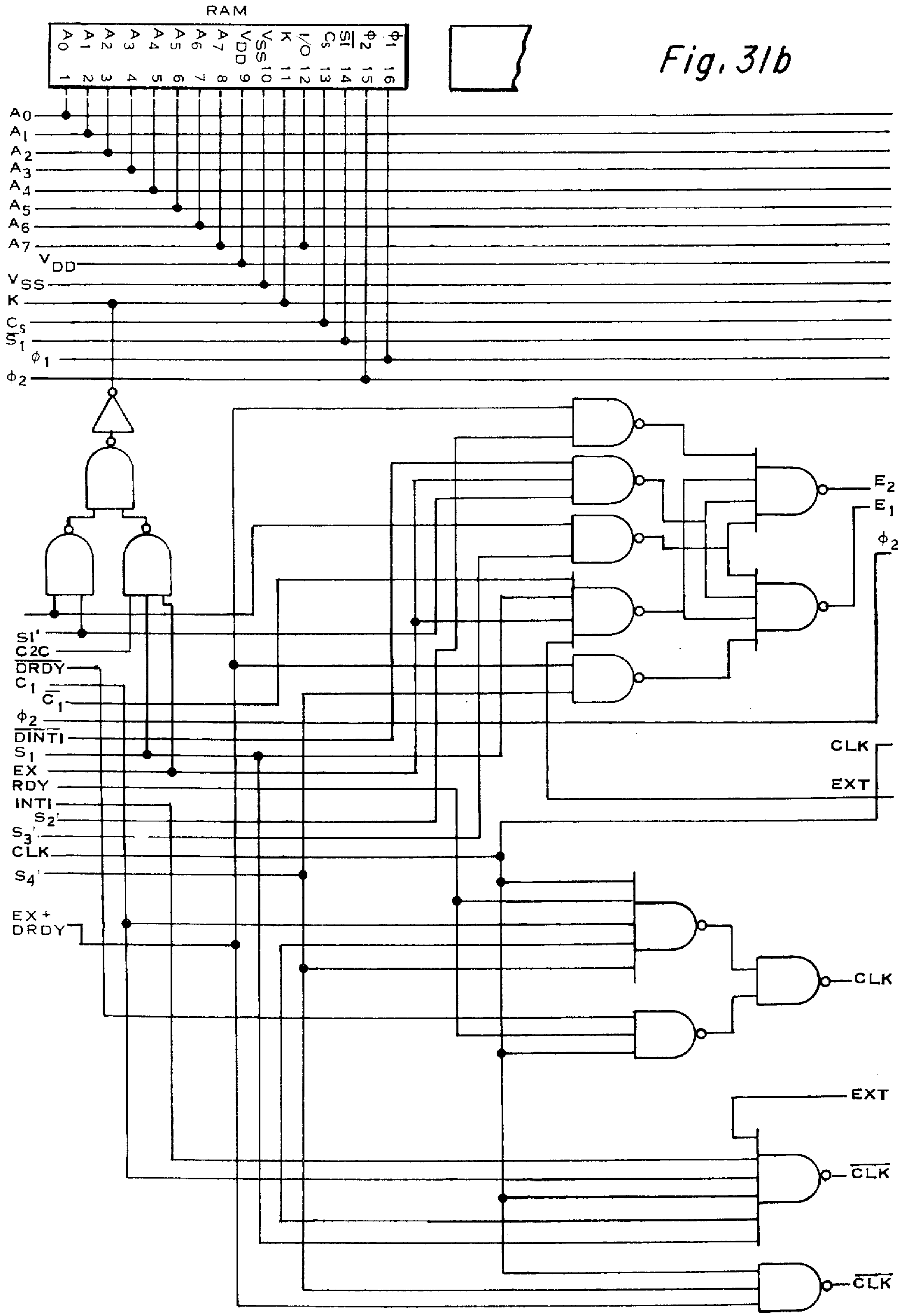
Figure 31C:
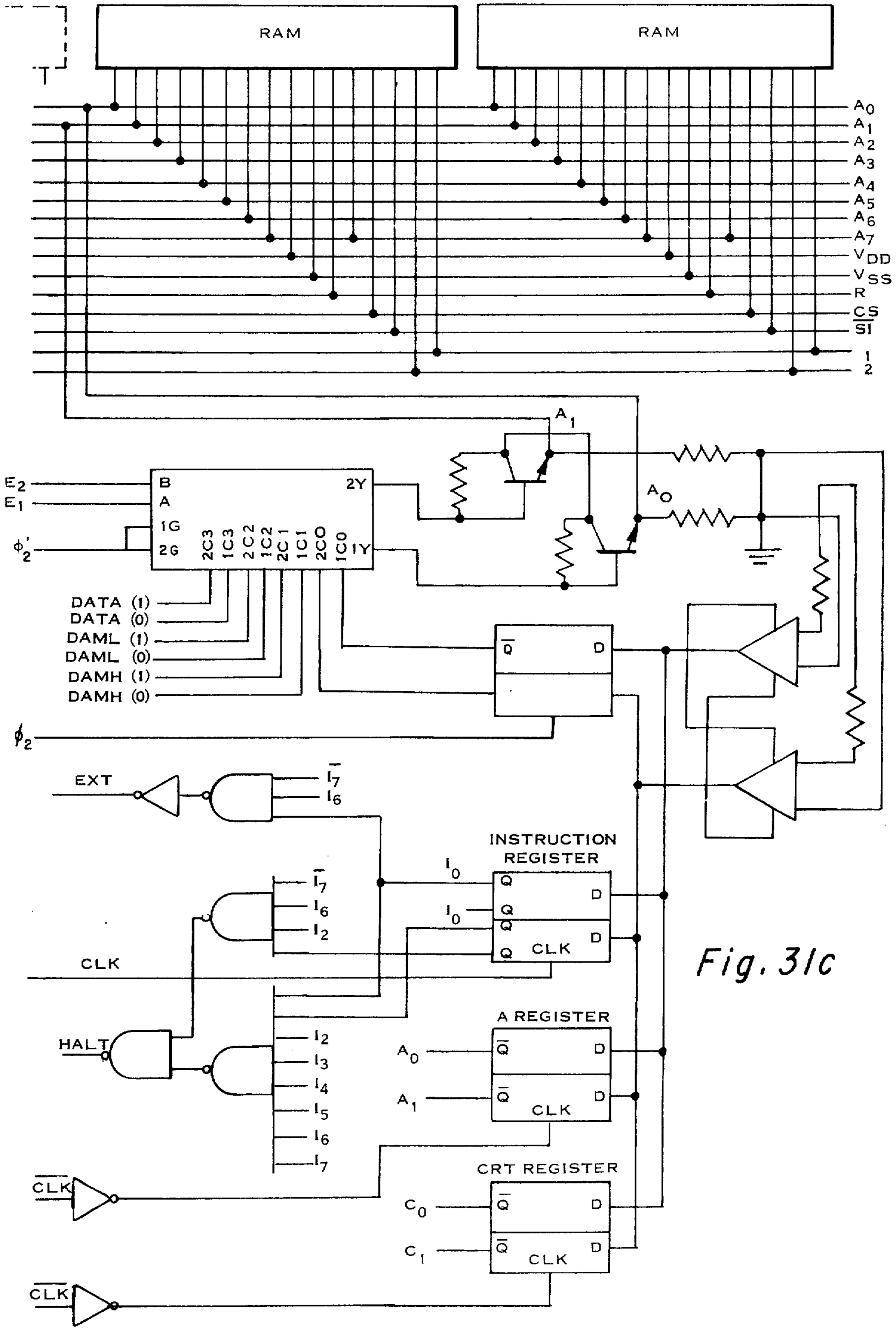

FIGS. 31*a*, 31*b* and 31*c* schematically and in logic format illustrate the interface elements shown in FIG. 30.

Figure 32A:
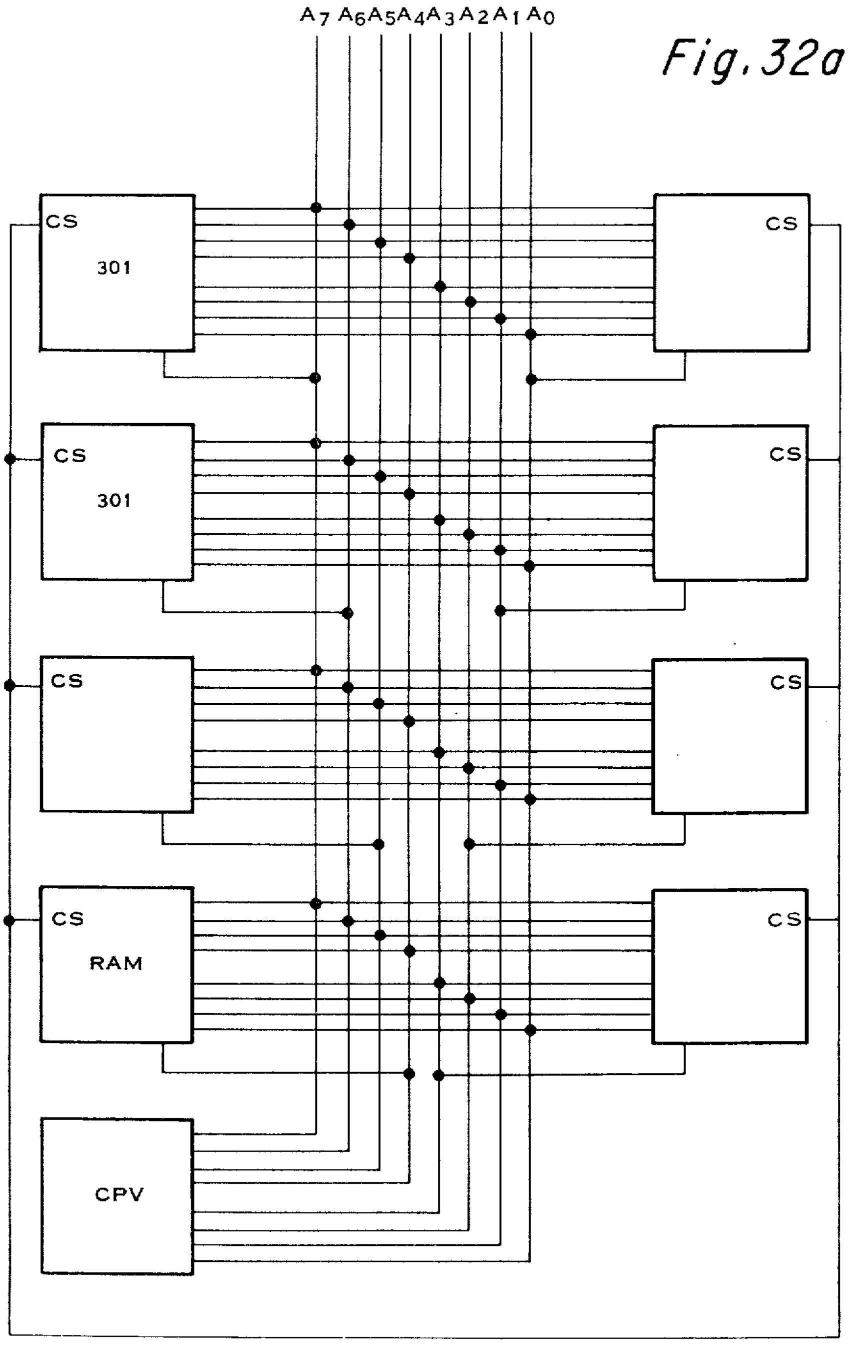
Figure 32B:
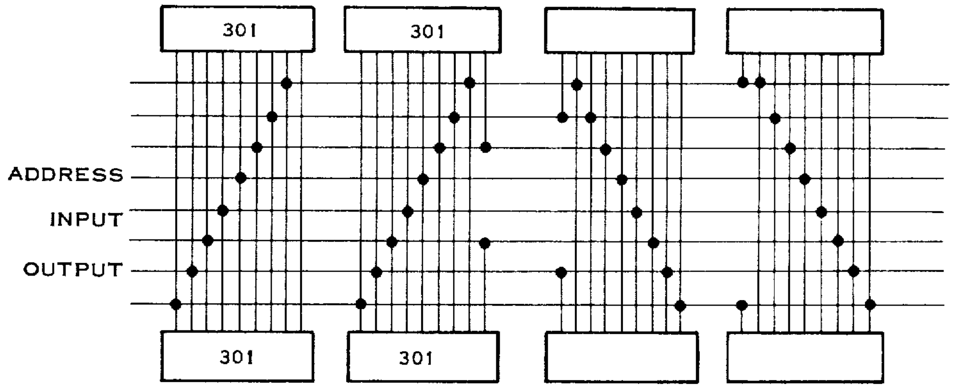

FIGS. 32*a* and 32*b* illustrate multiplexing of the external 8-bit parallel bus for 1K byte of external memory.

Figure 32C:
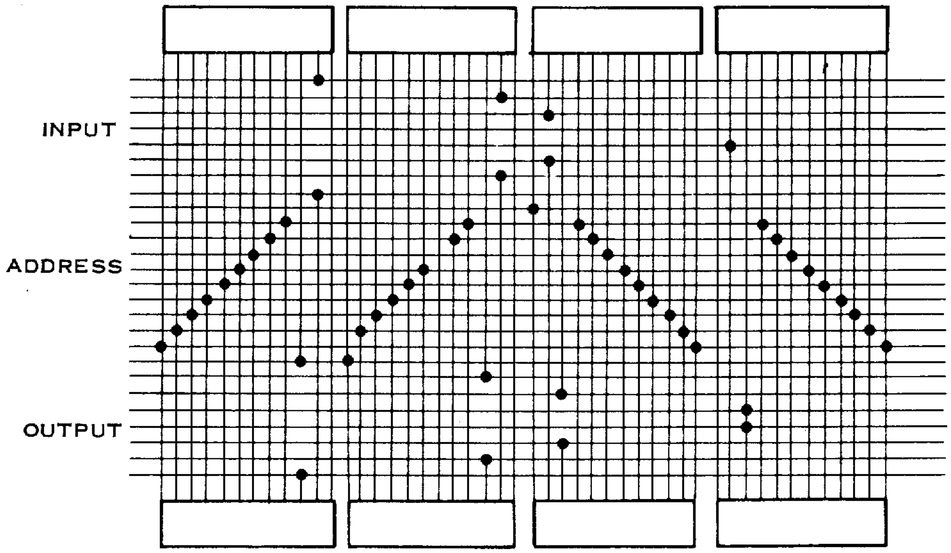

FIG. 32*c* illustrates the bus system conventionally required in nonmultiplex systems for 1K byte of memory.

Figure 33:
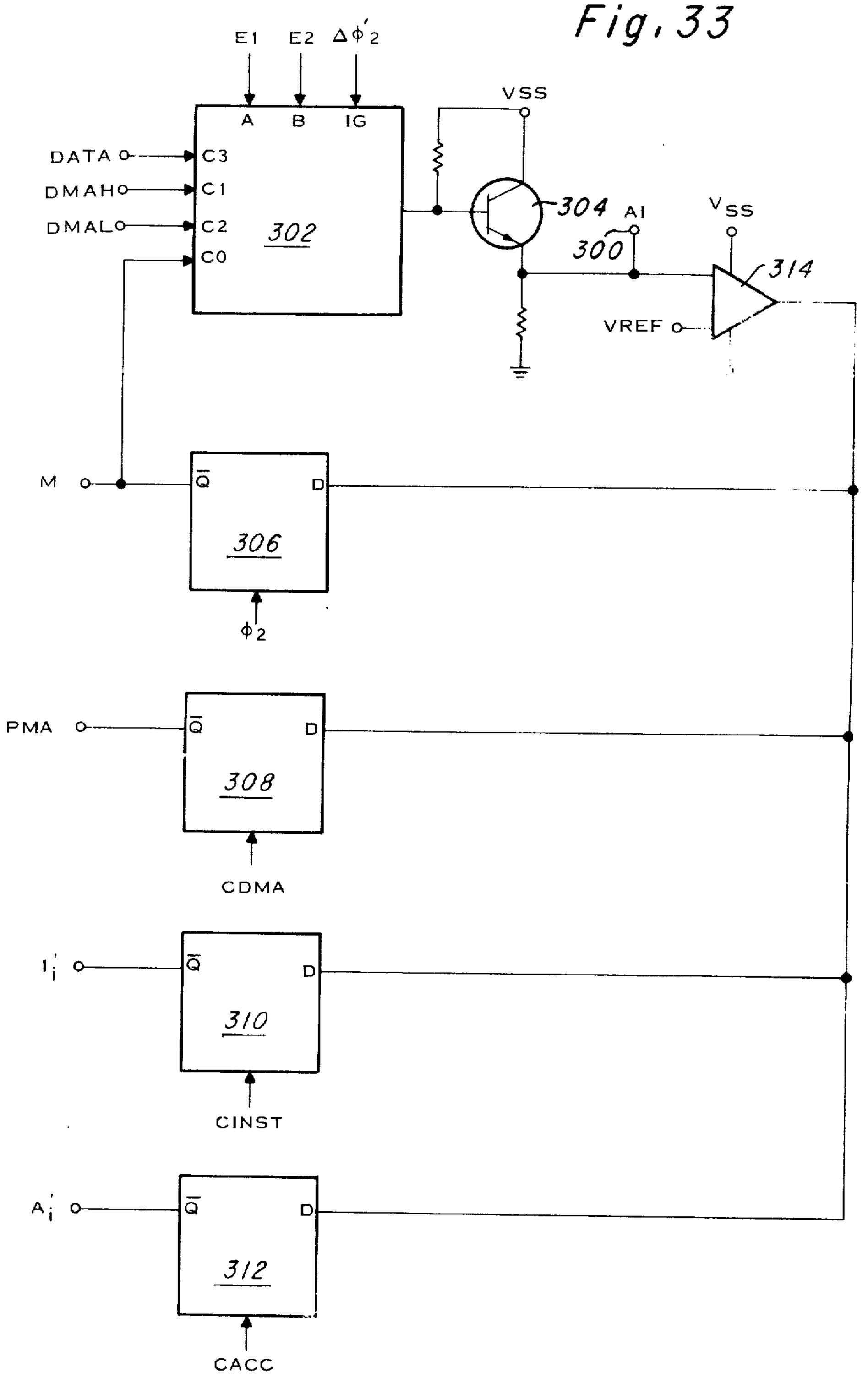

FIG. 33 schematically and in block diagram form depicts the external memory bus.

Figure 34:
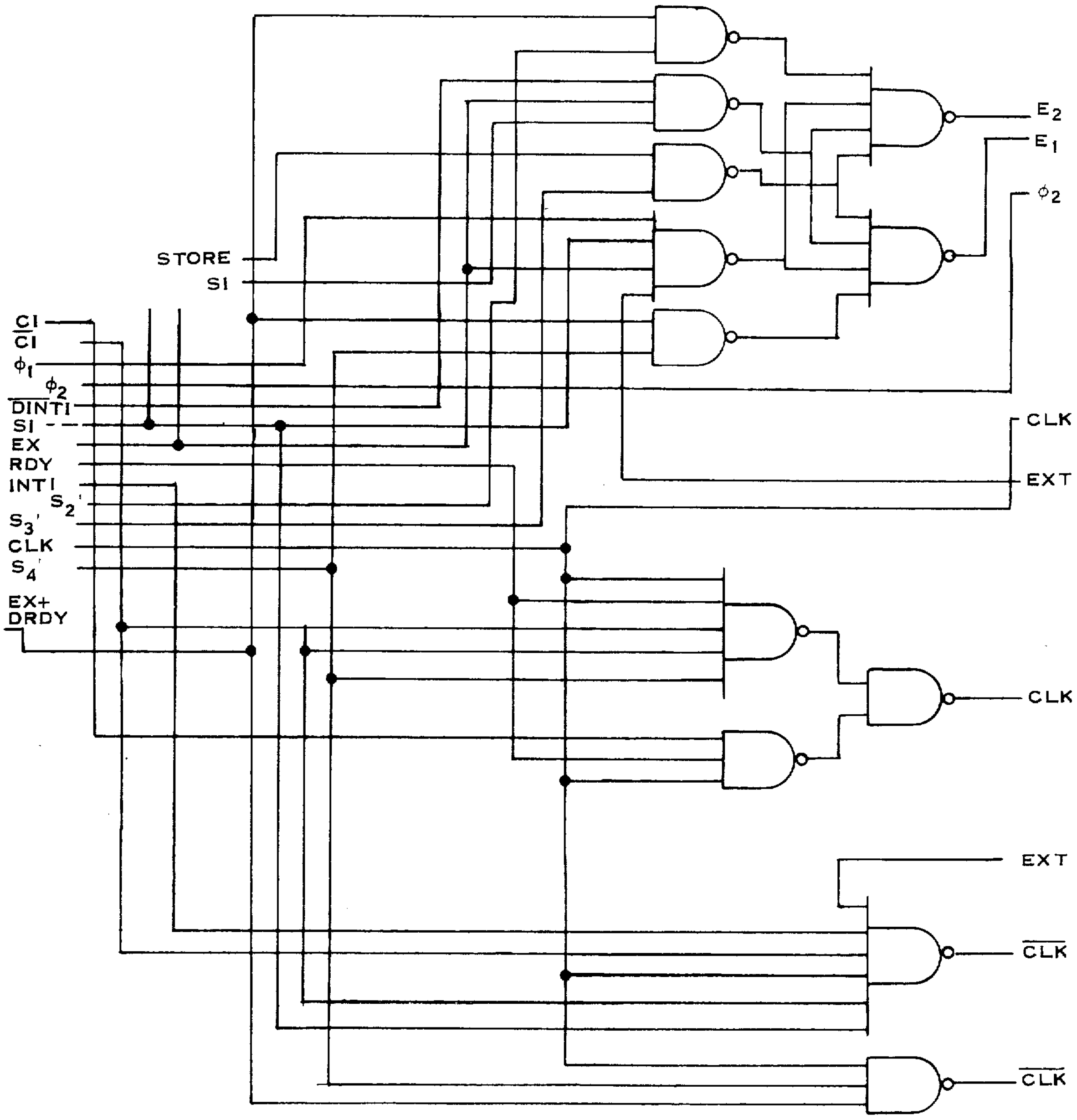

FIG. 34 is a logic diagram of the external timing.

Figure 35:
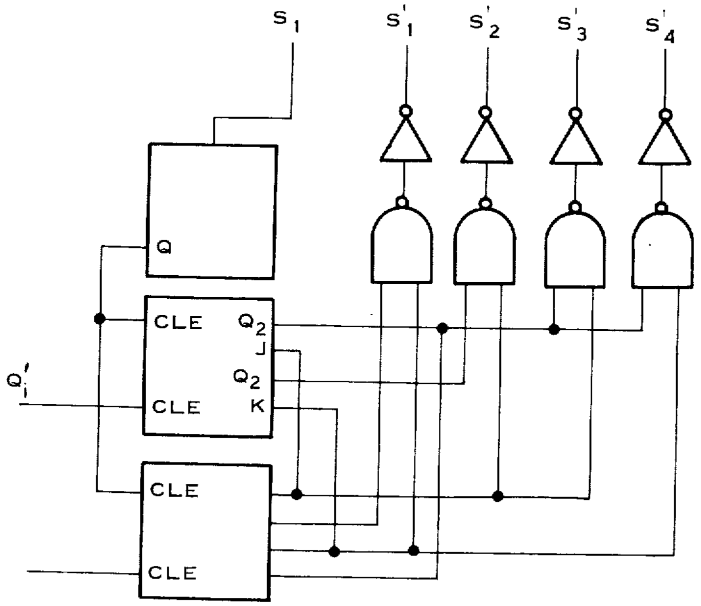

FIG. 35 is a logic diagram of the external timer.

Figure 36:
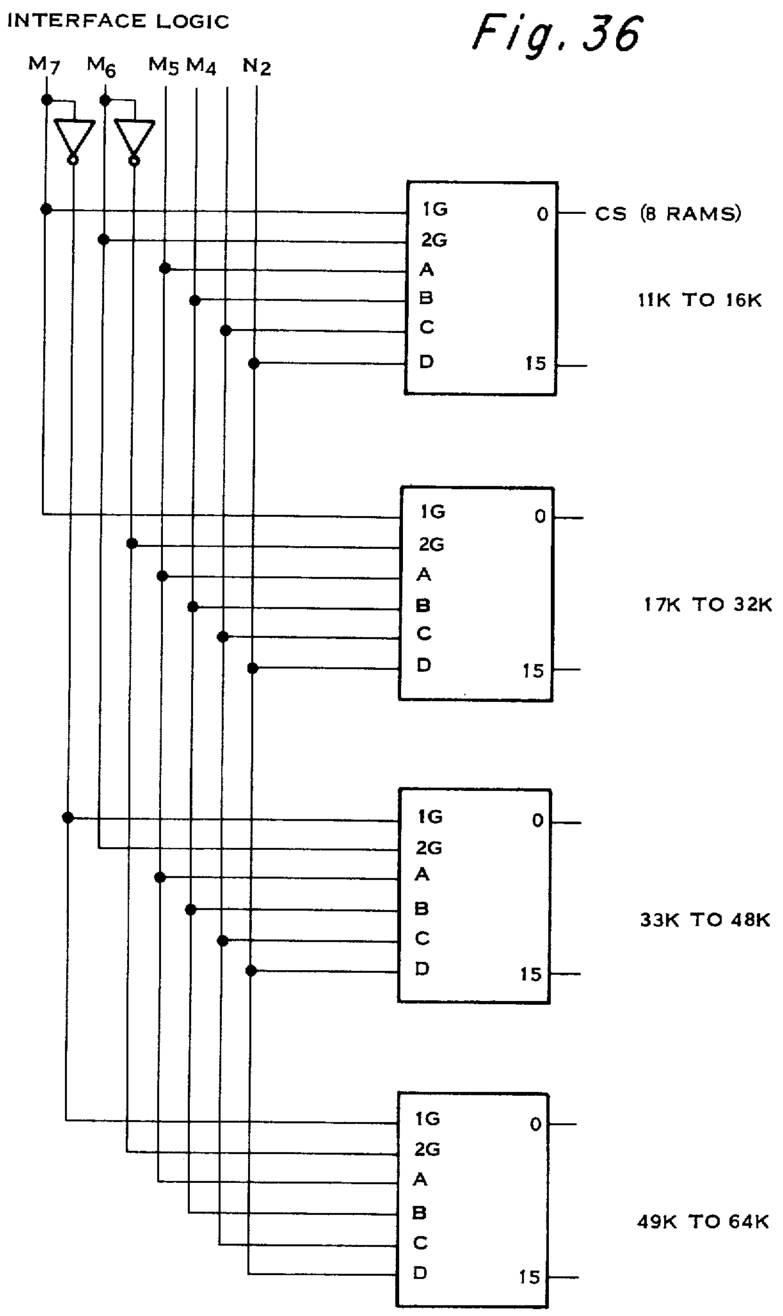

FIG. 36 is a logic diagram of the external memory interface.

Figure 37:
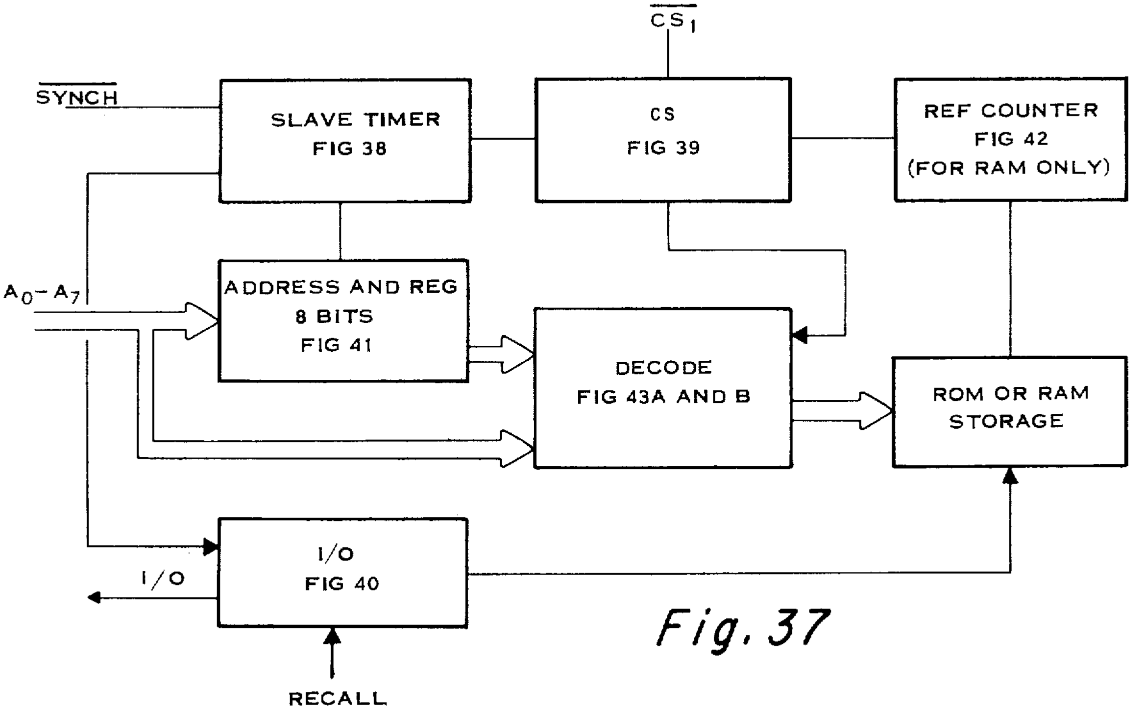

FIG. 37 is a functional block diagram of the external random access or serial memory and associated control elements.

Figure 38:
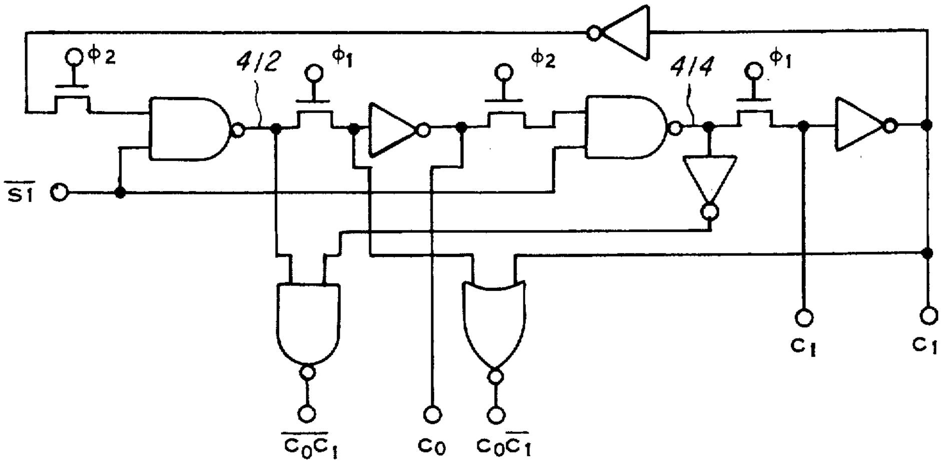

FIG. 38 is a logic diagram of the external bus slave timer.

Figure 39:
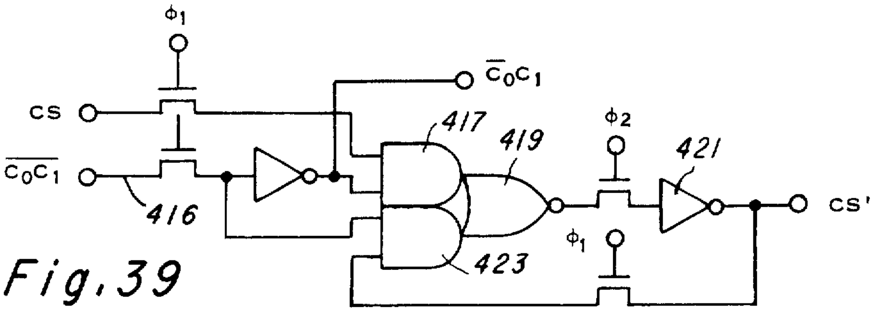

FIG. 39 is a logic diagram of the chip select sample and hold circuit.

Figure 40:
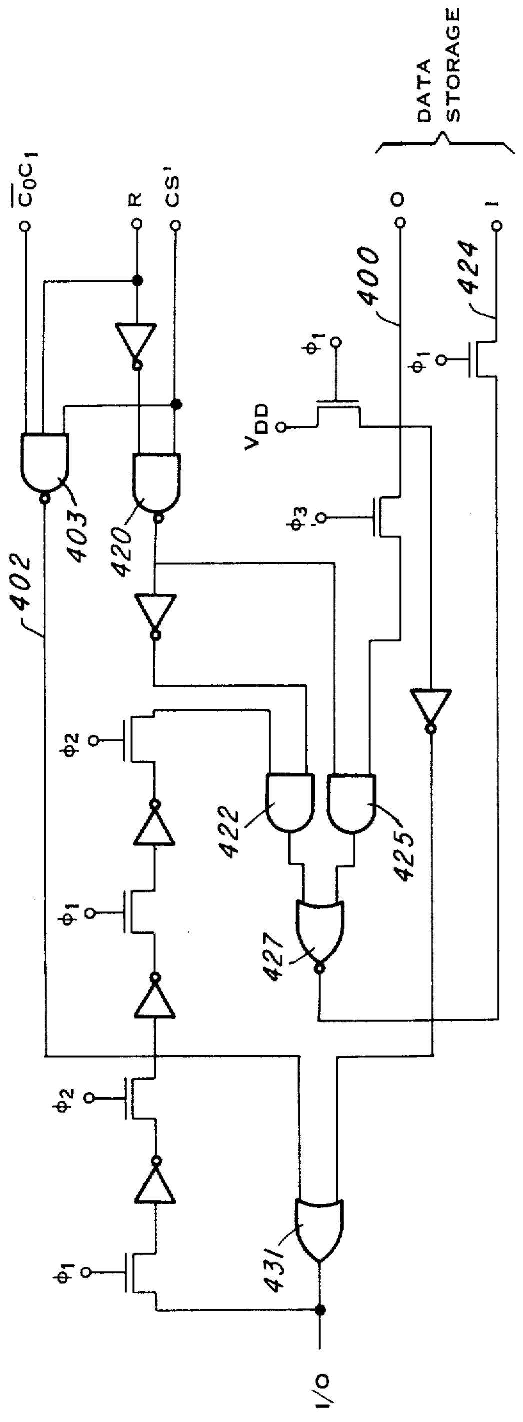

FIG. 40 is a logic diagram of the external memory input/output circuit.

Figure 41:
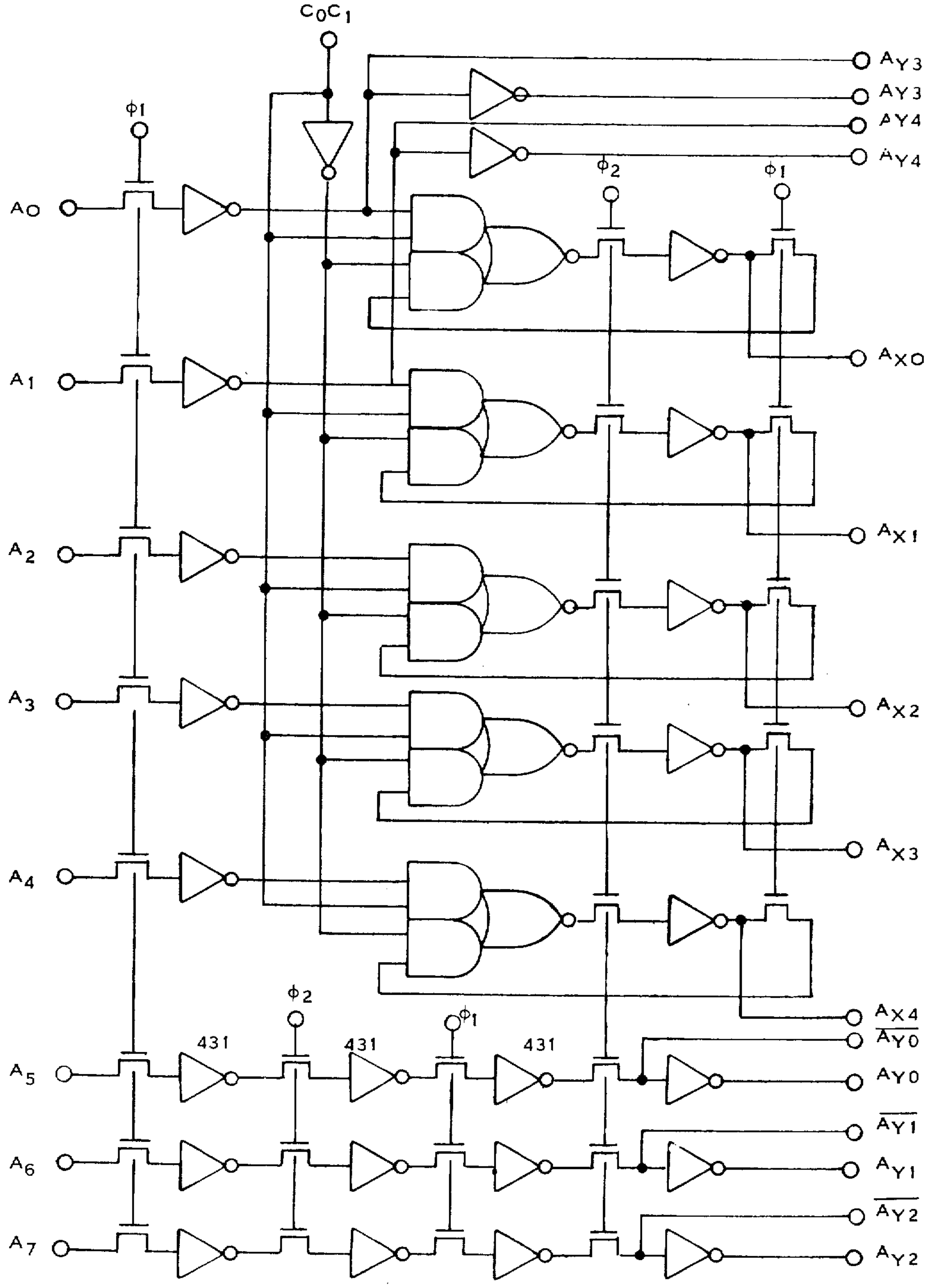

FIG. 41 is an illustration of the address register logic of the external random access memory.

Figure 42:
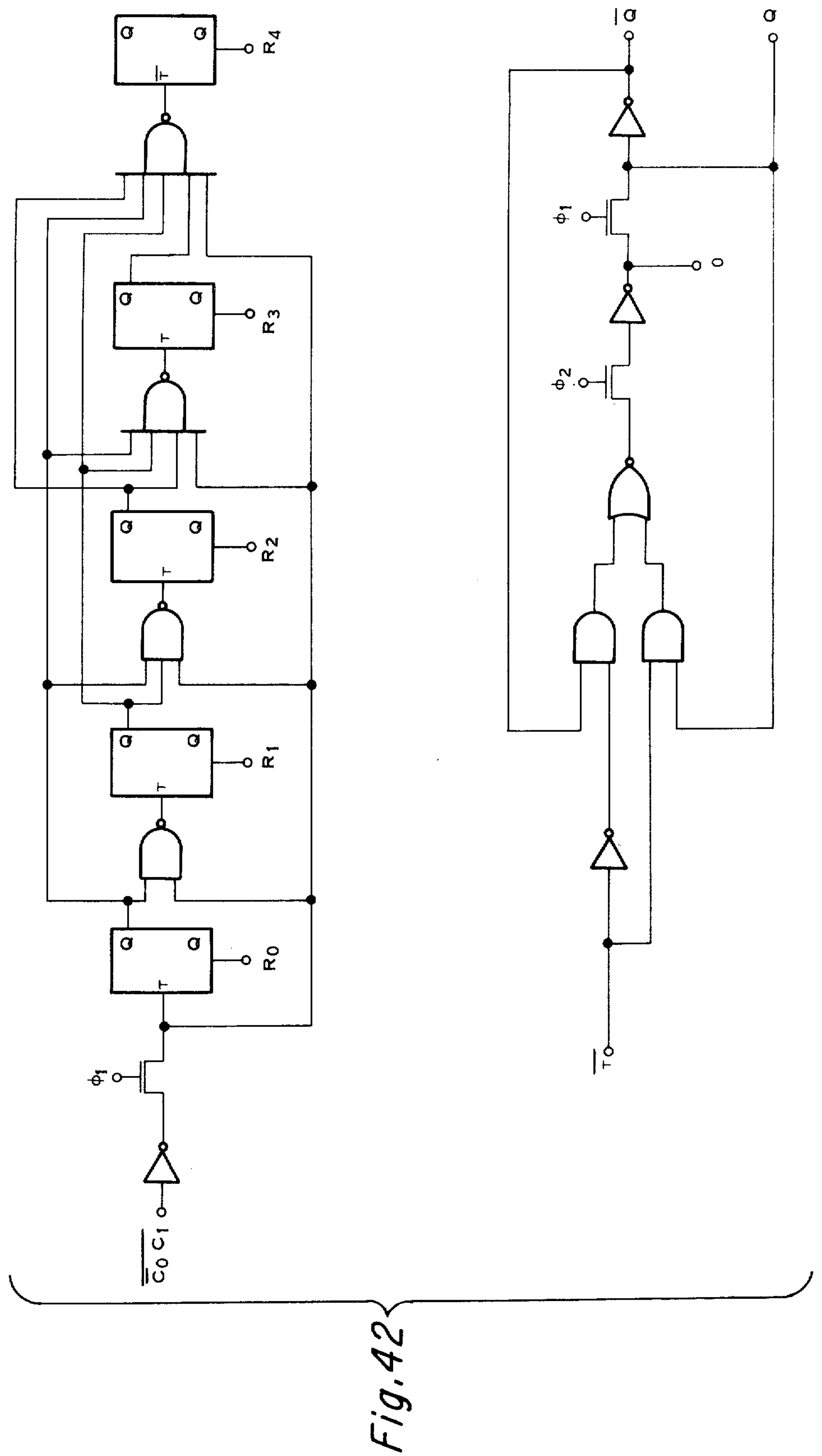

FIG. 42 is a logic diagram of the refresh counter logic of the external random access memory.

Figure 43A:
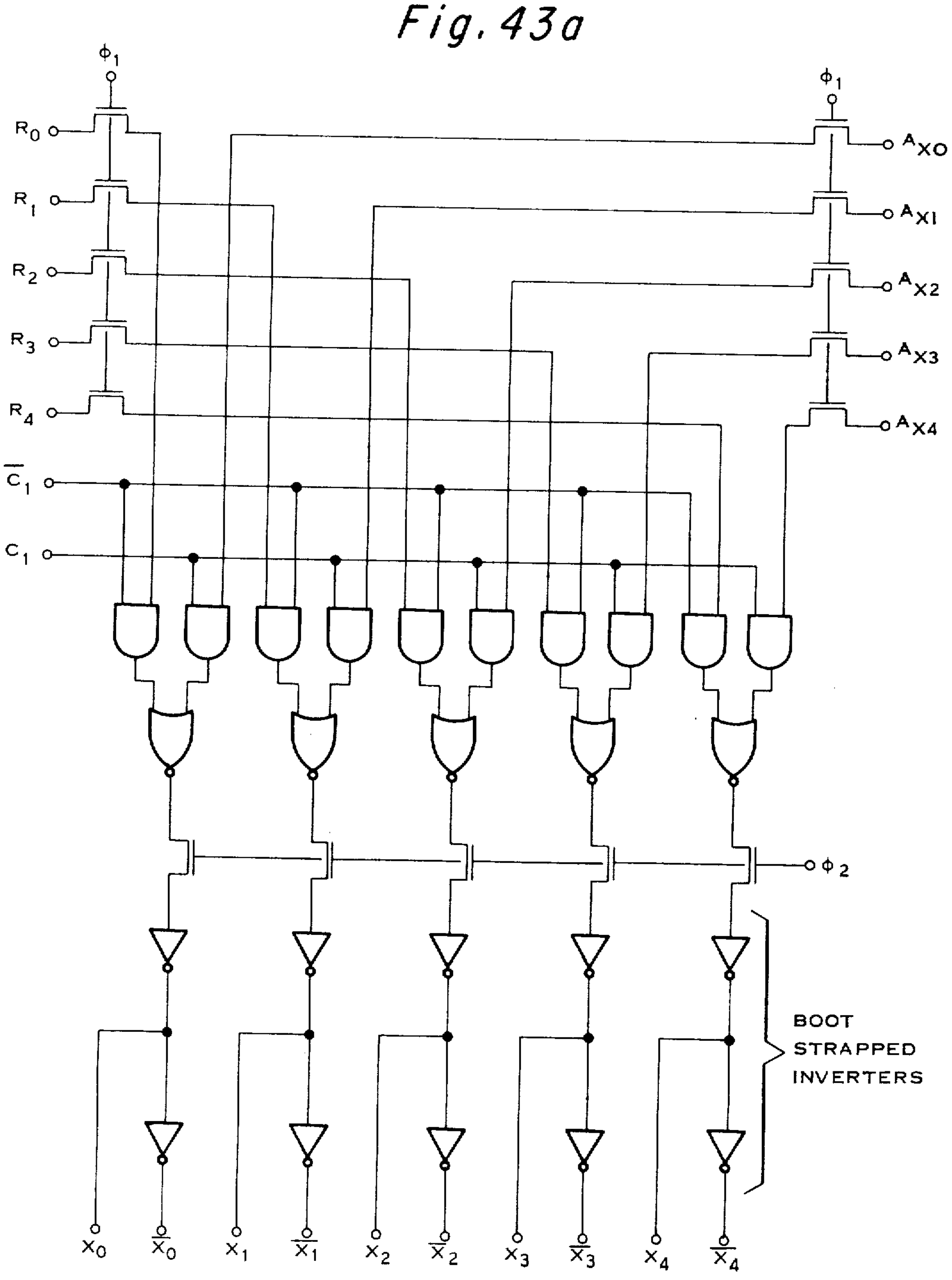
Figure 43B:
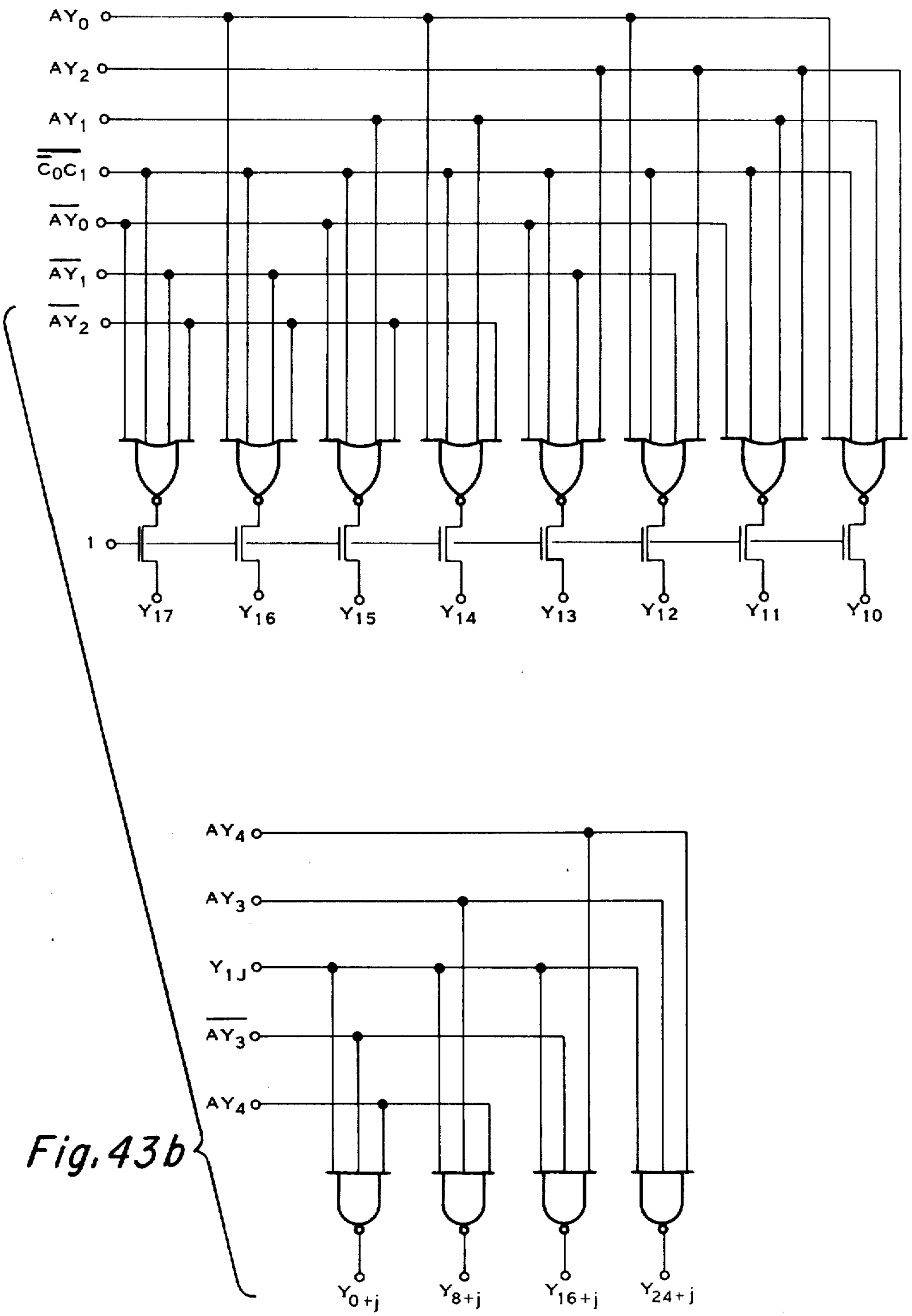

FIGS. 43*a* and 43*b* logically illustrate the X and Y address decode logic of the external memory.

Figure 44:
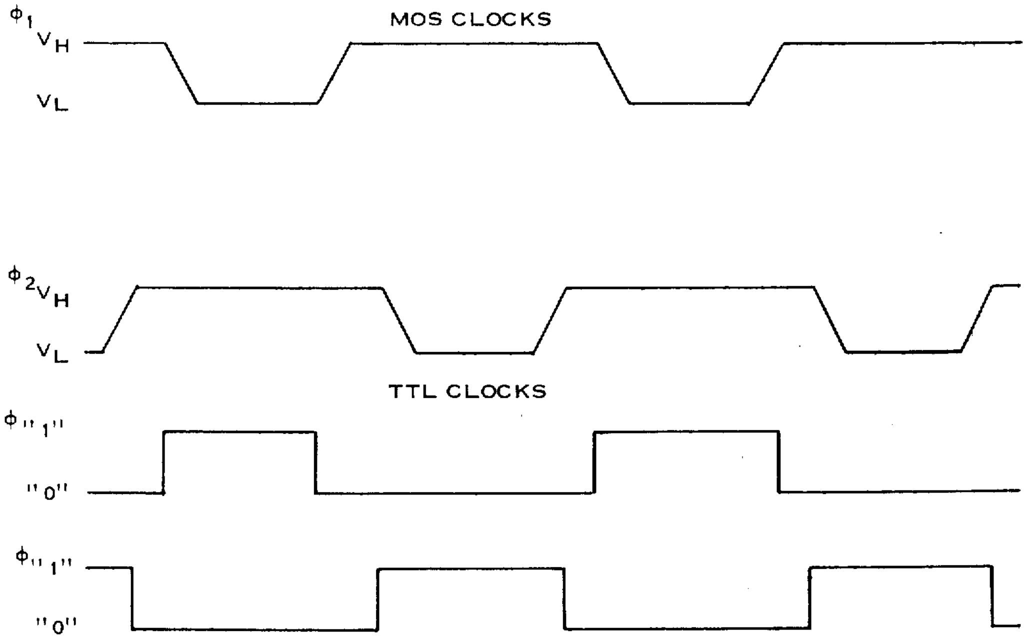
Figure 45:
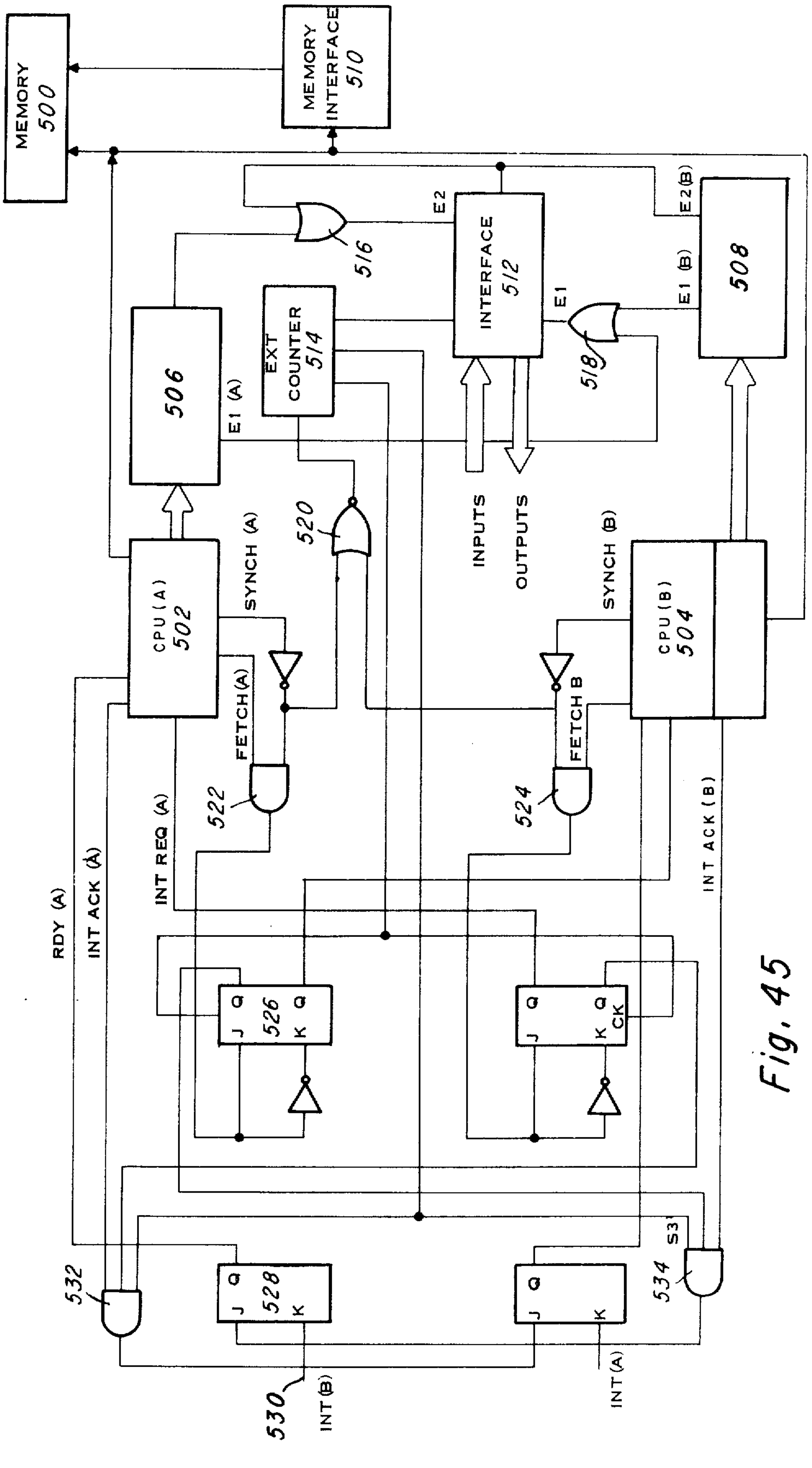

FIG. 44 illustrates typical clock waveforms that can be used in accordance with the present invention; and FIG. 45 illustrates an embodiment of the invention that incorporates two single chip central processing units in combination with common external memory elements.

The present invention is directed to a central processing unit (CPU) integrated on a single chip in combination with external RAM and ROM memory units. The invention will be described hereinafter first as it functions as a system. The functional units of the CPU will then be described. This description will include definition of the instruction set that may be utilized in conjunction with the CPU. For purposes of explanation, the CPU is functionally described as comprising a sequence and control logic unit, an arithmetic logic unit, and a CPU random access memory. These functional elements are interconnected by an 8-bit parallel bus. The various logic circuits associated with the sequence and control logic, the arithmetic logic unit, and the internal RAM, will then be described in detail, along with illustrative examples of operations for specific examples. Finally, the interface logic for interconnecting the CPU with the external memory will be described.

SYSTEM DESCRIPTION

Figure 1:
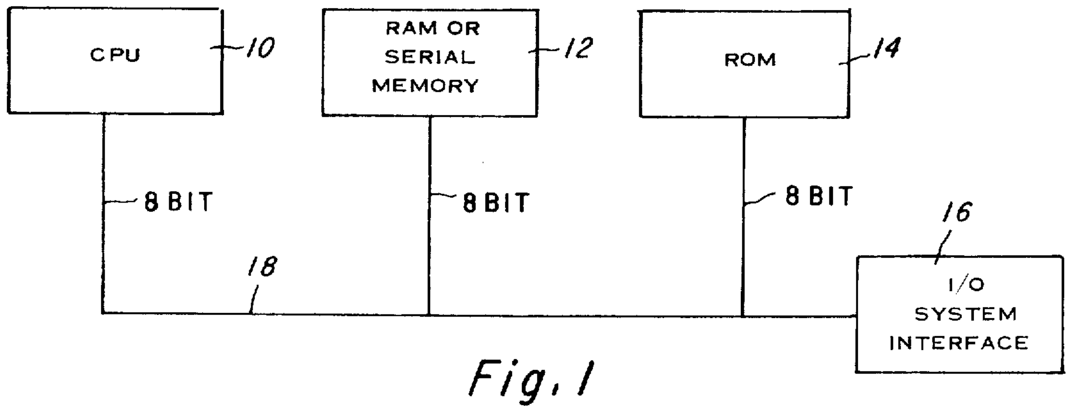
FIG. 1 is a functional block diagram illustrating a single chip central processing unit interconnected with external memory systems.

FIG. 1 illustrates in block diagram format a central processing unit 10, an external memory unit 12, and a read-only memory 14. These three units 10, 12, and 14 are interconnected by a common 8-bit parallel bus 18. An input/output system interface is indicated generally by block 16. This interface system enables external inputs and outputs to and from the CPU and memory unit 12.

In accordance with the present invention, the CPU 10 is integrated on a single chip. This has the advantage in that it enables fast execution time and a minimum number of leads necessary for interconnect to other elements of a computing system. The external memory 12 may be either a random access memory or a serial memory. As will be explained hereinafter with reference to the detailed description of FIG. 37, the logic of the external memory is designed so that either random access memory or a shift register type memory may be utilized.

The read-only memory (ROM) 14 is used in the system to store fixed subroutines or control programs. The CPU 10, memory 12, and read-only memory 14 are interconnected with each other and with the input-/output interface 16 by a common eight-bit parallel bus 18. On one phase of the clock, the CPU or memory will output data; on the other phase of the clock, the CPU and memory will accept an input.

CPU ORGANIZATION

Figure 2:
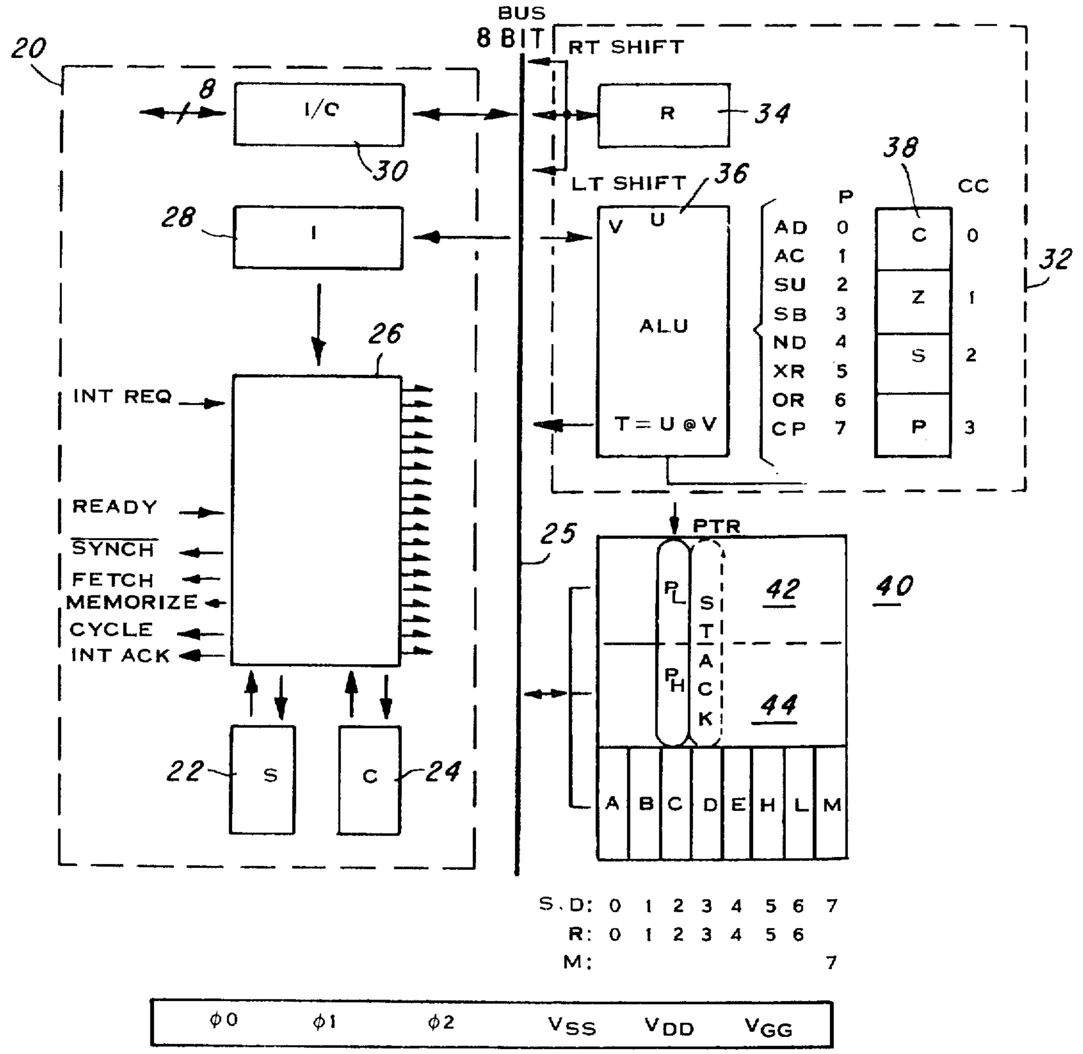
FIG. 2 is a functional block diagram of a one chip CPU which may be used in accordance with the present invention.

FIG. 2 is a functional block diagram of the CPU organization. The CPU consists basically of three blocks, the control decode 20, the ALU 32, and the internal RAM 40. The control section 20 controls CPU operation and synchronization such that communications between various blocks of the CPU may occur over the common 8-bit bus 25. The control section 20 includes a control decoder 26. This block has as inputs an interrupt request (INT REQ) and a ready (READY) signal. Outputs of the control decoder 26 include a $\overline{\text{SYNCH}}$, FETCH, CYCLE, interrupt acknowledge (INT ACK), and MEMORIZE signals. A master system timer 22, and a cycle timer 24 (which enables variable instruction lengths) are connected to the control decode block 26. An instruction register 28 also inputs information into the control decoder 26. The control decoder has 18 outputs which control the internal RAM, the ALU, and the system interface and external memory units. An input/output block 30 forms a part of the control section 20 and is interconnected to the internal bus 25. The detailed logic circuits associated with the various blocks of the control section 20 will be described with reference to FIGS. 8 – 15 hereinafter.

Block 32 generally depicts the ALU section of the CPU. The arithmetic logic unit includes a temporary storage register 34 which contains the shift right and shift left circuits. Block 36 refers generally to an eight-bit arithmetic unit. This unit can execute eight different functions, add, add with carry, subtract, subtract with borrow, AND, Exclusive OR, and compare. A code P corresponds to each of these arithmetic operations. As will be explained hereinafter with reference to the instruction set of the CPU, buts 5, 4, 3 of the instruction register contain binary information corresponding to these arithmetic operations. By way of example, subtract with borrow has a code P equal to 3. This would be a binary code of 011.

Block 38 represents the four arithmetic flags which indicate the status of data of an arithmetic operation. As may be seen, the four flags are carry (C), zero (Z), sign (S), and parity (P). The condition code (cc) corresponding to each of these condition flags is shown as 0, 1, 2, and 3, respectively. As understood by those skilled in the art, two bits of binary data may be used to uniquely select one of the four flags. The condition flag codes, and also the arithmetic operation codes P are shown in Table V hereinafter.

The internal RAM of the CPU is shown generally at 40. This RAM contains 26 eight-bit registers. Two of these registers are selected for program address. These two registers are indicated at 42 and 44, corresponding to the low order address bits ($P_L$) and the high order address bits ($P_H$) respectively. In combination, these two registers enable absolute 16-bit addressing of a location in memory. Using 16-bit memory addressing, it is possible to address up to 64K bytes of data in memory. The RAM also contains data registers A, B, C, D, E, H, L, and M'. Data register A is used as the accumulator. Registers, B, C, D, and E are general purpose registers, and registers H and L are combined and contain the location of memory address. Data register M' is used internally only. Fourteen of the data registers in the internal RAM define a seven-level last-in-first-out stack (STACK). This has the advantage in that it facilitates calling subroutines.

The detailed logic associated with the arithmetic unit 32 will be described in detail with reference to FIGS. 16 through 24. The detailed logic circuits associated with the internal RAM 40 will be explained with reference to FIGS. 25 through 29.

As will be explained hereinafter with respect to the instruction set of the CPU, one of the data registers, A, C, B, C, E, H, or L of the internal RAM 40 may be selected by source or destination codes in the instruction. Three bits of data are required to select one of the registers as a source or destination register. For example, to select register D, a binary coding of 011 (3) would be required. As mentioned previously, the data register M' is used only for internal operation of the CPU. Thus, a coding of seven; that is binary 111, is used in the present invention to refer to external memory.

Figure 3A:
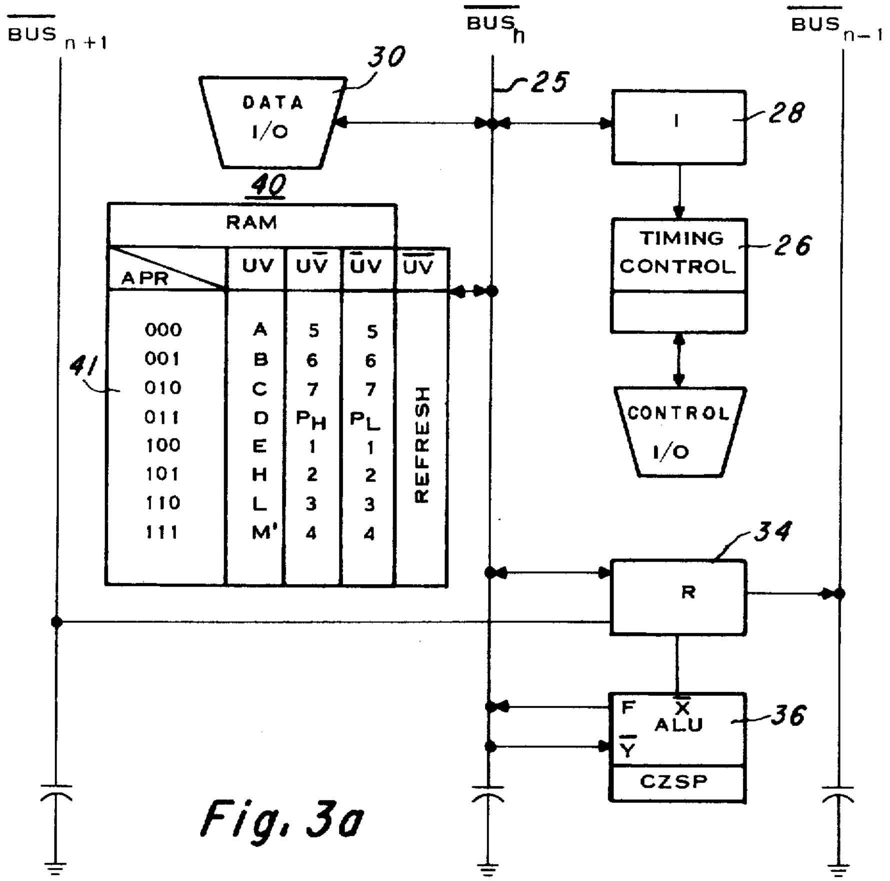

FIG. 3*a* is a block diagram showing the various interconnects to the internal bus 25 of the CPU. It may be seen that the instruction register 28, the internal RAM 40, storage register 34 and the arithmetic unit 36 all interconnect with the bus 25. Selection of the various registers of the internal RAM 40 is also illustrated at 41. The eight-bit registers of the internal RAM generally are of three types. There are general purpose data registers, A, B, C, D, E, H, L, and M', high order 8-bit address registers ($P_H$) and low order 8-bit registers ($P_L$). In other words, 16 of the 8-bit registers are used to define address storage registers. An eight-bit low order register combined with an 8-bit high order address register provide means in hardware for absolutely addressing a 16-bit memory address. Two of these 16 8-bit address registers are selected by an up-down counter to function as the program address register. These are illustrated at 41 as $P_H$ and $P_L$. The other 14 registers form a seven level last-in-first-out pushdown STACK. Whether one of the general purpose registers, a high order address register, or a low order address register is selected for access to the bus 25 depends on the binary coding of input signals U and V. Which level of the registers is selected depends upon the address register coding. By way of example, if the input signals U and V are both logic 1, and the address register coding is 010, general purpose register C will be selected. In another example, consider U to be a logical 1 and $\overline{V}$ to be a logical 1, and the address register to have a coding of 001. Such a situation would result in level six of the high order address bits being selected. Similarly, if the signal $\overline{U}$ is a logical 1 and V is a logical 1 and the address register coding is 011, the low order address register $P_L$ would be selected. For the situation where $\overline{U}$ and $\overline{V}$ are both logical 1's; that is, for the situation where none of the data address registers of the internal RAM are selected for operation, the one row of the dynamic random access memory cells are automatically refreshed. This will be described in more detail with reference to FIG. 25.

Figure 3B:
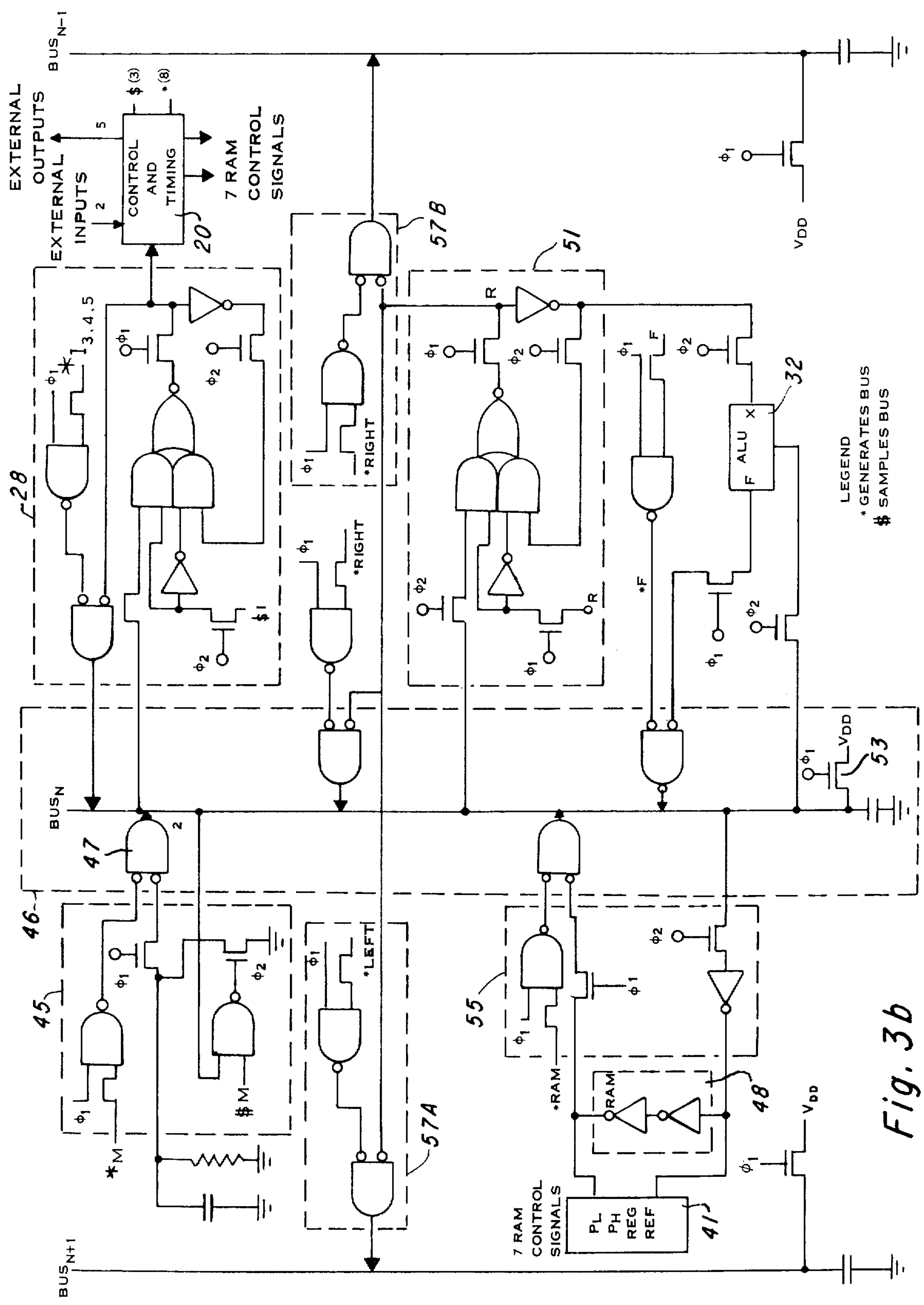

FIG. 3*b* illustrates the logic gates of the CPU bus interconnections illustrated in FIG. 3*a*. Block 46 refers generally to one of the eight internal precharged buses referenced generally by the numeral 25 in FIG. 3*a*. The precharge enables a large capacitance to be driven in an extremely fast time. During phase 1 of the clock, the bus is precharged to a negative voltage level (assuming P channel type insulated gate field effect transistors) by transistor 53. During phase 2 of the clock, the bus 46 will be conditionally discharged. Inputs to the bus are generated by control signals prefaced with an asterisk (*). An example of such a signal is the control signal *M which generates the bus from the input/output buffer 45 of the CPU. The reference symbol $ indicates signals which sample the bus and allow data to be sampled into the various sections of the CPU. By way of example, a bus signal is generated by the NOR gate 47. For purposes of explanation, positive logic will be used in the examples described hereinafter. Thus, when the signal *M is a logic 1, the input signal on the input/output 39 will be transferred to the gate 47 when phase 1 of the clock becomes a logic 0. During phase 2 of the clock, the signal will be gated onto the bus 46. If the signal $M becomes a logical 1, the bus will be sampled and the output thereof transferred to the input/output 39.

Other sections which are connected to the bus include the instruction register shown generally at 28, which is operated by control signals *I and $I The inputs $*I_{3,4,5}$ enable bits 3, 4, and 5 of the instruction register (I) to be transferred to the bus when a restart instruction is executed. Operation of the instruction register will be described in detail hereinafter with reference to FIG. 10.

The instruction register is coupled to the control and timing section 20 and generates the various control signals that control the RAM, the arithmetic unit and the bus * terms and $ terms. The control and timing block receives two input signals, interrupt request (INT REQ) and ready (READY). Five output signals include SYNCH, FETCH, CYCLE, interrupt acknowledge, (INT ACK), and MEMORIZE. Eighteen outputs are generated by the control and timing section 20. Seven of these outputs are RAM control signals, three are $; i.e., sample enable signals, and eight are * or generate enable signals. Logic operation of the control and timing section 20 will be described hereinafter with reference to FIG. 7.

The bus is also coupled to a storage register (R), one bit of which is illustrated at 51. A temporary storage register goes directly on the bus and enables a right or left shift, or provides an input to the arithmetic unit 32. The logic performing a shift left and a shift right as illustrated generally by the blocks 57A and 57B respectively. The temporary storage register is described hereinafter with respect to FIG. 18.

An arithmetic unit 32 receives an output both from the temporary storage register 51 and the bus 46. When a valid result from an arithmetic operation is contained in the arithmetic unit, the signal *F will be a logic 1. This signal will generate the bus from the arithmetic unit. Operation of the arithmetic unit logic will be described in detail hereinafter in the detailed description of FIGS. 19 and 21.

The internal random access memory of the CPU also samples the bus. On phase 2 of the clock, the bus is sampled and depending on the status of two control signals, U and V, to the RAM, either register $P_L$ or $P_H$ (the low order program address bits or the high order program address bits respectively), the general purpose data registers, or refresh is selected. A typical RAM storage cell is illustrated at 48. When one of the data registers of the RAM is not being accessed, the RAM will automatically refresh through controls from the control section 20. The signal *RAM generates the bus from a RAM storage cell. The circuit cell and transistor logic of a typical RAM storage cell 48 will be described with reference to FIGS. 4*a* and 4*b*. Operation of the RAM will be described in detail hereinafter with respect to FIG. 25.

One bit of the arithmetic unit 32 is illustrated in FIG. 5. The arithmetic unit comprises inverters, shown generally at 59, NAND gates 60, NOR gates 62, complex gates 61, exclusive OR gates 58, and MOS transfer gates 63, interconnected in such a manner that in response to selected control signals, eight separate arithmetic operations may be executed. Operation of the logic to effect arithmetic operations add, subtract, and exclusive OR is described hereinafter in the detailed description of FIGS. 22, 23, and 24, respectively.

FIG. 4*a* is a schematic drawing of an insulated gate field effect transistor random access memory cell 48 that may be used in accordance with the present invention. In operation, the WRITE line 15 is activated and IGFET device 17 becomes conductive resulting in the information present at the IN line 19 being transferred to capacitance 21. When the WRITE means becomes inactive, the information previously transferred to the capacitance 21 remains stored for a period of time depending only upon the capacitance-leakage resistance product of the storage node. This time constant will not be less than on the order of 1 millisecond for conventionally fabricated insulated gate field effect transistor devices under normally expected environmental conditions. The IGFET device 23 will be either conductive or non-conductive dependent on the state of the information stored. When the READ means 27 is activated the IGFET device 29 becomes conductive and consequently the state of the information present at the capacitance 21 may be determined by measuring the presence or absence of the conduction path from output line 31 to $V_{SS}$ through devices 23 and 29.

Data input line 19 may be activated by a normal ratio type IGFET element or precharge/discharge type of device.

The data output line 31 may go to a current sensing device or become the driver path of an IGFET ratio device with a discharge path in a precharge/discharge/IGFET element.

Figure 4B:
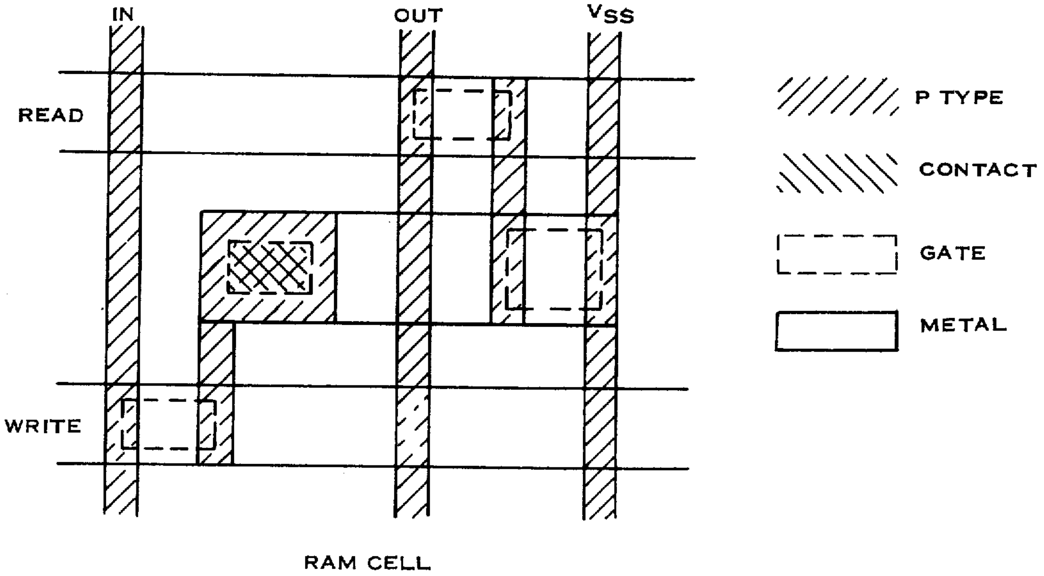

FIG. 4*b* shows a plan view of an insulated gate field effect transistor layout for the schematic of FIG. 4*a*. The devices may be formed using conventional photolithigraphic masking and etching techniques typically used in fabrication of insulated gate field effect transistor circuits.

FUNCTIONAL ORGANIZATION OF THE CPU

The CPU can be divided generally into four sections: a data section, an address section, a control section, and an arithmetic logic unit. The control section is shown generally by the block 20 in FIG. 2, while the data and address sections are labelled 40. The data and address sections are defined by data registers which are included as a part of the internal RAM of the CPU. In addition, block 32, refers generally to the ALU section of the CPU.

As described previously, the internal RAM of the CPU contains 24 8-bit registers. Seven of these registers are data registers, including an accumulator labelled A and four general purpose registers, B, C, D, and E, and a memory register labelled H,L. The general purpose registers, B, C, D, and E can be used as index registers or secondary accumulators by programmer subroutine definition. All seven of these registers may be arithmetically combined with the accumulator, including the memory address register H,L. As will be explained in more detail hereinafter with respect to the CPU instruction set, the desired source and destination (S, D) is specified by 3 bits of the instruction to select one of the data registers A, B, C, D, H, or L or external memory. The binary codes for these various registers are shown in Table V.

The address section of the CPU is defined by 16 of the 8-bit data registers of the internal RAM. A pointer from an up-down counter selects two of these data registers to serve as a program address register or program counter P. The remaining fourteen registers define a seven level last-in-first-out program address stack (STACK). The purpose of the STACK is to provide means in hardware for accommodating absolute 16-bit addressing and subroutine address storage for 64K byte memory system.

In addition to the data and address registers, an instruction register (I) and a temporary storage register (R) are also accessible on the internal bus of the CPU. The control section of the CPU is based on sequential use of the parallel 8-bit bus between internal functional elements. To facilitate this control, there is a state counter 22 (FIG. 2) having four states, S1, S2, S3, and S4 and a cycle counter (C) labelled 24, having 1, 2, 3 cycles. The CPU is characterized as having two control states, WAIT and STOP. WAIT is induced by the control input READY to the control decoder 26. STOP is induced by the command HALT in either program or interrupt mode. Both of these control states break the normal chain of S1, S2, S3, S4, S1 circulation. The instruction register, INTERRUPT and READY inputs, state counter, and cycle counter are combined in the programmable control decoder 26 to mechanize controls which operate the arithmetic unit 32, the RAM 40, bus 25, and excite the state and cycle counters 22 and 24.

CPU INSTRUCTION SET

The CPU is designed to execute five separate classes of instructions namely, moves, arithmetic, jump, input/output and control. All instructions execute in 1, 2, or 3 machine cycles. Each machine cycle consists of one fetch and one execute. Each fetch and execute requires 5 microseconds for execution. The instruction word format is shown in Table I. As may

TABLE I

| Instruction Class | $I_7I_6^{TJ}$ | $I_5I_4I_3^T$ | $I_2I_1I_0$ |
|---|---|---|---|
| Move | 3 | D | 5 |
|  | 0 | D | 6 |
| Arithmetic | 2 | P | 5 |
|  | 0 | P | 4 |
|  | 0 | P | 2 |
| Jump | 1 | tcc | C10 |
|  | 0 | tcc | C11 |
| Input/Output | 1 | X | xx1 |
| Control | 0 | X | 00x |
|  | 3 | 7 | 7 |
| RST | 0 | a | 101 |

be seen, an instruction comprises 8 bits, $I_7$ through $I_0$. With reference to Table I, in the first example of a move instruction, bits $I_7$ and $I_6$ must both be 1's to form a binary 3. Bits $I_5$, $I_4$, and $I_3$ include the binary code of D. This refers to the destination code of one of the seven data registers in the internal RAM 40, that is, data registers A, B, C, D, E, H, L, or external memory. Table V gives the coding required for bits $I_5$, $I_4$, and $I_3$ to specify one of these registers. For example, with reference to Table V, the code 001 specifies the B register. Bits $I_2$, $I_1$ and $I_0$ of the instruction specify the source code of the required register.

With respect to an arithmetic instruction, the P in the column for bits $I_5$, $I_4$, and $I_3$ of the instruction refers to arithmetic operand codes. These three bits may be coded to select one of eight arithmetic operations that may be performed. These codings and the corresponding arithmetic operation are also shown in Table V. By way of example, a coding of 010 would refer to a subtract operation. An example of the logic associated with performing a subtract operation in response to such an instruction will be described hereinafter with reference to FIG. 23. An X in the column $I_5$, $I_4$, $I_3$ refers to a "don't care" situation. These bits may be used by the programmer as desired.

FIG. 6 graphically illustrates an instruction map of the instruction set that may be utilized in accordance with the CPU of the present invention. With reference to FIG. 6, it may be seen that the instruction map includes four quadrants. These quadrants are respectively identified by the binary coding of instruction bits $I_6$ and $I_7$. For example, the upper righthand quadrant labelled move (3DS) corresponds to instruction bits $I_6$ and $I_7$, both being binary 1's; hence, the 3. Similarly, the upper lefthand quadrant of the map corresponds to a binary 2, which results from instruction bit $I_7$ being a binary 1 and instruction bit $I_6$ being a zero. It may be seen that each quadrant of the instruction map is 8 bits by 8 bits square. With respect to the move instructions in the upper righthand quadrant, the vertical registers 0 through 7 labelled $I_{2, 1, 0}$ respectively correspond to source (S) registers, such as data registers A, B, C, D, E, H, L, or M' of the RAM of the CPU. The source destination S may take on any of the values 0 through 7. The horizontal axis of the quadrant is labelled $I_{5,4,3}$ and may take on any of the values 0 through 7 as the destination (D) of a move instruction. Since the source and destination locations of a move instruction may respectively vary from 0 to 7, the entire upper righthand quadrant is required with a move class of instructions. Additionally, in the lower lefthand quadrant identified by $I_7$ and $I_6$, both being logic 0, there is a move instruction designated as 0D6. The D may take on any of the values 0 through 7 and thus requires one entire row in the lower lefthand quadrant. It is noted, however, that the source destination code is a binary 6. Thus, only one 8-bit unit is required for this instruction. This, coupled with the 8 8-bit inputs required for the class of move instructions in the upper right-hand quadrant of the instruction map, yield a result that the move class of instructions occupy 9/32nds of the instruction map, there being 32 8-bit blocks illustrated in the instruction map.

With respect to the jump class of instructions, the tcc in columns $I_5$, $I_4$ and $I_3$ refers to a conditioned true jump. For example, if the code cc (which is one of the flags carry, zero, sign, or parity, associated with the ALU section of the CPU) is of a value equal to t, a jump will occur. The binary codes for the respective condition flag codes are also shown in Table V.

Again with reference to the move class of instruction, the moves are specified by a 3-bit source code S and a 3-bit destination code D; hence, it is possible to move from register to register, from memory to register, and from register to memory. Memory, of course, refers to the contents of the location specified by the memory address register H,L. In addition to the above operation, a separate instruction is provided for load immediate or load literal. This instruction codes and executes in two bytes. The first byte specifies only destination code; the second byte is the literal source data.

The arithmetic codes are similar to the move codes occuping 5/16 of the instruction map shown in FIG. 6, except that the three-bit destination field is instead a 3-bit op-code field P. The destination is implied to be the accumulator A. The source is specified in the same manner as above for the move instructions, including the register, memory and immediate formats. The eight operation codes are add (AD), add with carry (AC), subtract (SU), Subtract with borrow (SB), and (ND), or (OR), exclusive or (XR), and compare (CP). In all of the arithmetics, except compare, the accumulator is combined with the source and the result replaced in the accumulator.

In addition to the above arithmetics, shift right circular (SRC) and shift left circular (SLC) are provided in separate codes. The shift instructions operate on the accumulator and the carry flag and provide a mechanism for provisional branching of specific bits of the accumulator.

The arithmetic, logical, and shift instructions all implicitly update the four hardware flags associated with ALU. These flags are used by conditional jump instructions as the condition code. Compare updates the flags like subtract.

The jump instructions occupy 3/8ths of the instruction map in FIG. 6. One 3-bit field is used to distinguish eight different types of jumps. Another 2-bit field of the instruction is used to select a particular condition code from the four hardware flags. The jump can be conditional or unconditional. If conditional, it can be conditional true or conditional false. Finally, it can be a subroutine or not subroutine jump. For all of the above jumps, the address is taken as the literal 2 bits immediately following the jump instruction. If the jump is executed, these two bytes are inserted in the program counter and the program jumps to that location. If a subroutine jump is executed, the previous program counter is stored into the program address stack. In addition to the above jumps, a separate code is used to allow a return from subroutine jumps. The return can also be conditional or unconditional with the true or false condition. Of course, the return address is the last program counter address stored into the program address stack. Since the program address stack is seven levels deep, nested subroutine software becomes a convenient, efficient and effective alternative to indirect addressing.

Input/output instructions occupy 1/8th of the instruction map shown in FIG. 6. The external instruction contains a 5 bit don't care which has no meaning to the internal operation of the CPU. It is for the programmer's utilization and the peripheral hardware designer's design of external op codes to be executed by the peripheral system. The external instruction does nothing more than put out the internal instruction and accumulator registers into external latches. This is used to create an efficient command and control system for the communication for peripherals to and from the CPU and peripherals to and from memory. The input instruction is the subset of the external instruction with only three "don't cares" remaining. In this case, the CPU loads the internal accumulator register with selected data. Hence, there is a direct hardware provision for input and output of eight bit characters under program control.

The control instructions occupy very little of the instruction map, but are very important in terms of the operator and programmer convenience they represent. The 3 important control instructions are HALT, RESTART and CONTINUE. Of these, only restart requires multiple codes. A 3-bit don't care in the restart op-code is loaded into the three highest order bits of the program address register. Hence, there are actually eight restarts to eight distinct locations at 8K byte increments around the 64K byte memory system. All of these control instructions are available to be used under normal program control. However, in practice, their use in interrupt mode is much more significant.

Insertion of an INTERRUPT instruction into the normal stream of program execution can be accomplished very simply. First, the INTERRUPT key (or more generally, INTERRUPT peripheral) must encode the desired instruction onto the 8-bit data selector. Secondly, it must raise the INTERRUPT line which is a direct input to the instruction control decoder. The decoder will then recognize the INTERRUPT at the completion of the current instruction execution.

Halt and continue do not disturb the operation of the executing program. Restart, however, is the direct abortion of the current program flow. It is not a subroutine call; hence, any desired protection of the current program with respect to desired recognition of INTERRUPTS must be handled by the INTERRUPT program at the location indicated by the restart command code. A simple restart program would store out the current contents of all the CPU registers and store the return address of a program which would recover them. Then, on completion of servicing the INTERRUPT, the INTERRUPT program would terminate and return to the normal program flow. Both hardware (fast) and software (slow) means of priority INTERRUPT recognition are feasible. The hardware scheme would use an external priority encoder to select the highest order INTERRUPT present. The software scheme would involve a software decision tree at the location of the restart command.

Table II includes a list of the CPU instructions of the present invention. Instructions include register to register load instructions, memory reference load instructions, load immediate instructions, arithmetic and logical register instructions, arithmetic and logical memory reference instructions, arithmetic and logical immediate instructions, shift instructions, jump instructions, subroutine instructions, return instructions, input/output instructions, restart instructions, and halt instructions.

Table III includes the CPU arithmetic/logical Mnemonics and condition flags.

Table IV includes instruction mnemonics and register mnemonics of the CPU.

Table V includes the instruction coding of the CPU.

The truth table of the instruction set is shown in Table VI. In the truth table, a horizontal row represents time and the input/output or internal nodes are printed in a column. Terms printed are listed at the start of the truth table. The instruction table illustrates the changes in the internal registers, one location of the program stack, and the arithmetic/logical flags for each type of instruction. The number of bytes or cycles per each instruction is shown by the number of lines printed for an instruction. A row is printed at the end of the cycle. The inputs, outputs or registers printed in the instruction truth table are listed below. Names listed from top to bottom are respectively the names from left to right in the tables. For the instruction set, there is listed the following:

Instruction Set
Ready
Interrupt
Execute
State 1
State 2
State 3

TABLE II

| MACHINE INSTRUCTIONS | |
|---|---|
| Register to Register Load Instruction: (49 Instructions) | |
| $Lr_dr_s$ | $(r_d) \leftarrow (r_s)$ Load register $r_d$ with the contents of $r_s$. The contents of $r_s$ remains unchanged. |
| Memory Reference Load Instruction: (15 Instructions) | |
| $Lr_dM$ | $(r_d) \leftarrow (m)$ Load register $r_d$ with the contents of the memory location m addressed by registers H and L. The contents of m remains unchanged. |
| $LMr_s$ | $(m) \leftarrow (r_s)$ Load the memory location m addressed by registers H and L with the contents of register $r_s$. The contents of $r_s$ remains unchanged. |
| LM,B1 | (m)  (B1) Load the memory location m addressed by H and L with B1. |
| Load Immediate Instruction: (7 Instructions) | |
| $Lr_d$,B1 | $(r_d) \leftarrow (B1)$ Load B1 into the register $r_d$. |
| Arithmetic and Logical Register Instruction: (56 Instructions) | |
| @$r_s$ | $(A) \leftarrow (A)$ @ $(r_s)$ Results of the arithmetic or logical operation @ between the A register and the $r_s$ register are stored in the A register. Status of the operation is indicated by the condition flags. |
| Arithmetic and Logical Memory Reference Instruction: (8 Instructions) | |
| @M | $(A) \leftarrow (A)$ @ (m) Results of the arithmetic or logical operation @ between the A register and the memory location m are stored in the A register. Status of the operation is indicated by the condition flags. |
| Arithmetic and Logical Immediate Instruction: (8 Instructions) | |
| @B1 | $(A) \leftarrow (A)$ @ (B1) Results of the arithmetic or logical operation @ between the A register and B1 are stored in the A register. Status of the operation is indicated by the condition flags. |
| Shift Instruction: (2 Instructions) | |
| SLC | $(A_{m+1}) \leftarrow (A_m), (A_0) \leftarrow (A_7), (C) \leftarrow (A_7)$ Shift the contents of the A register left one bit. Shift $A_7$ into $A_0$ and the carry flag. The other flags are not changed. |
| SRC | $(A_m) \leftarrow (A_{m+1}), (A_7) \leftarrow (A_0), (C) \leftarrow (A_0)$ Shift the contents of the A register right one bit. Shift $A_0$ into $A_7$ and the carry flag. The other flags are not changed. |
| Jump Instruction: (9 Instructions) | |
| JMP,B1,B2 | $(P) \leftarrow (B2), (B1)$ Jump unconditionally to the instruction located in memory location B2,B1. |
| JFc,B1,B2 | $(P) \leftarrow (B2), (B1)$ if cc=0; $(P) \leftarrow (P)+3$ if cc=1. If the content of the condition flag is zero jump to memory location addressed by B2,B1; otherwise, execute the next instruction in sequence. |
| JTc,B1,B2 | $(P) \leftarrow (B2), (B1)$ if cc=1; $(P) \leftarrow (P)+3$ if cc=0. If the content of the condition flag is one jump to memory location addressed by B2,B1; otherwise, execute the next instruction in sequence. |
| Subroutine Instructions: (9 Instructions) | |
| CAL,B1,B2 | $(Stack) \leftarrow (P)+3, (P) \leftarrow (B2),(B1)$ Transfer the next sequential program address into the pushdown stack. The new program address is the memory location addressed by B2,B1. |
| CFc,B1,B2 | $(Stack) \leftarrow (P)+3, (P) \leftarrow (B2),(B1)$ if cc=0; $(P) \leftarrow (P)+3$ if cc=1. Transfer the next sequential program address into the pushdown stack and set the program address to B2,B1 if the condition flag is zero. Otherwise, execute the next instruction in sequence. |
| CTc,B1,B2 | $(Stack) \leftarrow (P)+3, (P) \leftarrow (B2),(B1)$ if cc–1; $(P) \leftarrow (P)+3$ if cc=0. Transfer the next sequential program address into the pushdown stack and set the program address to B2,B1 if the condition flag is one. Otherwise, execute the next instruction in sequence. |
| Return Instructions: (9 Instructions) | |
| RET | $(P) \leftarrow (Stack)$ Return to the instruction in the memory location last transferred into the pushdown stack. |
| RFc | $(P) \leftarrow (Stack)$ if cc=0; (P)=(P)+3 if cc=1. Return to the instruction in the memory location last transferred into the pushdown stack if the condition flag is zero. Otherwise, execute the next instruction in sequence. |
| RTc | $(P) \leftarrow (Stack)$ 9f cc=1; (P)+3 if cc=0. Return to the instruction in the memory location last transferred into the pushdown stack if the condition flag is one. Otherwise, execute the next instruction in sequence. |
| Input/Output Instruction: (32 Instructions - 8 are Inputs) | |
| EXT | $(A') \leftarrow (A)$ The contents of the A register is available to the A' register. The A' register will remain unchanged until the next external instruction. |
| INP | $(A') \leftarrow (A)$; $(A) \leftarrow$ (Date Inputs) The contents of the A register is available to the A' register. The A' register will remain unchanged until the next external instruction. The data input lines will be sampled during the data input time and stored in the A register. |
| Restart Instruction: (8 Instructions) | |
| RST | $(P_{15}P_{14}P_{13}) \leftarrow (I_5I_4I_3)$ The contents of the instruction register bits five, four, and three are shifted into the upper program address bits. |
| Halt Instruction: (17 Instructions) | |
| Halt | The activity of the processor is suspended. The contents of all registers and the memory is unchanged. |

TABLE III

ARITHMETIC/LOGICAL MNEMONICS

| | |
|---|---|
| AD* | Add the contents of * to the contents of the A register, and store the result in the A register. See condition flags** |
| AC* | Add the contents of * and the contents of the carry flag to the A register and store the result in the A register. See condition flags.** |
| SU* | Subtract the contents of * from the contents of the A register, and store the result in the A register. See condition flags.** |
| SB* | Subtract the contents of * and the contents of the carry flag from the contents of the A register, and store the result in the A register. See condition flags.** |
| ND* | Store the result of the logical "and" of the contents of * and the contents of the A register in the A register. See condition flags.** |
| XR* | Store the result of the logical "exclusive or" of the contents of * and the contents of the A register in the A register. See condition flags.** |
| OR* | The result of the "inclusive or" of the contents of * and the contents of the A register are stored in the A register. See condition flags.** |
| CP* | The contents of * is subtracted from the contents of the A register. The A register and * remains unchanged. See condition flags.** |
| * | * can be a source register, a memory reference or byte one of an arithmetic immediate instruction. |
| ** | The condition flags indicate status of an arithmetic or logical operation. |
| Condition Flags | |
| C | The C flag is the carry or borrow flag. It will be set if a carry (AD,AC) or a borrow (SU,SS,CP) results from an arithmetic operation. For the logical operations (ND,XR, OR), the carry flag is reset. The carry flag also indicates the state of the most significant bit in the A register after a shift right instruction, and the least significant bit of the A register after a shift left instruction. |
| Z | The Z flag is set if the results of an arithmetic or logical operation (AD,AC,SU,SS,ND,XR,OR,CP) is equal to zero. |
| S | The sign flag S reflects the state of bit seven of the A, register after an arithmetic or logical operation. (AD,AC,SU,SB,ND, XR,OR,CP). |
| P | The parity flag indicates the parity of the A register after an arithmetic or logical instruction (AD,AC,SU,SB,ND,XR,OR, CP). If the A register contains an odd number of one bits, the parity flag is set. |

TABLE IV

INSTRUCTION MNEMONICS

| Symbols | |
|---|---|
| B1,B2 | Byte one and byte two of data following instruction. |
| $r_s$, $r_d$ | One of the following source resistors $r_s$ or destination registers $r_d$:A,B,C,D,E,H,L. |
| m | Memory location indicated by the contents of registers H and L. |
| @ | One of the following arithmetic or logical operations: AD,AC, SU,SB,ND,XR,OR,CP. |
| c or cc | One of the following condition flags: C,Z,S,P |
| ( ) | Contents of location or register. |
| $A_m$ | Bit m of the A register |
| P | Program address counter |
| Stack | Pushdown stack-seven levels of stored program address: |

REGISTER MNEMONICS

| | |
|---|---|
| A | For arithmetic or logical instructions, the A register is used as an accumulator. Programmed data transfers into or out of the computer are made through the A register. |
| B,C,D,E | General purpose registers. |
| H,L | The H and L registers are used respectively as the most significant and least significant bytes of memory address when executing a memory reference instruction. When the H and L registers are not used for memory reference, they may be used as general purpose registers. |

TABLE V

| INSTRUCTION CODING | | | | |
|---|---|---|---|---|
| Instruction | Code | | | Cycles |
| $Lr_dr_s$ | 11 | d | s | 1 |
| $LMr_s$ | 11 | 111 | s | 2 |
| LM | 00 | 111 | 110 | 3 |
| $Lr_d$ | 00 | d | 110 | 2 |
| @ $r_s$ | 10 | p | s | 1 |
| @ M | 10 | p | 111 | 2 |
| @ | 00 | p | 100 | 2 |
| JMP | 01 | XXX | 100 | 3 |
| JTc | 01 | 1cc | 000 | 3 |
| JFc | 01 | 0cc | 000 | 3 |
| CAL | 01 | XXX | 110 | 3 |
| CTc | 01 | 1cc | 010 | 3 |
| CFc | 01 | 0cc | 010 | 3 |
| RET | 00 | XXX | 111 | 1 |
| RTc | 00 | 1cc | 011 | 1 |
| RFc | 00 | 0cc | 011 | 1 |
| SLC | 00 | XX0 | 010 | 1 |
| SRC | 00 | XX1 | 010 | 1 |
| Symbol | Code | | | Cycles |
| EXT | 01 | XXX | XX1 | 2 |
| INP | 01 | 00X | XX1 | 2 |
| RST | 00 | a | 101 | 2 |
| HALT | 00 | XXX | 00X | 1 |
| | 11 | 111 | 111 | |

Source and Destination Codes (s and d):

TABLE V-continued

| INSTRUCTION CODING | | | | |
|---|---|---|---|---|
| Instruction | Code | | | Cycles |
| $Lr_dM$ | 11 | d | 111 | 2 |
| | 000 | A Register | | |
| | 001 | B Register | | |
| | 010 | C Register | | |
| | 011 | D Register | | |
| | 100 | E Register | | |
| | 101 | H Register | | |
| | 110 | L Register | | |
| | 111 | Memory Data | | |
| Operand Codes (p) (bits $I_5I_4I_3$) | | | | |
| | 000 | AD | Add | |
| | 001 | AC | Add with carry | |
| | 010 | SU | Subtract | |
| | 011 | SB | Subtract with borrow | |
| | 100 | ND | And | |
| | 101 | XR | Exclusive-or | |
| | 110 | OR | Inclusive-or | |
| | 111 | CP | Compare | |
| Condition Flag Codes (cc): | | | | |
| | 00 | Carry | | |
| | 01 | Zero | | |
| | 10 | Sign | | |
| | 11 | Parity | | |
| Restart Code (a): | | | | |
| The restart code selects the high order address bits. | | | | |

TABLE VI

INSTRUCTION SET

| | RDY | INT | EX | STA. 1234 | INPUT 76543210 | INST. 76543210 | A REG. 76543210 | B REG. 76543210 | C REG. 76543210 | D REG. 76543210 | E REG. 76543210 |
|---|---|---|---|---|---|---|---|---|---|---|---|
| 0 | 0 | 0 | 0 | 0000 | 00000000 | 00000000 | 00000000 | 00000000 | 00000000 | 00000000 | 00000000 |
| 1 | 1 | 1 | 0 | 1000 | 00000000 | 00000000 | 00000000 | 00000000 | 00000000 | 00000000 | 00000000 |
| 2RST | 1 | 0 | 0 | 1000 | 00011101 | 00011101 | 00000000 | 00000000 | 00000000 | 00000000 | 00000000 |
| 3 | 1 | 0 | 0 | 1000 | 00001000 | 00011101 | 00000000 | 00000000 | 00000000 | 00000000 | 00000000 |
| 4ADA | 1 | 0 | 0 | 1000 | 10000000 | 10000000 | 00000000 | 00000000 | 00000000 | 00000000 | 00000000 |
| 5LBM | 1 | 0 | 0 | 1000 | 11001111 | 11001111 | 00000000 | 00000000 | 00000000 | 00000000 | 00000000 |
| 6 | 1 | 0 | 0 | 1000 | 00100100 | 11001111 | 00000000 | 00100100 | 00000000 | 00000000 | 00000000 |
| 7INP | 1 | 0 | 0 | 1000 | 01000001 | 01000001 | 00000000 | 00100100 | 00000000 | 00000000 | 00000000 |
| 8 | 1 | 0 | 0 | 1000 | 01010001 | 01000001 | 01010001 | 00100100 | 00000000 | 00000000 | 00000000 |
| 9RFP | 1 | 0 | 0 | 1000 | 00011011 | 00011011 | 01010001 | 00100100 | 00000000 | 00000000 | 00000000 |
| 10SRC | 1 | 0 | 0 | 1000 | 00001010 | 00001010 | 10101000 | 00100100 | 00000000 | 00000000 | 00000000 |
| 11JMP | 1 | 0 | 0 | 1000 | 01000100 | 01000100 | 10101000 | 00100100 | 00000000 | 00000000 | 00000000 |
| 12 | 1 | 0 | 0 | 1000 | 11111000 | 01000100 | 10101000 | 00100100 | 00000000 | 00000000 | 00000000 |
| 13 | 1 | 0 | 0 | 1000 | 01011110 | 01000100 | 10101000 | 00100100 | 00000000 | 00000000 | 00000000 |
| 14LCA | 1 | 0 | 0 | 1000 | 11010000 | 11010000 | 10101000 | 00100100 | 10101000 | 00000000 | 00000000 |
| 15CALL | 1 | 0 | 0 | 1000 | 01000110 | 01000110 | 10101000 | 00100100 | 10101000 | 00000000 | 00000000 |
| 16 | 1 | 0 | 0 | 1000 | 11111111 | 01000110 | 10101000 | 00100100 | 10101000 | 00000000 | 00000000 |
| 17 | 1 | 0 | 0 | 1000 | 00000111 | 01000110 | 10101000 | 00100100 | 10101000 | 00000000 | 00000000 |
| 18LE | 1 | 0 | 0 | 1000 | 00100110 | 00100110 | 10101000 | 00100100 | 10101000 | 00000000 | 00000000 |
| 19 | 1 | 0 | 0 | 1000 | 00000111 | 00100110 | 10101000 | 00100100 | 10101000 | 00000000 | 00000111 |
| 20ACE | 1 | 0 | 0 | 1000 | 10001100 | 10001100 | 10110000 | 00100100 | 10101000 | 00000000 | 00000111 |
| 21LLA | 1 | 0 | 0 | 1000 | 11110000 | 11110000 | 10110000 | 00100100 | 10101000 | 00000000 | 00000111 |
| 22SLC | 1 | 0 | 0 | 1000 | 00000010 | 00000010 | 01100001 | 00100100 | 10101000 | 00000000 | 00000111 |
| 23LHA | 1 | 0 | 0 | 1000 | 11101000 | 11101000 | 01100001 | 00100100 | 10101000 | 00000000 | 00000111 |
| 24LME | 1 | 0 | 0 | 1000 | 11111100 | 11111100 | 01100001 | 00100100 | 10101000 | 00000000 | 00000111 |
| 25 | 1 | 0 | 0 | 1000 | 00000000 | 11111100 | 01100001 | 00100100 | 10101000 | 00000000 | 00000111 |
| 26LM | 1 | 0 | 0 | 1000 | 00111110 | 00111110 | 01100001 | 00100100 | 10101000 | 00000000 | 00000111 |
| 27 | 1 | 0 | 0 | 1000 | 10110100 | 00111110 | 01100001 | 00100100 | 10101000 | 00000000 | 00000111 |
| 28 | 1 | 0 | 0 | 1000 | 01101100 | 00111110 | 01100001 | 00100100 | 10101000 | 00000000 | 00000111 |
| 29JTC | 1 | 0 | 0 | 1000 | 01100000 | 01100000 | 01100001 | 00100100 | 10101000 | 00000000 | 00000111 |
| 30 | 1 | 0 | 0 | 1000 | 11111111 | 01100000 | 01100001 | 00100100 | 10101000 | 00000000 | 00000111 |
| 31 | 1 | 0 | 0 | 1000 | 11001111 | 01100000 | 01100001 | 00100100 | 10101000 | 00000000 | 00000111 |

| | H REG. 76543210 | L REG. 76543210 | PROGRAM ADDRESS 111111 5432109876543210 | CZSP |
|---|---|---|---|---|
| 0 | 00000000 | 00000000 | 0000000000000000 | 0000 |
| 1 | 00000000 | 00000000 | 0000000011111111 | 0101 |
| 2RST | 00000000 | 00000000 | 0000000011111111 | 0101 |
| 3 | 00000000 | 00000000 | 0110000000000000 | 0101 |
| 4ADA | 00000000 | 00000000 | 0110000000000001 | 0100 |
| 5LBM | 00000000 | 00000000 | 0110000000000010 | 0100 |
| 6 | 00000000 | 00000000 | 0110000000000010 | 0100 |
| 7INP | 00000000 | 00000000 | 0110000000000011 | 0100 |
| 8 | 00000000 | 00000000 | 0110000000000011 | 0100 |
| 9RFP | 00000000 | 00000000 | 0110000000000100 | 0100 |
| 10SRC | 00000000 | 00000000 | 0110000000000100 | 1100 |
| 11JMP | 00000000 | 00000000 | 0110000000000100 | 1100 |
| 12 | 00000000 | 00000000 | 0110000000000100 | 1100 |
| 13 | 00000000 | 00000000 | 0110000000000100 | 1100 |
| 14LCA | 00000000 | 00000000 | 0110000000000100 | 1100 |

TABLE VI-continued

| | H REG. 76543210 | L REG. 76543210 | PROGRAM ADDRESS 111111 5432109876543210 | CZSP |
|---|---|---|---|---|
| 15CALL | 00000000 | 00000000 | 0110000000000100 | 1100 |
| 16 | 00000000 | 00000000 | 0110000000000100 | 1100 |
| 17 | 00000000 | 00000000 | 0000011111111111 | 1100 |
| 18LE | 00000000 | 00000000 | 0000100000000000 | 1100 |
| 19 | 00000000 | 00000000 | 0000100000000001 | 1100 |
| 20ACE | 00000000 | 00000000 | 0000100000000010 | 0011 |
| 21LLA | 00000000 | 10110000 | 0000100000000011 | 0011 |
| 22SLC | 00000000 | 10110000 | 0000100000000100 | 1011 |
| 23LHA | 01100001 | 10110000 | 0000100000000101 | 1011 |
| 24LME | 01100001 | 10110000 | 0000100000000110 | 1011 |
| 25 | 01100001 | 10110000 | 0000100000000110 | 1011 |
| 26LM | 01100001 | 10110000 | 0000100000000111 | 1011 |
| 27 | 01100001 | 10110000 | 0000100000001000 | 1011 |
| 28 | 01100001 | 10110000 | 0000100000001000 | 1011 |
| 29JTC | 01100001 | 10110000 | 0000100000001001 | 1011 |
| 30 | 01100001 | 10110000 | 0000100000001010 | 1011 |
| 31 | 01100001 | 10110000 | 1100111111111111 | 1011 |

| | R | I | E | STA. | INPUT | INST. | A REG. | B REG. | C REG. | D REG. | E REG. |
|---|---|---|---|---|---|---|---|---|---|---|---|
| 32JFP | 1 | 0 | 0 | 1000 | 01011000 | 01011000 | 01100001 | 00100100 | 10101000 | 00000000 | 00000111 |
| 33 | 1 | 0 | 0 | 1000 | 00000000 | 01011000 | 01100001 | 00100100 | 10101000 | 00000000 | 00000111 |
| 34 | 1 | 0 | 0 | 1000 | 10001001 | 01011000 | 01100001 | 00100100 | 10101000 | 00000000 | 00000111 |
| 35CFZ | 1 | 0 | 0 | 1000 | 01001010 | 01001010 | 01100001 | 00100100 | 10101000 | 00000000 | 00000111 |
| 36 | 1 | 0 | 0 | 1000 | 01010000 | 01001010 | 01100001 | 00100100 | 10101000 | 00000000 | 00000111 |
| 37 | 1 | 0 | 0 | 1000 | 11101101 | 01001010 | 01100001 | 00100100 | 10101000 | 00000000 | 00000111 |
| 38CTS | 1 | 0 | 0 | 1000 | 01110010 | 01110010 | 01100001 | 00100100 | 10101000 | 00000000 | 00000111 |
| 39 | 1 | 0 | 0 | 1000 | 10101110 | 01110010 | 01100001 | 00100100 | 10101000 | 00000000 | 00000111 |
| 40 | 1 | 0 | 0 | 1000 | 00011110 | 01110010 | 01100001 | 00100100 | 10101000 | 00000000 | 00000111 |
| 41RET | 1 | 0 | 0 | 1000 | 00000111 | 00000111 | 01100001 | 00100100 | 10101000 | 00000000 | 00000111 |
| 42EX | 1 | 0 | 0 | 100 | 01111111 | 01111111 | 01100001 | 00100100 | 10101000 | 00000000 | 00000111 |
| 43TSTOP | 1 | 0 | 0 | 1000 | 00000000 | 01111111 | 01100001 | 00100100 | 10101000 | 000000000 | 00000111 |
| 44SUL | 1 | 0 | 0 | 1000 | 10010110 | 10010110 | 10110001 | 00100100 | 10101000 | 00000000 | 00000111 |
| 45SRC | 1 | 0 | 0 | 1000 | 00011010 | 00011010 | 11011000 | 00100100 | 10101000 | 00000000 | 00000111 |
| 46SBM | 1 | 0 | 0 | 1000 | 10011111 | 10011111 | 11011000 | 00100100 | 10101000 | 00000000 | 00000111 |
| 47 | 1 | 0 | 0 | 1000 | 00110000 | 10011111 | 10100111 | 00100100 | 10101000 | 00000000 | 00000111 |
| 48RFC | 1 | 0 | 0 | 1000 | 00000011 | 00000011 | 10100111 | 00100100 | 10101000 | 00000000 | 00000111 |
| 49ND | 1 | 0 | 0 | 1000 | 00100100 | 00100100 | 10100111 | 00100100 | 10101000 | 00000000 | 00000111 |
| 50 | 1 | 0 | 0 | 1000 | 00101011 | 00100100 | 00100011 | 00100100 | 10101000 | 00000000 | 00000111 |
| 51XRL | 1 | 0 | 0 | 1000 | 10101110 | 10101110 | 10010011 | 00100100 | 10101000 | 00000000 | 00000111 |
| 52ORE | 1 | 0 | 0 | 1000 | 10110100 | 10110100 | 10010111 | 00100100 | 10101000 | 00000000 | 00000111 |
| 53CPA | 1 | 0 | 0 | 1000 | 10111000 | 10111000 | 10010111 | 00100100 | 10101000 | 00000000 | 00000111 |
| 54RTC | 1 | 0 | 0 | 1000 | 00100011 | 00100011 | 10010111 | 00100100 | 10101000 | 00000000 | 00000111 |
| 55ADB | 1 | 0 | 0 | 1000 | 10000001 | 10000001 | 10111011 | 00100100 | 10101000 | 00000000 | 00000111 |
| 56ACB | 1 | 0 | 0 | 1000 | 10001001 | 10001001 | 11011111 | 00100100 | 10101000 | 00000000 | 00000111 |
| 57SUC | 1 | 0 | 0 | 1000 | 10010010 | 10010010 | 00110111 | 00100100 | 10101000 | 00000000 | 00000111 |
| 58SBB | 1 | 0 | 0 | 1000 | 10011001 | 10011001 | 00010011 | 00100100 | 10101000 | 00000000 | 00000111 |
| 59NDB | 1 | 0 | 0 | 1000 | 10100001 | 10100001 | 00000000 | 00100100 | 10101000 | 00000000 | 00000111 |
| 60XRB | 1 | 0 | 0 | 1000 | 10101001 | 10101001 | 00100100 | 00100100 | 10101000 | 00000000 | 00000111 |
| 61ORC | 1 | 0 | 0 | 1000 | 10110010 | 10110010 | 10101100 | 00100100 | 10101000 | 00000000 | 00000111 |
| 62CPC | 1 | 0 | 0 | 1000 | 10111010 | 10111010 | 10101100 | 00100100 | 10101000 | 00000000 | 00000111 |
| 63HALT | 1 | 0 | 1 | 0000 | 11111111 | 11111111 | 10101100 | 00100100 | 10101000 | 00000000 | 00000111 |
| 64 | 1 | 0 | 1 | 0000 | 00000000 | 11111111 | 10101100 | 00100100 | 10101000 | 00000000 | 00000111 |

| | H REG. | L REG. | PROGRAM ADDRESS | CZSP |
|---|---|---|---|---|
| 32JFP | 01100001 | 10110000 | 1101000000000000 | 1011 |
| 33 | 01100001 | 10110000 | 1101000000000001 | 1011 |
| 34 | 01100001 | 10110000 | 1101000000000010 | 1011 |
| 35CFZ | 01100001 | 10110000 | 1101000000000011 | 1011 |
| 36 | 01100001 | 10110000 | 1101000000000100 | 1011 |
| 37 | 01100001 | 10110000 | 1101000000000101 | 1011 |
| 38CTS | 01100001 | 10110000 | 1101000000000101 | 1011 |
| 39 | 01100001 | 10110000 | 1101000000000101 | 1011 |
| 40 | 01100001 | 10110000 | 1101000000000101 | 1011 |
| 41RET | 01100001 | 10110000 | 1101000000000101 | 1011 |
| 42EX | 01100001 | 10110000 | 1101000000000101 | 1011 |
| 43TSTOP | 01100001 | 10110000 | 1101000000000101 | 1011 |
| 44SUL | 01100001 | 10110000 | 1101000000000101 | 1010 |
| 45SRC | 01100001 | 10110000 | 1101000000000101 | 1010 |
| 46SBM | 01100001 | 10110000 | 1101000000000101 | 1010 |
| 47 | 01100001 | 10110000 | 1101000000000101 | 0011 |
| 48RFC | 01100001 | 10110000 | 1101000000000101 | 0011 |
| 49ND | 01100001 | 10110000 | 1101000000000110 | 0011 |
| 50 | 01100001 | 10110000 | 1101000000000111 | 0001 |
| 51XRL | 01100001 | 10110000 | 1101000000001000 | 0010 |
| 52ORE | 01100001 | 10110000 | 1101000000001001 | 0011 |
| 53CPA | 01100001 | 10110000 | 1101000000001010 | 0100 |
| 54RTC | 01100001 | 10110000 | 1101000000001011 | 0100 |
| 55ADB | 01100001 | 10110000 | 1101000000001100 | 0010 |
| 56ACB | 01100001 | 10110000 | 1101000000001101 | 0011 |
| 57SUC | 01100001 | 10110000 | 1101000000001110 | 0001 |
| 58SBB | 01100001 | 10110000 | 1101000000001111 | 0001 |
| 59NDB | 01100001 | 10110000 | 1101000000010000 | 0100 |
| 60XRB | 01100001 | 10110000 | 1101000000010001 | 0000 |
| 61ORC | 01100001 | 10110000 | 1101000000010010 | 0010 |

TABLE VI-continued

| | H REG. | L REG. | PROGRAM | CZSP |
|---|---|---|---|---|
| 62CPC | 01100001 | 10110000 | 1101000000010011 | 0001 |
| 63HALT | 01100001 | 10110000 | 1101000000010100 | 0001 |
| 64 | 01100001 | 10110000 | 1101000000010100 | 0001 |

| | R | I | E | STA. | INPUT | INST. | A REG. | B REG. | C REG. | D REG. | E REG. |
|---|---|---|---|---|---|---|---|---|---|---|---|
| 65 | 1 | 0 | 1 | 0000 | 10100010 | 11111111 | 10101100 | 00100100 | 10101000 | 00000000 | 00000111 |
| 66 | 1 | 0 | 1 | 0000 | 00001010 | 11111111 | 10101100 | 00100100 | 10101000 | 00000000 | 00000111 |
| 67 | 1 | 0 | 1 | 0000 | 11100000 | 11111111 | 10101100 | 00100100 | 10101000 | 00000000 | 00000111 |
| 68 | 1 | 0 | 1 | 0000 | 10101010 | 11111111 | 10101100 | 00100100 | 10101000 | 00000000 | 00000111 |

| | H REG. | L REG. | PROGRAM ADDRESS | CZSP |
|---|---|---|---|---|
| 65 | 01100001 | 10110000 | 1101000000010100 | 0001 |
| 66 | 01100001 | 10110000 | 1101000000010100 | 0001 |
| 67 | 01100001 | 10110000 | 1101000000010100 | 0001 |
| 68 | 01100001 | 10110000 | 1101000000010100 | 0001 |

State 4
Input
Instruction Register
A Register
B Register
C Register
D Register
E Register
H Register
L Register
Program address
Carry
Zero
Sign
Parity The instruction set truth table, Table VI, shows the operation of the groups or classes of instructions possible. For each horizontal line in the truth table, one cycle is printed. Time flows in a vertical column. Instructions are labelled in the lefthand columns. For purposes of illustration, the restart instruction will first be described. It is assumed that the CPU is in a HALT state. With reference to Table VI, at time 1, it may be seen that there is a transition of logic from 0 to 1 at the interrupt input and ready input. This transition interrupts the CPU HALT state. During the first cycle, the restart instruction will be fetched at the input. This is shown at the input bits 7 through 0. With reference to Table V, it will be noted that the binary code on inputs $I_7$ through $I_0$ corresponds to the code for restart operation. The instruction register also shows that the instruction is transferred from the input terminals to the register during the first cycle. During the second cycle, line 3 on the truth table, it may be seen that the three center bits of the instruction bits 5, 4, and 3, are transferred to the high order program address bits 15, 14, and 13 of the program address counter. During time 4 an ADA instruction is executed. The input shows the ADA instruction. With reference to Table V, it may be seen that the instruction 10000000 corresponds to the operand code AD; i.e., bits 5, 4, and 3 are respectively 000. With respect to Table I, it may be seen that the instruction class of arithmetic operations is characterized as 2PS. Bits 7 and 6 of the instruction are respectively 1 and 0 corresponding to the 2. The source destination (bits 2, 1, and 0) are 000 corresponding to Register A (reference Table V). The instruction is transferred to the instruction register. No other operation of the registers is shown except the program counter is incremented by 1. The purpose of this instruction is to update the carry, zero, sign and parity flags. This may be seen by the change in the parity flag logic level. The flags now reflect the status of the A register.

The next instruction is load to B register from memory. Bits 2, 1, and 0 of the instruction (the source of data) are respectively 1, 1, 1; i.e., 7 which corresponds to memory. The instruction is present at the input during the first cycle time, number 5, during which it is transferred to the instruction register. The program counter is also incremented. During the second cycle time, time 6, the data that is to be transferred to the B register is present at the input. The instruction register does not change until the next instruction is received. In time period 6, it may be seen that the input is transferred to the B register.

The program address counter was not incremented because the instruction was a memory instruction which does not use the program address, but rather uses the H and L registers of the internal RAM for the location.

The fourth instruction executed in the program is an input instruction. The instruction is transferred to the instruction register during the first cycle time, frame number 7. The B register does not change. During the second cycle of the input, the data on the input terminal is transferred to the A register which is shown on time frame 8. It will be noted that the flags are not affected by the transfer of the input to the A register. The flags are updated only by an arithmetic or shift instruction. The fifth instruction return false parity shows that a return instruction occurs. The instruction is transferred by the instruction register. By looking at the program address register, one can see the location of the program counter. Because the program address counter is a fixed location in the RAM, the change in address location will not be shown. The address location will stay the same until a call instruction is executed. For example, during time frame 15. The instruction shift right circular at time frame 10 shows that the A register shifts right one bit and the carry flag is set from a bit $A_7$ after the shift.

In a manner similar to that above described it is possible to trace through the instructions of the instruction set, and observe the changed binary data in the various registers of the CPU.

SEQUENCE CONTROL

FIG. 7 is a functional block diagram of the sequence and control logic of the CPU. Each block contains a reference to a figure wherein detailed logic circuits suitable for performing that function is described. The CPU logic names and function thereof are described in Table VII.

STATE TIMER FUNCTION

The state timer, the detailed logic of which is described with reference to FIG. 8 hereinafter, functions as the master timer for the CPU/external memory system. It controls all timing in the CPU, the interface timer and the slave timer on the external RAM. (Reference FIG. 35). There are four state outputs to the state timer, namely S1, S2, S3, and S4. The state timer generates an automatic index output P which updates the address register after an instruction execution. The state timer receives the inputs READY and interrupt request (INT REQ) which enable an interrupt instruction to be inserted. These signals are also used in accordance with the present invention to enable use of either a serial type external memory or a random access memory. This feature of the invention will be explained hereinafter with respect to the detailed description of FIG. 8.

As previously explained, a cycle includes both a fetch and execute, each of which is characterized as having four states, Si–S4. Each state has two phases, phase 1 and phase 2. During the fetch cycle time, an instruction is fetched from the external memory. A logic diagram of the input/output (I/O) circuit is illustrated generally in FIG. 9. During the execute time, an instruction is executed. The state timer also contains a programmable logic array (PLA) which enables different amounts of state time or subcycle time execute/fetch to be programmed by changing a gate mask only. A more versatile processor can be made by using this technique. A PLA is described in more detail in U.S. Pat. No. 3,541,543 entitled "Binary Decoder" issued to R. H. Crawford and assigned to the assignee of the present invention, and incorporated herein by reference.

I/O FUNCTION

The input/output section contains the interface to the common 8-bit external bus. During the fetch subcycle of an instruction cycle, the program address location, i.e., the location of the desired instruction in external memory is output through the CPU I/O interface. During state 1, the low address bits $P_L$ are output from the internal RAM and during state time S3 the high order address bits $P_H$ are output. This allows 16 bits to be output through the common 8-bit bus, enabling use of a memory system of up to 64K words. During phase 2 of state 4 of the fetch subcycle, the external memory location addressed by the 16 bits (FIG. 1, block 12) will output the instruction.

INSTRUCTION REGISTER

During state 1 of execute, the instruction will be clocked into the CPU through the I/O. The instruction will be stored in the instruction register (FIG. 10). During the four states of execute, the instruction fetched will be executed. If the instruction requires more than one cycle, the address will be put out during the next fetch from either the program address counter or the internal RAM registers H, L. The data will be output from the RAM during the end of the fetch cycle for the second or third instruction cycle.

INSTRUCTION DECODE

An instruction stored in the instruction register is input into a programmable logic array which defines the instruction decode. The use of the PLA in the instruction decode allows the instructions decoded to be changed by reprogramming the gate mask.

CYCLE TIMER

The cycle timer receives inputs from the instruction decode and the state timer. The cycle counter determines if an instruction is one, two, or three cycles in length. Instruction cycles may be varied by the use of a PLA in the cycle timer circuitry.

INTERNAL CONTROL

The cycle timing information, instruction decode information, and state timing information are combined in an internal control block which includes a read-only memory (ROM), which generates all of the internal CPU timing. The outputs of this ROM go to either the bus, the internal RAM or the arithmetic unit. Outputs of the internal control labelled with an asterisk (*) generates a bus signal while control signals labelled with a $ enable the bus data to be sampled. Two other outputs of the internal control are $*I_{3,\ 4,\ 5,}$ and *RS. These two controls are used when a restart instruction is executed. During one clock, one state time, the signal *RS will discharge the bus, allowing all zeros to be put in the program stack. This may be seen with reference to FIG. 15 wherein the signal *RS produces a logic 0 at the output of NAND gate 71. This discharges to ground the internal bus lines 0 through 7. The signal $*I_{3,4,5}$ transfers the instruction bits $I_{3,4,5}$ to the upper order address locations $P_{H,\ 5,\ 6,\ and\ 7}$ respectively. Operation of the restart instruction and transfer of bits 3, 4, and 5 to $P_{H5,\ 6,\ and\ 7}$ may be seen in the instruction truth table, Table VI, time frame 3. The signal $I is used to sample the instruction into the instruction register.

CONTROL TO RAM

Three of the outputs of the internal control A1, A2, A3 go to the internal RAM. These signals define the location as the A, B, C, D, E, H, L or M' registers. Two other controls to the RAM, U and V, select either the registers previously mentioned, the low order address registers $P_L$, the high order address registers $P_H$, (reference FIG. 2) or when none of the registers of the RAM are being addressed, the signals U, V enable RAM refresh circuitry. Another RAM control signal is *RAM. This signal generates the bus when a RAM output is desired. Two other controls which go to the RAM are $\overline{PUSH}$ and $\overline{POP}$. These controls operate the pushdown stack in the RAM. The pushdown stack will be explained in further detail with reference to explanation of FIG. 25.

STATUS DECODE

The control signal CZSP and #W are controls that go to the arithmetic unit. The signal CZSP is the signal which samples or updates the carry, zero, sign and parity flags. The output of these flags is combined with the instruction bits $I_{3,4,5}$ which are decoded with the arithmetic outputs to determine whether a conditional call, return, or jump is to be executed when these instructions are fetched.

RESTART

The restart circuitry enables a restart instruction to be executed. This circuitry is effective to discharge the bus and allow all zeros to be put into the program stack. Subsequently, instruction bits $I_{3,4,5}$ are enabled for insertion into the three highest order bits of the register $P_H$.

INPUT/OUTPUT CIRCUIT DESCRIPTION

The input/output logic circuitry for the CPU of the present invention is illustrated in FIG. 9. The internal eight-bit parallel bus of the CPU is shown at 81, having bus lines 7 through 0. CPU inputs and outputs occur over the lines $A_0$ through $A_7$. The logic interface between the internal bus 81 and the output lines comprises a series of NAND gates shown generally at 83, and NOR gates shown generally at 85. Insulated gate field effect transistor transfer gates 87 connect the output lines to corresponding logic gates which are connected to the internal bus 81. System ground is shown at 89. Operation of the input/output circuit is as follows. When the control signal $M is logic 1, the data on the internal bus 81 will be sampled. Consider, for example, that the data on the internal bus line 1 is a logic 1. When the control signal $M becomes a logic 1, both of the inputs to the NAND gate 83A are 1's, producing a logic 0 as the output. This logic zero output is effective to bias on the MOS transfer gate 87*a*, connecting the output line $A_1$ to circuit ground. This transistor will output a current onto the external line $A_1$ which will be sensed as indicative of a signal on the bus line 1. As a further example, consider that the internal bus line 2 has a signal that is a logic 0. For this situation, when the control signal $M becomes a logic 1, the inputs to the NAND gate 83*b* are 0 and 1, respectively. This produces an output signal which is a logic 1 and therefore the transfer gate 87*b* is not energized. Thus, no current flows through the output line $A_2$ and a logic 0 for the data bus line 2 is indicated.

During the phase 1 time of a state immediately following sampling of the data on the internal bus 81, an input will be sampled from the same line such as $A_1$ or $A_2$ in the previous example. This will occur if the signal *M is a logic 1. For example, when *M becomes a logic 1 during the time that $\phi 1$ becomes a logic 0, *M logic 1 will be transferred to one of the inputs of the NAND gate 91. As soon as $\phi 1$ becomes a logic 1, the output of the NAND gate 91 becomes a logic 0. Referring, by way of example, to the NOR gate 85*a*, the logic 0 resulting at the output of the NAND gate 91 produces a logic 0 for one of the inputs of the NOR gate 85*a*. Depending upon the level of the input information sampled on the line $A_1$, a logic 0 or a logic 1 will be transferred by the NOR gate 85*a* to the internal bus 1. For example, if $A_1$ input data to be sampled as a logic 0, both of the inputs to the NOR gate 85*a* are logic 0's. This will produce a logic 1 output which will be sampled onto the bus line 1. For the situation, however, where the input $A_1$ is a logic 1, then the NOR gate 85*a* will produce a logic 0 output. The NOR gates 85 transfer the input information onto the bus lines 81 which are precharged in order to enhance speed of operation.

INSTRUCTION REGISTER LOGIC DESCRIPTION

FIG. 10 illustrates the instruction register of the CPU. The instruction register is a sample and hold register and operates as follows. For clarity of explanation, only one bit, block 54, of the instruction of the 8-bit instruction register will be described. When the control signal $I is a logic 0, the bus bit 7 will be sampled into the storage register. It is sampled through the complex gate which is an AND-OR invert gate. During phase 2 of the clock, this input will be transferred to the input on the inverter 63 between the phase 1 and phase 2 transfer gates. The output of inverter 63 will be sampled on phase 1. If the control signal $I is now a 1, the bit will be sampled back through the complex gate through the other input of the AND-OR invert. This will allow the bit to be circulated until a new bit is sampled into the instruction register. More particularly, when the signal $$\overline{I}$ becomes a logic 0, one input of the AND gate 35 is a logic 1. Assume now, for purposes of illustration, that the data to be sampled on line 7 of the internal bus is a logic 1. Since both inputs to the AND gate 35 are 1's, the output of the AND gate 35 is also a logic 1. This ensures that the output of the NOR gate 39 is a logic 0, since it would have a logic 1 output only if both of its inputs were logic 0's. The logic 0 output of the NOR gate 39 is transferred by the phase 2 transfer gate to the input of the inverter 63. The logic 1 output of the inverter 63 is transferred to the input of the inverter 65 by the phase 1 clock. This logic 1 signal is a feedback signal to the AND gate 37. If the sample signal $$\overline{I}$ now becomes a 1, both inputs to the AND gate 37 will be logic 1 setting the latch, since the output of the AND gate 37 is a logic 1, ensuring that the output of the NOR gate 39 is a logic 0. This data will be circulated until the sample signal $$\overline{I}$ again becomes a logic 0. Similarly, it may be shown that a logic 0 on the data bus 7 will be sampled by the AND gate 35. With this situation, the output of the AND gate will be a logic 0. Since one of the inputs to the AND gate 37; i.e., $$\overline{I}$, is a logic 0, the output of AND gate 37 will also be a 0. This will ensure that the output of the NOR gate 39 is a logic 1. This signal will be transferred to the input of the inverter 63 by phase 2 of the clock. At phase 1, the transfer gate will transfer this inverted signal to the input of the inverter 65. Also, the signal will be fed back to one of the inputs of the AND gate 37. For the situation where the control signal $$\overline{I}$ has again become logic 1, a signal corresponding to the logic 0 level of the input bus line 7 will be circulated through the register until a subsequent sample signal indicating that new data is to be sampled. Since the internal bus line 81 contains inverted signals of the desired data information, the output from the instruction register, such as 54, will correspond to the true value of the input data.

INSTRUCTION DECODE DESCRIPTION

The instruction decode portion of the CPU is illustrated in FIG. 11. The instruction decode comprises two NAND matrixes 65 and 67. These matrixes are defined by a programmable logic array such as described in the aforementioned Crawford patent. Operation of the decode may better be understood by an illustrative example. Consider the instruction signal $\overline{JMP}$. This signal is obtained when signals are present on the output lines from the instruction register $\overline{I}_0$, $I_6$, and $\overline{I}_7$. The output of the various instructions such as JMP, HALT, and etc., are coded on the matrix 65. By way of example, the instruction HALT requires a combination of two terms in the matrix 65. These two terms are shown respectively at gates 73 and 75. The NAND matrixes 65 and 67 form an AND-OR matrix. It may be seen that since the instruction decode comprises programmable logic arrays, a great deal of flexibility is afforded the CPU of the present invention. By merely programming the gate mask for the programmable logic arrays, new functions, sequences of information, etc., may be accomplished.

CYCLE TIMER DESCRIPTION

A cycle timer that may be used with the CPU of the present invention is shown in FIG. 12. The timer comprises a NAND matrix 81, the inverting function of which is shown generally by the symbol at 69. The output of the NAND matrix is applied to one terminal of a phase 2 transfer gate shown generally at 83. On phase 2 of the clock, the outputs of a NAND matrix 81 are combined by NAND gates 85*a* through 85*f* to form cycle control signals C1, C2A, C2B, C2C, and C3 which are output on phase 1 of the clock by transfer gates 87. The cycle information is fed back on phase 1 of the clock onto the input matrix 81. The only time a change in the cycle information occurs is if the instruction decode described in FIG. 11 has a new output or if the state counter described in FIG. 8 has an output of S4 EX.

An example is illustrated by cycle 1 (C1). If the signals EX and S4 are both logic 1, the NAND gate 89 will have a logic 0 output. This will be inverted by the inverter 91 to form a signal S4 EX that is a logic 1. If the control signal Z is also a logic 1, the cycle timer will produce a control signal C1. It may be seen that these two gates, that is, the gate formed by the control line Z and the gate formed by the control signal S4 EX are all the gates in the programmable logic array 81 required to produce a logic 1 on one line of the matrix to the NAND gate 85*a*. This logic 1 is inverted by gate 69 producing a logic 0 input to NAND gate 85*a*, thereby assuring a logic 1 output of the NAND gate. The cycle C1 will circulate on itself as long as C1 remains a logic 1 and the signal $\overline{S4\ EX}$ is a logic 1, i.e., when the signals S4 and EX are not logic 1's.

The next change in cycle timing will occur when the signal S4 EX becomes a 1 and a new instruction from the instruction decode, shown generally in FIG. 11, becomes a 1. An example of the second cycle instruction would be cycle C2A. If cycle C1 is a 1 so that a 1 is present at the gate 93, the control signal Z is a logical 0, so that the NAND gate 85*a* does not produce a logic 1 output, and the signal S4 EX becomes a 1, cycle C2A will have an output of a logic 1 if the instruction line from the instruction decode decoding the control signal EXT+LrM =⊙M+ RST is a 1 (external or load memory to *r* or arithmetic memory or restart). Cycle C2A will continue to circulate until the next S4 EX logic 1 state since C2A is a 1 and the signal $\overline{S4\ EX}$ is a logic 1, making one input to the NAND gate 85*b* a logic 0, assuring a logic 1 output therefrom.

INTERNAL CONTROL DESCRIPTION

With reference to FIG. 13*b*, the internal control portion of the CPU, in accordance with the present invention, comprises one level of NAND logic shown generally at 95, clocked on phase 2 of the clock signal to discrete MOS NAND gates 97*a* through 97*k*. An example of operation of the internal control circuit for producing the output *RAM will be described. If the control signals S4 and execute (EX) are both logical 1's during phase 2 of the clock, they will be gated into NAND gate 97*d* to produce the *RAM control.

RESTART

A further example of generation of a control signal by the internal control may be seen (FIG. 13*a*) by reference to the programmable logic arry 99 and the control signal *RS. This is a signal that is required to generate a restart operation. For the situation where the instruction restart (RST) is a 1, the signal cycle C2A is a 1, EX is a 1, and state 3 (S3) is a 1, the output signal *RS will be true; i.e., a logic 1. This will be clocked from a NAND gate 101 into an inverter 103 on phase 2 of the clock, allowing a restart instruction to be executed.. The control signal *RS is combined with phase 1 of the clock through a NAND gate 71 (Ref. FIG. 15). The output of this NAND gate, a logic 0, is connected to the gates of IGFETS 105, biasing these transistors into a conductive state. This discharges the internal bus lines 0–7 to ground, enabling all 0's to be inserted into the program address stack. The other control signal for restart instruction is the signal $*I_{3,4,5}$. When this signal is a 1, bus bits 4, 3, 2, 1, and 0 will be dishcarged. Instruction bits 3, 4, and 5 will be transferred to the bus bits 5, 6, and 7 respectively, for storage in the three highest order bits of the high order program address register, as was explained previously with reference to the description of the instruction set of the CPU.

STATUS DECODE CIRCUIT DESCRIPTION

The condition decode for the arithmetic flags of the ALU is shown in FIG. 14. The condition decode comprises the NAND array 111 combined into a 9-input NAND gate 113. By way of example, if instruction bits $I_3$, $I_4$, and $I_5$ are logic 1's, the condition matrix 111 will decode the inverse of the carry flag. The condition output will be combined with a call instruction, jump instruction, or return instruction to determine if the instruction should be executed. If parity is true and a conditional call occurs, bits 3, 4, and 5 will be a 1 and the instruction will be executed.

STATE TIMER DESCRIPTION

The state timer of the CPU in the present invention is illustrated in FIG. 8 and is used to control the master timing of the CPU. Control signals used by the CPU and their function are shown in Table VII. The state timer comprises a 4-bit shift register having outputs S1, S2, S3, and S4. The outputs of the shift register are combined with cycle information and status information from READY and INT (interrupt) to determine if execute or fetch is to be executed. These outputs are programmed into a programm able logic array 604 which enables changing the state operation. The interrupt circuit debalances an interrupt input and synchs it with the state cycle information to determine when an interrupt can be instituted. Another

TABLE VII

| LOGIC DEFINITIONS | |
|---|---|
| CPU Logic Names: | |
| Inputs: | |
| Interrupt | When the interrupt line is enabled (Logic "0" to |

TABLE VII-continued

| LOGIC DEFINITIONS | |
|---|---|
| | Logic "1" transistion, logic "1" for one state), an interrupt is recognized at the end of the instruction being executed. A one byte instruction can be inserted, and the program counter will not advance. A halted CPU can be restarted by an interrupt. |
| Ready: | If ready is low (logic "0") during state 3 of the fetch cycle, the processor will enter a wait state at the end of state four. A one state delay will occur after ready returns to a high level (logic "1"). |
| $A_7$–$A_0$ | $A_7$ through $A_0$ are data or instruction inputs during a low $\phi$1 execute state when the CPU is not halted. True data is input. |
| Outputs: | |
| $\overline{\text{Synch}}$: | The processor will synch the memory and external counter during each state one when the CPU is not in a halt or wait state. A logic "0" will be the synch which occurs during the first state of each fetch or execute. |
| Fetch: | External timing is controlled by the fetch/execute of a cycle. Fetch (four states) is a logic "1" during fetch and a logic "0" during execute (four states). During a wait state, fetch is a logic "1". Fetch will be a logic "0" when the processor is halted. |
| Cycle: | Cycle will be high during the first cycle of each instruction. It will only be low during cycle two or cycle three of an instruction. The transition will occur during fetch state two. |
| Memorize | When dats is to be transferred to the external memory, memorize will be a logic "1". The output will change on fetch state two of the transfer cycle and remain valid until one state after the end of execute. |
| Interrupt Acknowledge: | Interrupt acknowledge (logic "1") will acknowledge that an interrupt request is being recognized. A logic "1" will occur one state before synch of fetch and will remain valid until the end of fetch. Interrupt acknowledge occurs between four states and twenty-eight states after an interrupt request. |
| $A_7$–$A_0$ | $A_7$ through $A_0$ will be outputs during low $\phi_2$ fetch states one, two, three, and low $\phi_2$ execute state one. Low order address will occur on low $\phi_2$ fetch state one. Data will be output during low $\phi_2$ fetch state two and low $\phi_2$ execute state one. High order address will be output on low $\phi_2$ fetch state three. The output is inverted. |

input RDY allows the use of shift register or random access memories. If the signal RDY is a 1, an execute will occur immediately after a fetch. If RDY becomes a logical 0, the CPU will go into a "wait" state until the RDY becomes a 1 and execute will not occur until RDY becomes a 1. The state timer also contains the information that will output an interrupt acknowledge (INT ACK) to the interface logic. In accordance with one feature of the present invention it is possible to reprogram the programmable logic array 604 so that the wait state occurs at the end of execute, the end of fetch, or during the middle of these cycles.

In general, the state timer comprises an edge detector 600, a programmable logic array 604, a storage circuit 602 for storing an interrupt request until the interrupt request has been acknowledged, a storage register 606 for storing an interrupt acknowledge for several states, and a series of shift register bits.

The edge detector 600 detects a 0 to 1 transition of the interrupt request signal. If this signal makes a 1 to 0 transition, no effect will occur in the circuit. This, of course, can be changed so that the inverse occurs by changing the "one-shot" detection circuit.

Synchronization at the interrupt request signal with CPU timing is as follows. When a logic 0 to 1 transition of interrupt control signal occurs, the NAND gate 601 will output a 1 state, phase 1 to phase 1 pulse to storage circuit 602. This is accomplished by the edge detector circuit. For example, if $\phi$1 or if interrupt was previously at a 0 level, then the output of the inverter 608 will be a logical 1. This signal will become one input to the NAND gate 601 during phase 2 of the clock. The other input to the NAND gate 601 is a logic 0; i.e., the same as the input to the inverter 608. For this situation, the NAND gate output 610 will be a logic 1. When the interrupt request signal makes a transition to a logical 1 during phase 1, the input to the NAND gate 601 will change and since a logic 1 was stored previously on the other input to the NAND gate 601, the output 610 will become a zero pulse. This pulse will be transferred to the phase 1 transfer gate 611 to the NAND gate 612, producing an output therefrom that is a logic 1. During the phase 2 of the clock, the logic 0 stored on gate 608 will be transferred to the NAND gate 601, returning the output to a logic 1.

During the zero pulse output from the NAND gate 601 in response to the 0 to 1 transition of the interrupt signal, the logic output of NAND gate 612 becomes a logic 1. This logic 1 will continue to circulate through the NAND gate 613 back through the NAND gate 612 during subsequent phase 1 and phase 2 of the clock until the input 614 to NAND gate 613 changes to a logic 0. The input 614 was previously at a logic 1 level.

Tracing through the circuit, it can be seen that prior to the signal 614 becoming a logic 1, the output of the inverter 616 is a logic 1. This enables the gate 618 in the programmable logic array 604 to a logic 1. During the next time that Z (labelled node 620) becomes a logic 0, the output of the NAND gate 622 will change to a logic 1. This will enable the gate 624 in the PLA 604 to a logic 1. During the next time that the signal EX (execute) is true, gate 626 of the PLA will become a logic 1. Similarly, when the signal S4 becomes a logic 1, this will enable gate 628 of the PLA. When the control signal HALT is a logic 0, the inverter 621 will assure that the gate 619 becomes a logic 1. With this combination of signals, the interrupt will be acknowledged. An output is provided through two levels of NAND logic such that the output 632 is applied to the shift register which has the four states S1, S2, S3, and S4 as outputs. To synchronize the control when the interrupt is recognized, gates 634 and 636 will become logic 1's. This will enable the NAND gate 638 to provide an output which will shift through a two bit delay to allow the RAM addressing to be set up properly. During the start of this two-bit delay, the flag, shown generally at block 606, will be set. The inverter 641 will invert the logic 1 output of the NAND gate 638 to a logic 0 which will form one input to the NAND gate 640. The output of the NAND gate 640 will then become a logic 1 which will be transferred to the NAND gate 643 by the phase 1 transfer gate. The NAND gate 640 will set the interrupt recognize latch so that the external control timing can accept interrupt data through the data terminal on the interface logic. During the next time of this two-bit delay, the interrupt recognize latch block 602 will be set to logic 1 because line 614 is transformed to a logic 0 by inverters 641, 645, and 647 operating on the output of the NAND gate 638. This enables the latch 602 to be reset. This circuitry, it may be seen, completely synchronizes the interrupt request and interrupt acknowledge and the state operation of the CPU.

Table VIII illustrates the control signal timing for the bus action of the control cycle. As an example, reference the instruction RST (restart). The first signal $P_L$ shown as being present during state 1 of FETCH is the control that ensures that the low order address bits are transferred from the RAM onto the internal bus for use in fetching the restart instruction. During the FETCH subcycle, state S1, phase 1, the control signal $P_L$ must be present. This signal is effective to discharge the bus on phase 2 of the clock, the bus being precharged during the phase 1. Another control signal is the signal M'. During the execute subcycle, state 1, phase 1, M' must be present to ensure a transfer of the restart instruction from the external bus to the internal bus. When the signal is present on the internal bus, it is sampled in the instruction register by the control signal I. (Reference the description of FIG. 10). The signal I is generated on execute, state 1, phase 2.

ARITHMETIC LOGIC UNIT

This section will describe the operation and logic of the arithmetic logic unit 32 (FIG. 2) on the CPU chip. A functional block diagram of the ALU is shown in FIG. 16. Each functional block is labelled with a figure number where the detailed circuit description for that function is described. The arithmetic unit contains a temporary storage register, a section for shifting the accumulator, and an increment section for the program address (FIG. 18), the arithmetic operand control (FIG. 17), the arithmetic unit (FIG. 19), and the arithmetic flags (FIG. 21), including the parity circuit (FIG. 20).

TABLE VIII

| SUBCYCLE State | | FETCH $\overline{EX}$ S1 | | S2 | | S3 | | S4 | | $\overline{EX}$ WAIT | | EXECUTE EX S1 | | S2 | | S3 | | S4 | | EX STOP | |
|---|---|---|---|---|---|---|---|---|---|---|---|---|---|---|---|---|---|---|---|---|---|
| Inst | Cycle / φ | 1 | 2 | 1 | 2 | 1 | 2 | 1 | 2 | 1 | 2 | 1 | 2 | 1 | 2 | 1 | 2 | 1 | 2 | 1 | 2 |
| Lrr | C1 | $P_L$ | | F | $P_L$ | $P_M$ | | F | $P_H$ | | | M' | I | A | R | (s) | R | R | (d) | | |
| | | | | | | | | | | | | | | | | | | | A | | |
| ⊙r | C1 | $P_L$ | | F | $P_L$ | $P_H$ | | F | $P_H$ | | | M' | I | A | R | (s) | | F | | | |
| | | | | | | | | | | | | | | | | | | | (d) | | |
| | | | | | | | | | | | | | | | | | | SHR | | | |
| Shift | C1 | $P_L$ | | F | $P_L$ | $P_H$ | | F | $P_H$ | | | M' | I | A | R | (s) | | | A | | |
| | | | | | | | | | | | | | | | | | | SHL | | | |
| RET | C1 | $P_L$ | | F | $P_L$ | $P_H$ | | F | $P_H$ | | | M' | I | A | R | (s) | | | | | |
| HALT | C1 | $P_L$ | | F | $P_L$ | $P_H$ | | F | $P_H$ | | | M' | I | A | R | (s) | | | | | |
| RST | C1 | $P_L$ | | F | $P_L$ | $P_H$ | | F | $P_H$ | | | M' | I | A | R | (s) | | | | | |
| RST | C2A | L | | F | | H | | F | | | | M' | R | 345 | $P_H$ | (s) | | RS | $P_L$ | | |
| EXT | C1 | $P_L$ | | F | $P_L$ | $P_H$ | | F | $P_H$ | | | M' | I | A | R | (s) | | | | | |
| | | | | | | | | | | | | | | | A | | | | | | |
| EXT | C2A | A | | F | | H | | F | | | | M' | R | R | | (s) | | | | | |
| | | | | | | | | | | | | | | | M | | | | | | |
| ⊙M | C1 | $P_L$ | | F | $P_L$ | $P_H$ | | F | $P_H$ | | | M' | I | A | R | (s) | | | | | |
| | | | | | | | | | | | | | | | A | | | | | | |
| ⊙M | C2A | L | | F | | H | | F | | | | M' | R | F | | (s) | | | | | |
| | | | | | | | | | | | | | | | (d) | | | | | | |
| LrM | C1 | $P_L$ | | F | $P_L$ | $P_H$ | | F | $P_H$ | | | M' | I | A | R | (s) | R | R | M | | |
| LrM | C2A | L | | F | | H | | F | | | | M' | R | | | (s) | | R | (d) | | |
| Lr(exp) | C1 | $P_L$ | | F | $P_L$ | $P_H$ | | F | $P_H$ | | | M' | I | A | R | (s) | R | R | (d) | | |
| Lr(exp) | C2B | $P_L$ | | F | $P_L$ | $P_H$ | | F | $P_H$ | | | M' | R | | | (s) | | R | (d) | | |
| ⊙(exp) | C1 | $P_L$ | | F | $P_L$ | $P_H$ | | F | $P_H$ | | | M' | I | A | R | (s) | | | | | |
| | | | | | | | | | | | | | | | A | | | | | | |
| ⊙(exp) | C2B | $P_L$ | | F | $P_L$ | $P_H$ | | F | $P_H$ | | | M' | R | F | | (s) | | | | | |
| | | | | | | | | | | | | | | | (d) | | | | | | |
| LMr | C1 | $P_L$ | | F | $P_L$ | $P_H$ | | F | $P_H$ | | | M' | I | A | R | R | R | R | (d) | | |
| LMr | C2C | L | | R | M' | H | | F | | | | R | M' | | | (s) | | R | (d) | | |
| LM(exp) | C1 | $P_L$ | | F | $P_L$ | $P_H$ | | F | $P_H$ | | | M' | I | A | R | (s) | R | R | (d) | | |
| LM(exp) | C2B | $P_L$ | | F | $P_L$ | $P_H$ | | F | $P_H$ | | | M' | R | | | (s) | | R | (d) | | |
| LM(exp) | C2C | L | | R | M' | H | | F | | | | R | M' | | | (s) | | R | (d) | | |
| Jump | C1 | $P_L$ | | F | $P_L$ | $P_H$ | | F | $P_H$ | | | M' | I | A | R | (s) | | | | | |
| Jump | C2B | $P_L$ | | F | $P_L$ | $P_H$ | | F | $P_H$ | | | M' | R | R | M | (s) | | | | | |
| Jump | C3 | $P_L$ | | F | $P_L$ | $P_H$ | | F | $P_H$ | | | M' | R | R | $P_H$ | M | R | R | $P_L$ | | |

CONTROL SECTION

Operation of the arithmetic control section, FIG. 17, is as follows. By way of example, consider instruction bits $I_3$, $I_4$, and $I_5$ to be true, i.e., logic 1. This coding corresponds to the instruction compare (reference Table V). A control signal # $\overline{P}$ which is generated by the state timer of the CPU (described in FIG. 8) to update the address register after an instruction is applied as one input to NAND gates 88, 98, and 102. The other input to these NAND gates is respectively bits $I_3$, $I_4$, and $I_5$ of the instruction register. When the control signal # $\overline{P}$ is a 1, the output of gate 88 will be a logic 0 because # $\overline{P}$ and $I_5$ are both 1's. The output of the inverter 90 will be a logic 1. The logic 0 of NAND gate 88 ensures a logic 1 at the output of the NAND gate 94 since at least one of its inputs is a 0. The NAND gate 96 thus has one input that is a logic 1. The second input to NAND gate 96 is from the control # $\overline{W}$. This control must be a 1 to assure that the bootstrapped load on the NAND gate 96 will continually refresh its capacitance. It is understood by those skilled in the MOS art that a bootstrapped load may be used to drive a large capacitance on the output of a device. The capacitance must be continually refreshed or the logic value will drift from its true value.

Because the output of gate 94 and # $\overline{W}$ are both logic 1's, the output of NAND gate 92 will determine the logic level output of gate 96 (for the present example). The NAND gate 92 receives inputs from both the inverter 104 and 100 which, in turn, respectively receive inputs from NAND gates 102 and 98. For the present example where instruction bits $I_3$, $I_4$, and $I_5$ are logic 1's, the output of NAND gates 98 and 102 are 0's, producing an output from inverters 100 and 104 that are respectively logic 1's. These logic 1 signals control the NAND gate 92, producing a logic 0 output therefrom. Thus, the output of NAND gate 96 is controlled to be a logic 1 selecting the control signal "SU or SB or CP or W" to be a logic 1, causing the compare instruction to be executed. Similar examples can be shown for the other seven arithmetic operations; i.e., by changing the logic of instruction bits $I_3$, $I_4$ and $I_5$ the other arithmetic operations may be selected.

The arithmetic unit control and operation will continually do the instruction code present in the instruction register (bits 3, 4, and 5) although an arithmetic instruction may not be executed. The only time the results of the arithmetic operation will be sampled will be when a *F control signal from the control decode is present. This may be seen by reference to FIG. 22, which illustrates one bit of the arithmetic unit. Gate 86 is the control for generating the bus from the arithmetic unit. If the control signal *F is a logic 1, the bus will be generated during phase 2 of the clock. During the logic 0 of phase 1, the transfer gate 106 will transfer the *F logic 1 command to the input of the NAND gate 86. Since phase 1 is a logic 0, the output of the gate 86 will remain at logic 1 as long as phase 1 remains logic 0. When phase 1 goes to logic 1, however, gate 86 is enabled such that a logic 0 is outputed. A logic 0 on the input of NOR gate 84 (which is part of the precharged bus) will transfer the output 108 ($F_n$) of the arithmetic unit to the bus during phase 2; that is, when $F_n$ is logic 1, the signal $\overline{F_n}$ is logic 0, producing a logic 0 at the input of NOR gate 84. Since both inputs to NOR gate 84 are now 0's, a logic 1 output is produced on the bus.

Since the signal *F will be a logic 0 during the next phase 1, the gate 84 will not be enabled until further *F signals occur. The times at which the signal *F occur are shown in Table VIII. It may be seen that the signal F occurs only during phase 1 of states 2 and 4, for both execute and fetch subcycles. As an example, consider subcycle fetch, state S4, phase 1. To simplify the control, the signal *F occurs for every instruction at this time. At some times, such as cycle C2A, the results of the arithmetic unit are not desired. This is indicated by a blank spot in the Table VIII during the phase 2 time of that state. The result of the arithmetic unit will not be stored in any register at that time.

TEMPORARY STORAGE REGISTER

The temporary storage register of the CPU is shown in FIG. 18. The logic of one bit of the storage register is illustrated; other bits of the temporary storage register are shown generally in block diagram form at 114, 116, 118, 120, 122, 124, and 126. The internal bus is shown at 25 as having lines 0 through 7. Signals on these lines are inverted signals as indicated by the label $\overline{BUS}$.

Operation of the storage register is as follows. If the control signal $R becomes a logic 1, the complex gate 110 which includes NAND gate 110*a*, 110*b*, and NOR gate 110*c* will be enabled through the $\overline{BUS}$ input line 0. The output will be stored at the output node of the logic gate 110 until the following phase 1 clock signal. During phase 1, it will be transferred back through gate 110*b* on phase 2 if the control signal $R is now a logic 0. That is, if the signal $R is a logic 0, both inputs to the NAND gate 110*b* are logic 1's producing a logic 1 output therefrom. This logic 0 is inverted by gate 112 and recirculated. This transfer will continue until the control signal $R becomes a logic 1 again. The inverter 113 inverts the $\overline{BUS}$ signal on the internal bus 25 so that a true signal is applied to the logic gate 110.

The temporary storage register is also used for the shift right and shift left instructions, or for normal operation. This is controlled by the control signals *R, *RGT and *LFT. If a right shift is desired, the data on bus line 0 will be shifted to line 1. During phase 2 of the clock, after the signal *RGT becomes a logic 1, the shift will occur as follows. The bus line 0 is shifted to line 1 by shifting the logic value of the output of the inverter 112 onto the bus line 1 when control signal 130 is a logic 0. By way of example, if a true signal were present on bus line 0, this would be represented there as a logic 0 since the bus 25 is inverted. The logic 1 would be present at the output of inverter 112 representing the true data value. The NOR gate 134*a* thus has an input 130 of logic 0 and an input from inverter 112 of logic 1, producing an output on inverted bus line 1 of logic 0, effecting the shift right.

Similarly, if the shift left were required, a logic 1 input *LFT would provide an output 132 that would be applied to one of the inputs to the NOR gate 134*b*. The other input to the NOR gate 134*b* would be the output of the inverter 112. The output of the NOR gate 134*b* is connected to bus line 7. Thus, for a shift left, the signal on bus line 0 is shifted to bus line 7.

If normal operation were desired, the input *R going to a logic 1 would produce an output 128 that would be applied to the NOR gate 134*c*. This would recirculate the data on the bus line 0 back to bus line 0.

Circuitry for incrementing the program address is also illustrated in FIG. 18. The signal for accomplishing a program address increment is the control signal P. As mentioned previously, this signal is generated by the state timer circuitry described with reference to FIG. 8. If the control signal # P is a logic 1, the output of NOR gate 136 will be a logic 0. The output of NAND gates 138, 140, 142, 144, 146, 148, and 150 will be a logic 1 since the # P signal is inverted by the inverter 139. This will ensure that the complement of 1 is added through the arithmetic unit. This is done because the input to the arithmetic unit, gates 136 through 150, are inverted inputs. The incrementing occurs during the fetch subcycle, state 1, and the fetch subcycle, state 3. The incremented output occurs during state times S2 and S4 of the fetch subcycle.

ARITHMETIC UNIT

With reference to FIG. 19, there is illustrated one bit of the arithmetic unit in logic form generally at 67A. The other seven bits of the arithmetic unit are shown in block diagram form at 67B through 67I. The arithmetic unit comprises inverters shown generally at 59, complex gates 61, NAND gates 60, NOR gates 62, ring dot gates 58 (which are the inverse of EXCLUSIVE ORs) and transfer gates 63. These logic gates are interconnected such that in response to a preselected code on instruction bits $I_5$, $I_4$, and $I_3$, eight separate arithmetic operations may be effected. Operation of the logic in performing an add instruction is shown in FIG. 22. The logic associated with the subtract instruction and EXCLUSIVE OR instructions are shown respectively in FIGS. 23 and 24.

With reference now to FIG. 22, description of the logic of one bit of the arithmetic logic unit in performing an add instruction will be described. If an add instruction is desired, the control signal 152 will be a logic 0. This signal is labelled Su + SB + CP + W. It will be recalled that this signal is generated by the arithmetic logic unit control circuit described previously with respect to FIG. 17. With reference to FIG. 17, it may be seen that if the instruction bits $I_5$, $I_4$, and $I_3$ are respectively 000, the code corresponding to add (reference Table V) then the output of AND gate 96 will be a logic 0. Hence, the control signal 152 is 0 when an add instruction is desired. Similarly, the inverse of the control signal 152 labelled 154 in FIG. 22, is a logic 1.

Signal 154 is applied to the OR gate 155*a* and the inverter 73*a*. The output of the inverter 73*a* is applied to one input of the OR gate 155*b*. The input signal $\overline{X_n}$ which is outputed from the temporary storage register illustrated in FIG. 18, is applied directly to the other input of the OR gate 155*b*. The signal $\overline{X_n}$ is inverted by inverter 73*b* to produce the true signal $X_n$ which is applied to the other input of the OR gate 155*a* and also to an input of the ring dot gate 75. The logic 1 level of the control signal 154, i.e., $\overline{SU + SB + CP + W}$ enables operation of the arithmetic unit. The output of the NAND gate 74 will be bit $X_n$. For example, consider a situation where the bit $X_n$ from the temporary storage register such as 114 in FIG. 18, is a logic 1. For this situation, when the control signal 154 goes to a logic 1, the inputs to the OR gate 155*b* are logic 0 from the inversion 73*a*, and 0 from the signal $\overline{X_n}$. This produces an output of the OR gate 155*b* of a logic 0, which forms one input to NAND gate 74. Further, one input to the OR gate 155*a* is a logic 1 corresponding to the control signal 154. The other input to the OR gate 155*a* is a logic 1 corresponding to the true value of the bit $X_n$. This produces an output of the OR gate 155*a* of a logic 1, which is also an input to the NAND gate 74. Thus NAND gate 74 has inputs of 0 and 1 corresponding to an output of a logic 1 which, in turn, is the logic level assumed for the bit $X_n$. In a similar manner, it may be shown that where the logic bit $X_n$ is a 0, a logic 0 will be produced at the output of NAND gate 74.

The inverse of the EXCLUSIVE OR of bit $X_n$ and $Y_n$ will be formed by the circle dot gate 75, one input of which is the signal $X_n$ taken from the output of the inverter 73*b*, and the true signal $Y_n$. The output of the gate 75 is labelled $\overline{X_n \oplus Y_n}$. This output is part of the sum and carry of the sum $X_n$ and carry $C_n$. The carry will first be traced. The output of gate 70 will be the NAND combination of $X_n$ and $Y_n$. This output is shown as $\overline{X_n \cdot Y_n}$. If these bits $X_n$ and $Y_n$ are both logic 1, a carry must be generated. This is accomplished since logic 1 inputs to the NAND gate 70 effecting a logic 0 output which is effective to operate the transfer gate 158, generating a carry ($C_n$) signal since clock phase 2 is normally a logic 1 level. If a carry is not generated, then a carry may be propagated by the inverse of the EXCLUSIVE OR of $X_n$ or $Y_n$, shown at the output of gate 75. This occurs because the output $\overline{X_n \oplus Y_n}$ is transferred through gate 176 to logic gate 160. The carry will be propagated from node 82 through gate 160 to the next bit $C_n$. The input to node 82 will be either $C_{n-1}$ or a generate from the NAND term $X_{n-1}$ and $Y_{n-1}$.

The sum $F_n$ is expressed as $F_n = X_n \oplus Y_n + C_{n-1}$; $C_n = X_n \cdot Y_n + C_{n-1} (X_n \oplus Y_n)$. The sum $F_n$ will be generated through the inverse EXCLUSIVE OR gate 78 and will be the EXCLUSIVE OR of the carry $C_{n-1}$ and EXCLUSIVE OR of $X_n$ or $Y_n$. The sum term at the output of gate 78 generates the bus if a *F occurs for that time frame at NAND gate 86.

FIG. 23 shows the operation of the ALU logic to effect subtraction. As may be seen from the sum term $F_n = X_n \oplus Y_n \oplus C_{n-1}$, the difference is the same for subtract as add. The only difference between operation of the two circuits is that the $X_n$ input to the carry equation is inverted. This may be seen at the output of the NAND gate 70, where the output is shown as $\overline{Y_n \cdot X_n}$. Otherwise, operation of the subtract logic is the same as for add as described with reference to FIG. 22.

With respect to FIG. 24, operation of an EXCLUSIVE OR instruction will be described. For this example, the sum $F_n$ is equal to $X_n \oplus Y_n$. For an EXCLUSIVE OR operation, the signal XR must be a logic 1. This signal will be generated when the instruction bits $I_3$, $I_4$, and $I_5$ are respectively 101. (Reference Table V). With reference back to FIG. 17, it may be seen that such a coding for instruction register bits $I_3$, $I_4$, and $I_5$ will produce a logic 1 at the output of the NAND gate 96a, producing an output signal XR that is a logic 1. The signal $\overline{ND + XR}$ is applied to the transfer gate 164. This signal will be a logic 0 when the signal "ND + XR + W" is a logic 1. The transfer gate 164 will be activated by the signal 162 such that a logic 1 is transferred to the input of gate 168. The signal 166 is the inverse of EXCLUSIVE OR of the two terms $X_n$ and $Y_n$. The inverse of this EXCLUSIVE OR will be combined with the logic 1 present at the input of gate 168. The output of gate 168 forms the EXCLUSIVE OR of the terms $X_n$ and $Y_n$. This output will be gated onto the bus when the control signal *F is a logic 1 at the NAND gate 86.

In a similar manner, the logic associated with the other arithmetic operations may be traced through the logic of the arithmetic unit.

PARITY CIRCUIT DESCRIPTION

A precharged parity circuit in accordance with the present invention includes the advantage of increased speed of operation. This circuit will be described with reference to FIG. 20. The parity circuit includes precharged insulated gate field effect transistors shown generally at 174, having gate inputs labelled phase 1. Inputs from the bus are labelled F and $\overline{F}$. For the illustrative 8-bit parity circuit of FIG. 20, there are eight $\overline{F}$ signals, $\overline{F_0}$ through $\overline{F_7}$, and eight F signals, $F_0$ through $F_7$. These inputs are selectively applied to gates of interconnected insulated gate field effect transistors to produce odd parity and even parity outputs.

Operation of the precharged parity circuit is as follows. During phase 1 of the clock, nodes shown generally at 170 are precharged to a reference voltage $V_{DD}$. During the high part of the clock; that is, when transistors 174 are non-conductive, nodes 170 are conditionally discharged depending on the inputs $\overline{F}$ and F to the parity circuit. By way of example, node 170*a* would be discharged if $\overline{F}_1$ and $F_0$ were both logic 0's, or if $F_1$ and $\overline{F}_0$ were both logic 0's. With reference to node 170*b*, the inverse occurs; i.e., node 170*b* discharges if inputs $F_1$ and $F_0$ are both logic 0's or if inputs $\overline{F}_1$ and $\overline{F}_0$ are both logic 0's. Thus, the function of the inputs at 178 may be expressed as $\overline{F}_0 \cdot \overline{F}_1$, the function at 180 as $\overline{F}_1 \cdot F_0$; the function at 182 as $\overline{F}_1 \cdot \overline{F}_0$; and the function at 184 as $F_1 \cdot F_0$. The functions 178 and 180 are combined at node 170*a* to result in the exclusive or function $F_0 \oplus F_1$. Similarly, the functions 182 and 184 are combined at node 170 *b* to yield $\overline{F_0 \oplus F_1}$. In other words, the node 170*a* will be discharged only if signals $F_0$ and $F_1$ are opposite logic levels. If both inputs are logic 1's, or if both are logic 0's, the node will not discharge. Similarly, the inverse is true for node 170*b;* i.e., the node will not discharge for the situation where the signal $F_0$ and $F_1$ are opposite. Parity is the exclusive or of all of the bits that parity is to be checked for. The circuit can be expanded for as many bits as desired. Parity is the EXCLUSIVE OR term. The inverse of EXCLUSIVE OR is called even parity.

ARITHMETIC FLAGS

The arithmetic unit flags carry (C), zero (Z), sign (S) and parity (P) will be described with reference to FIG. 21. The sign flag indicates the status of bit 7 of an arithmetic sum. If bit 7 is a logic 1, the sign flag will be true; if bit 7 is a 0, the sign flag will be false. Operation is as follows. Consider first the example where bit 7 is a logic 1. It will be noted that the bus shown generally at 25 is inverted. Thus, a logic 1 for bit 7 will be present on line 7 as a logic 0. This logic 0 is inverted by the inverter 700 to produce a true data bit signal. This logic 1 will be transferred on phase 2 of the clock by the transfer gate 701 to form one input of the AND gate 702. The other input of the AND gate 702 is formed by the control signal #CZSP. When this control signal goes to a logic 1, the output of AND gate 702 is a logic 1. This ensures that the output of the NOR gate 706 is a logic 0. On the subsequent phase 1 of the clock, this logic zero is inverted by the inverter 708 to form the true or logic 1 output of the sign flag. This logic 1 is transferred back through the transfer gate 709 on phase 2 of the clock to form one input of the AND gate 704. If the control signal # CZSP goes to a logic 0, the other input to the AND gate 704 will be a logic 1. This will ensure that the logic 1 level of the sign flag will recirculate until $\overline{\text{BUS}}$ 7 is again sampled. Similarly, if the data on bus bit 7 is a true logic 0, the inverted signal logic 1 will be present on the inverted bus. This logic 1 will be inverted by the inverter 700 to form a logic 0 as an output of the inverter 700. This logic 0 is transferred by the transfer gate 701 during phase 2 of the clock to one input of the AND gate 702. A 0 input to the AND gate ensures that the output of the AND gate 702 is also a 0. Similarly, when the control signal # CZSP goes to a logic 1, it is applied as one of the inputs of AND gate 704, ensuring a logic 0 output therefrom. Thus, both inputs to the NOR gate 706 are logic 0's, producing an output that is a logic 1. This logic 1 output is transferred during phase 1 by the transfer gate to the inverter 708 which produces a logic 0 output as the sign flag corresponding to the zero level of bit seven of the bus.

The zero flag indicates that all of the inputs of the arithmetic unit are logic 0's; that is, bits 0 through 7 are all logic 0's. For example, for the situation where all of the bits 0 through 7 are 0's, a logic 1 will be present on these lines since the bus 25 is inverted. This will enable the NAND gate 710 producing a logic 0 output therefrom. This logic 0 output is inverted by the inverter 712 to provide a logic 1 as an input to the AND gate 714. The other input to the AND gate 714 is also a logic 1 when the control signal # CZSP is true. Thus, the output at the AND gate 714 is a logic 1 ensuring that the output of the NOR gate 716 is a logic 0. During phase 1 of the clock, the logic 0 output of the NOR gate 716 is inverted by inverter 718 such that the Z flag is a logic 1. Similarly, it may be seen that if any of the bus bits 0 through 7 are logic 1's rather than 0's, the output of the NAND gate 710 will be a logic 1, and the level of the Z flag will be 0.

The parity flag indicates that there is an odd number of 1 bits in the 8-bit output of the arithmetic unit. The details of the parity circuit itself were described with reference to FIG. 20. The logic for producing the parity output (P) in response to the control signal #CZSP going to a logic 1 is similar to that described with reference to the sign and zero flags.

The flag carry is updated if a carry out of bit 7 of the arithmetic unit occurs. The carry flag will also be updated for a shift right or shift left instruction. The other flags are not affected. A shift left operation will indicate the least significant bit of the 8-bit output after the shift. A shift right will indicate the most significant bit of the 8-bit output. By way of example, the control signal #$\overline{\text{SLC}}$ is the inverse of the control signal *LFT which controls a shift left command. Operation of this signal was described with reference to FIG. 18. When the signal *LFT becomes a logic 1, this generates shift left command. Thus, the control signal $\overline{\text{SLC}}$ is a logic 0. This logic 0 is applied as an input to the NOR gate 722. As may be seen, the other input to the NOR gate 722 samples the least significant bit, bit 0, of the bus 25. If this bit is a logic 1, it will be represented on the bus bit 0 as a logic 0 since the bus is inverted. The logic 0 will enable the NOR gate 722 to provide a logic 1 output. This will be sampled through the OR gate 724 providing a carry sign of logic 1. Similarly, it may be seen that the NOR gate 726 samples the most significant bit; i.e., bus bit 7 after a shift right instruction.

The carry flag is also set if a carry out of bit 7 in the arithmetic unit occurs. For this situation, a logic 1 is applied to the input of the inverter 728. This is clocked during phase 1 to an input of the NOR gate 730 producing a logic 0 at this input. The output of NOR gate 730 will be a logic 1 if the other input to the gate is a logic 0. With reference back to FIG. 17, it may be seen that the other input to the NOR gate 730 will be a logic 0 for the situation where the instruction bits $I_3$, $I_4$, and $I_5$ are respectively 110, 010, 100, or 111, the codes corresponding to the arithmetic operations OR, SU, ND, and CP. The logic 1 output of NOR gate 730 is inverted at 732 to provide a logic 0 input to the NOR gate 734. The other input to the NOR gate 734 is an inverted control signal # CZSP. Thus, when this control signal goes to a logic 1, its inverse, logic 0, is applied to the NOR gate 734 producing a logic 1 output therefrom. This logic 1 output is sampled through the OR gate 724 to produce a logic 1 carry flag. This signal is connected to the control portion of the ALU illustrated in FIG. 17 to generate the signal $\overline{C_{in}}$. It may be seen that the value of $\overline{C_{in}}$ will be a logic 0 when the carry flag is a logic 1 and instruction bit $I_3$ is a 1 and the instruction bit $I_5$ is a 0. The signal $\overline{C_{in}}$ is applied as an input to the arithmetic unit described with reference to FIG. 19.

The status of the carry flag will be recirculated by NAND gate 735 for the following situation. Assume, for purposes of illustration, that the carry flag is a logic 1. The output of the NOR gate 735 will recirculate this logic 1 when both of its input are logic 0's. One of its inputs is an inverted output from OR gate 724. The output of the OR gate 724 is a logic 1 for the situation where the carry flag is a logic 1 so its inverted level will be required logic 0. The other logic 0 input to the NOR gate 735 is produced by the NAND gate 736. The output of the NAND gate 736 will be a logic 0 when all of its inputs are logic 1's. One of its inputs is the inverted control signal CZSP. For the situation where this control signal is a logic 0; that is, when it is not desired to update the status of the flags, then its inverted signal, logic 1, will be one of the inputs to the NAND gate 736. The other two inputs to the NAND gate 736 are respectively # $\overline{SLC}$ and # $\overline{SRC}$, the signals corresponding to shift left and shift right instructions. For the situation where no shifts are desired, these signals will have a logic level of 1 since they are the inverse of the control signal specifying the shift instructions. Thus, when it is not desired to update the status of the flags, and when no shift instructions are being executed, the NAND gate 736 will have an output of logic 0, allowing the status of the carry flag to be recirculated.

CPU RAM

The internal RAM of the CPU in accordance with the present invention is illustrated in FIG. 25. The RAM contains 192 bits of data storage organized into 24 8-bit registers. Eight of these registers are the low order address registers ($P_L$); eight are the high order address registers ($P_H$); and eight form general purpose memory registers, seven of which are generally available and one of which is used only internally. The sixteen registers used for program address, $P_L$ and $P_H$, enable 16-bit addressing. Only one program address register is used at a time, the other seven are used for a pushdown stack subroutine call operation.

With reference now to FIG. 25, one section of the RAM is illustrated generally at 200 and illustrates one bit of each of the three types of registers, i.e., general purpose registers (A, B, C, D, E, H, L and M'), high order address registers $P_H$ and low order address registers $P_L$. There are eight sections similar to block 200. Operation of the RAM is as follows. The RAM control signals U and V, shown generally at 201, are coded to select either the low address registers $P_L$, the high address registers $P_H$, the general purpose registers, or a refresh counter. By way of example, if the control signals U and V are both logic 1's, during phase 1 of the clock the transfer gates shown at 201 will provide logic 1 inputs to the NAND gate 224. The output of the NAND gate 224 is a logic 0. This signal is inverted at 226 to a logic 1 level. The logic 1 is applied as an input to the inverting buffer shown generally at 230 and also to the inverter 228. A logic zero output of the inverter 228 is applied to the gate of the MOS devices shown at 216, enabling these devices for address line selection, as will be described hereinafter.

The logic 1 output of the inverter 226 is gated by phase 2 of the clock to the input of the inverter 230A. The output of this inverter is a logic 0. This logic 0 is gated during phase 1 of the clock to the input of inverter 230B. Thus, it may be seen that two delays are imparted to the output of the inverter 226. The logic 0 input to the inverter 230B is applied to one input of the complex logic shown generally at 220, and in particular, to one input of the NOR gate 220A. The other input to the NOR gate 220A is the $\overline{BUS}$ line 221.

The logic 0 on line 234 (which is the input to the inverter 230B) will transfer the data on the bus line 221 onto the line labelled 236 which is the output of the OR gate 220B. This line 236 accesses one column of the internal storage cells of the RAM. Thus, when a logic 0 is present on the line 234, it is possible to write data into the general purpose registers selected by the control signals U and V, both being logic 1's. It is to be understood, of course, that other selections of U and V would have addressed the high order address registers ($P_H$) or the low order address registers ($P_L$).

It may be seen that the data present on the inverted bus 221 will be reproduced on the line 236. For example, consider that a true logic 1 signal is present on the bus line 221. Since the bus is inverted, it will be present on the bus as a logic 0 level. This logic 0 level will combine with the logic 0 input from line 234 of the NOR gate 220*a* to produce a logic 1 of that NOR gate. This logic 1 output will be sampled by the OR gate 220*b* to produce a logic 1 output on line 236, which would enable storage of a logic 1.

For purposes of illustration, let us assume that it is desired to store information into the internal storage cell of the RAM shown generally at 232 which is bit $D_i$ of the D register. The "*i*" in the present example, of course, may be any of the bits 0 through 7. In response to the logic 0 level of the line 234, the data on the bus 221 will be transferred to the line 236. This line will access all of the registers A, B, C, D, E, H, L, and M'. To select the block 232 for storage of data, the input lines $A_1$, $A_2$, and $A_3$ must respectively be 1, 1, and 0. This code, for example, corresponds to the source and destination codes for selecting the D register as set forth in Table V; that is, for a destination of a D register, the instruction bits 2, 1, and 0 must respectively be 0, 1, and 1. this coding is effective to select the D register as follows. The output of inverter 228 is a logic 0 which enables the transfer gates 216. The $A_1$, $A_2$, and $A_3$ logic levels are thus respectively applied to the inverters 212*a*, 212*b*, and 212*c*, resulting in respective outputs of logic 0, logic 0, logic 1. The signals $A_1$, $A_2$ and $A_3$, or the complement of these signals, are respectively applied as inputs to NAND gates shown generally at 215. It may be seen that for the situation where $A_1$, $A_2$, and $A_3$ are respectively logic 1, logic 1, and logic 0, only the NAND gate 215a has inputs that are all logic 1's. The output of this NAND gate, logic 0, is inverted by inverter 217 to a logic 1. This logic 1 is transferred on phase 1 of the clock to the input inverters 219, labelled $\phi 1$ and $\phi 2'$ which are coupled to the storage cell 232. The output of the inverter $\phi 1'$ is labelled 244 and the output of the inverter $\phi 2'$ is labelled 242. As will be explained hereinafter (FIG. 26), the inverters labelled $\phi 1'$ and $\phi 2'$ are clocked inverters which are used advantageously to address the memory cells.

During the time phase 2, the write line 242 of the memory cell will be enabled. The read line of the memory cell is shown at 244, while the output line is shown at 248. Detailed description of the operation of the dynamic random access memory cell 232 is explained in the description of FIGS. 4*a* and 4*b*. During phase 1 of the clock, if the signal 234 is low, indicating the selection of one of the registers, the register output will be selected through the complex gate 256 to node 252. At this point, if the generate signal *RAM becomes a logic 1, the NAND gate 254 will be activated and the output transferred to the $\overline{\text{BUS}}$. During phase 2, information may be written into the storage cell, such as 232, from the bus bar via the line 236.

Consider, for example, that a 0 is stored in the memory cell 232 and that it is desired to read this data. Thus, the line 244 is biased to a logic 0 during phase 1 and the logic 0 data stored in the cell is transferred to the output line 248. This logic 0 forms one input to the NOR gate 250*a*. The pther input to the NOR gate 250*a* is the line 234. This signal is also a logic 0. Thus, the output of NOR gate 250*a* is a logic 1. This logic 1 is transferred through the OR gate 250*b* and is transferred to one of the inputs of the NAND gate 254 during phase 1. This ensures that the output of the NAND gate 254 is a logic 0. This logic 0 is stored on the bus line 221. Similarly, if a logic 1 were stored in the memory cell 232, the output of the NOR gate 250*a* would be a logic 0. Thus, the output of the OR gate 250*b* would also be a zero forming one input to the NAND gate 254. In response to the signal *RAM becoming a logic 1, the other input to the NAND gate 254 becomes a logic 0. This enables a logic 1 output to be distributed on the bus.

In a similar manner, the high order address registers $P_H$ and the low order address registers $P_L$ could be addressed by a control signal U $\overline{V}$ combination of $\overline{U}$V and UV respectively.

Other operational portions of the RAM include a stack pointer, a refresh counter, and the a, locations $P_L$ or $P_H$. The stack pointer will continually point to one location in the pushdown stack. This location will be the current program address. If the RAM input signals U and V are codes 01 or 10, this will produce an output from the NAND gate 255 of logic 1. This logic 1 is inverted by inverter 257 and enables the transfer gate shown generally 256. These transfer gates enable outputs from the stack pointer S1, S2, and S3. These outputs are respectively connected to inverters 2122, 212*b*, and 212*c*. Depending on the logic levels of S1, S2 and S3, one of the levels, that is rows, in the RAM of the $P_H$ registers or $P_L$ registers will be selected. Whether it is the $P_H$ register or the $P_L$ register depends upon whether the coding of U and V was 10 or 01. If a call instruction or return instruction is executed, the stack pointer address will be changed by changing the count in the stack pointer.

The logic of the stack pointer is illustrated in FIG. 27. The stack pointer comprises an up-down counter and has two inputs, pop and push. For every pop signal, the counter will increase by one count. A push will decrease the count by one. This counter will store the new location of the program address until another return or call is executed. Calls will cause the counter to count one direction and returns will make the counter count in the other direction. From this, it may be seen that the stack pointer provides a convenient and advantages method for subroutine addressing.

Operation of the stack pointer may better be seen by reference to the truth table, Table IX. The inputs, outputs, or registers printed in the stack truth table are as follows, when names listed from top to bottom are

TABLE IX

| | RI DN YT | INPUT 76543210 | INST. 76543210 | A REG. 76543210 | ADDRESS LEVEL 0 111111 5432109876543210 | ADDRESS LEVEL 1 111111 5432109876543210 | ADDRESS LEVEL 3 111111 5432109876543210 |
|---|---|---|---|---|---|---|---|
| 0 | 11 | 11111111 | 11111111 | 11111111 | 1111111111111111 | 1111111111111111 | 1111111111111111 |
| 1 | 11 | 00000000 | 00000000 | 00000000 | 0000000000000000 | 0000000000000000 | 0000000000000000 |
| 2 RST | 11 | 00110101 | 00110101 | 00000000 | 0000000000000000 | 0000000000000000 | 0000000000000000 |
| 3 | 11 | 10000000 | 00110101 | 00000000 | 1100000000000000 | 0000000000000000 | 0000000000000000 |
| 4 ADA | 11 | 10000000 | 10000000 | 00000000 | 1100000000000001 | 0000000000000000 | 0000000000000000 |
| 5 JTZ | 11 | 01101000 | 01101000 | 00000000 | 1100000000000010 | 0000000000000000 | 0000000000000000 |
| 6 | 11 | 11111111 | 01101000 | 00000000 | 1100000000000000-11 | 0000000000000000 | 0000000000000000 |
| 7 | 11 | 10101000 | 01101000 | 00000000 | 1010100011111111 | 0000000000000000 | 0000000000000000 |
| 8 JTC | 11 | 01100000 | 01100000 | 00000000 | 1010100000000000 | 0000000000000000 | 0000000000000000 |
| 9 | 11 | 11111111 | 01100000 | 00000000 | 1010100000000001 | 0000000000000000 | 0000000000000000 |
| 10 | 11 | 00001101 | 01100000 | 00000000 | 1010100000000010 | 0000000000000000 | 0000000000000000 |
| 11CTP | 11 | 01111010 | 01111010 | 00000000 | 1010100000000011 | 0000000000000000 | 0000000000000000 |
| 12 | 11 | 00110010 | 01111010 | 00000000 | 1010100000000100 | 0000000000000000 | 0000000000000000 |
| 13 | 11 | 11101111 | 01111010 | 00000000 | 1010100000000101 | 0000000000000000 | 0000000000000000 |
| 14CAL | 11 | 01101110 | 01101110 | 00000000 | 1010100000000110 | 0000000000000000 | 0000000000000000 |
| 15 | 11 | 01111110 | 01101110 | 00000000 | 1010100000000111 | 0000000000000000 | 0000000000000000 |
| 16 | 11 | 00001111 | 01101110 | 00000000 | 1010100000001000 | 0000111101111110 | 0000000000000000 |
| 17 JMP | 11 | 01010100 | 01010100 | 00000000 | 1010100000001000 | 0000111101111111 | 0000000000000000 |
| 18 | 11 | 10100011 | 01010100 | 000011111-0000000 | 1010100000001000 | 0000111110000000 | 0000000000000000 |
| 19 | 11 | 11000111 | 01010100 | 00000000 | 1010100000001000 | 1100011110100011 | 0000000000000000 |
| 20CFC | 11 | 01000010 | 01000010 | 00000000 | 1010100000001000 | 1100011110100100 | 0000000000000000 |
| 21 | 11 | 01010110 | 01000010 | 00000000 | 1010100000001000 | 1100011110100101 | 0000000000000000 |
| 22 | 11 | 11111101 | 01000010 | 00000000 | 1010100000001000 | 1100011110100110 | 0000000000000000 |
| 23CTZ | 11 | 01101010 | 01101010 | 00000000 | 1010100000001000 | 1100011110100110 | 0000000000000000 |
| 24 | 11 | 11010111 | 01101010 | 00000000 | 1010100000001000 | 1100011110100110 | 0000000000000000 |
| 25 | 11 | 00011111 | 01101010 | 00000000 | 1010100000001000 | 1100011110100110 | 0001111111010111 |
| 26CFS | 11 | 01010010 | 01010010 | 00000000 | 1010100000001000 | 1100011110100110 | 0001111111011000 |
| 27 | 11 | 11111111 | 01010010 | 00000000 | 1010100000001000 | 1100011110100110 | 0001111111011001 |
| 28 | 11 | 11111111 | 01010010 | 00000000 | 1010100000001000 | 1100011110100110 | 0001111111011010 |
| 29CFP | 11 | 01011010 | 01011010 | 00000000 | 1010100000001000 | 1100011110100110 | 0001111111011010 |
| 30 | 11 | 11111100 | 01011010 | 00000000 | 1010100000001000 | 1100011110100110 | 0001111111011010 |
| 31 | 11 | 00101001 | 01011010 | 00000000 | 1010100000001000 | 1100011110100110 | 0001111111011010 |
| 32INP | 11 | 01001011 | 01001011 | 00000000 | 1010100000001000 | 1100011110100110 | 0001111111011010 |
| 33 | 11 | 11010001 | 01001011 | 11000001 | 1010100000001000 | 110000111101001- | 0001111111011010 |

TABLE IX-continued

| | RI DN YT | INPUT 76543210 | INST. 76543210 | A REG. • 76543210 | ADDRESS LEVEL 0 111111 5432109876543210 | ADDRESS LEVEL 1 111111 5432109876543210 | ADDRESS LEVEL 3 111111 5432109876543210 |
|---|---|---|---|---|---|---|---|
| 34ADA | 11 | 10000000 | 10000000 | 10100010 | 1010100000001000 | 10 1100011110100110 | 0001111111011010 |

| | ADDRESS LEVEL 6 111111 5432109876543210 | ADDRESS LEVEL 7 111111 5432109876543210 | CZSP |
|---|---|---|---|
| 0 | 1111111111111111 | 1111111111111111 | 1111 |
| 1 | 0000000000000000 | 0000000000000000 | 1101 |
| 2 RST | 0000000000000000 | 0000000000000000 | 1101 |
| 3 | 0000000000000000 | 0000000000000000 | 1101 |
| 4 ADA | 0000000000000000 | 0000000000000000 | 0100 |
| 5 JTZ | 0000000000000000 | 0000000000000000 | 0100 |
| 6 | 0000000000000000 | 0000000000000000 | 0100 |
| 7 | 0000000000000000 | 0000000000000000 | 0100 |
| 8 JTC | 0000000000000000 | 0000000000000000 | 0100 |
| 9 | 0000000000000000 | 0000000000000000 | 0100 |
| 10 | 0000000000000000 | 0000000000000000 | 0100 |
| 11CTP | 0000000000000000 | 0000000000000000 | 0100 |
| 12 | 0000000000000000 | 0000000000000000 | 0100 |
| 13 | 0000000000000000 | 0000000000000000 | 0100 |
| 14CAL | 0000000000000000 | 0000000000000000 | 0100 |
| 15 | 0000000000000000 | 0000000000000000 | 0100 |
| 16 | 0000000000000000 | 0000000000000000 | 0100 |
| 17 JMP | 0000000000000000 | 0000000000000000 | 0100 |
| 18 | 0000000000000000 | 0000000000000000 | 0100 |
| 19 | 0000000000000000 | 0000000000000000 | 0100 |
| 20CFC | 0000000000000000 | 0000000000000000 | 0100 |
| 21 | 0000000000000000 | 0000000000000000 | 0100 |
| 22 | 0000000000000000 | 0000000000000000 | 0100 |
| 23CTZ | 0000000000000000 | 0000000000000000 | 0100 |
| 24 | 0000000000000000 | 0000000000000000 | 0100 |
| 25 | 0000000000000000 | 0000000000000000 | 0100 |
| 26CFS | 0000000000000000 | 0000000000000000 | 0100 |
| 27 | 0000000000000000 | 0000000000000000 | 0100 |
| 28 | 0000000000000000 | 0000000000000000 | 0100 |
| 29CFP | 0000000000000000 | 0000000000000000 | 0100 |
| 30 | 0000000000000000 | 0000000000000000 | 0100 |
| 31 | 0000000000000000 | 0000000000000000 | 0100 |
| 32INP | 0000000000000000 | 0000000000000000 | 0100 |
| 33 | 0000000000000000 | 0000000000000000 | 0100 |
| 34ADA | 0000000000000000 | 0000000000000000 | 1011 |

| | RI | INPUT | INST | A REG. | ADDRESS LEVEL 0 | ADDRESS LEVEL 1 | ADDRESS LEVEL 3 |
|---|---|---|---|---|---|---|---|
| 35CTC | 11 | 01100010 | 01100010 | 10100010 | 1010100000001000 | 11000111010110 | 0001111111011010 |
| 36 | 11 | 00011010 | 01100010 | 10100010 | 1010100000001000 | 1100011110100110 | 0001111111011010 |
| 37 | 11 | 10110110 | 01100010 | 10100010 | 1010100000001000 | 11000111010010 | 0001111111011010 |
| 38CFZ | 11 | 01001010 | 01001010 | 10100010 | 1010100000001000 | 1100011110100110 | 0001111111011010 |
| 39 | 11 | 00101010 | 01001010 | 10100010 | 1010100000001000 | 1100011110100110 | 0001111111011010 |
| 40 | 11 | 11111110 | 01001010 | 10100010 | 1010100000001000 | 1100011110100110 | 0001111111011010 |
| 41CTS | 11 | 01110010 | 01110010 | 10100010 | 1010100000001000 | 1100011110100110 | 0001111111011010 |
| 42 | 11 | 01011111 | 01110010 | 10100010 | 1010100000001000 | 1100011110100110 | 0001111111011010 |
| 43 | 11 | 11111100 | 01110010 | 10100010 | 1111110001011111 | 1100011110100110 | 0001111111011010 |
| 44CTP | 11 | 01111010 | 01111010 | 10100010 | 1111110001100000 | 1100011110100110 | 0001111111011010 |
| 45 | 11 | 10110010 | 01111010 | 10100010 | 1111110001100001 | 1100011110100110 | 0001111111011010 |
| 46 | 11 | 11100110 | 011111010 | 10100010 | 1111110001100010 | 1110011010110010 | 0001111111011010 |
| 47CFP | 11 | 01011010 | 01011010 | 10100010 | 1111110001100010 | 111011010110011 | 0001111111011010 |
| 48 | 11 | 01111101 | 01011010 | 10100010 | 1111110001100010 | 1110011010110100 | 0001111111011010 |
| 49 | 11 | 10111011 | 01011010 | 10100010 | 1111110001100010 | 1110011010110101 | 0001111111011010 |
| 50JFZ | 11 | 01001000 | 01001000 | 10100010 | 1111110001100010 | 1110011010110110 | 0001111111011010 |
| 51 | 11 | 01111111 | 01001000 | 10100010 | 1111110001100010 | 1110011010110111 | 0001111111011010 |
| 52 | 11 | 10000000 | 01001000 | 10100010 | 1111110001100010 | 0000000001111111 | 0001111111011010 |
| 53RET | 11 | 00101111 | 00101111 | 10100010 | 1111110001100010 | 0000000010000000 | 0001111111011010 |
| 54RTZ | 11 | 001010011 | 00101011 | 10100010 | 1111110001100011 | 0000000010000000 | 0001111111011010 |
| 55RTC | 11 | 00100011 | 00100011 | 10100010 | 1111110001100100 | 0000000010000000 | 0001111111011010 |
| 56RFP | 11 | 00011011 | 00011011 | 10100010 | 1111110001100100 | 0000000010000000 | 0001111111011010 |
| 57RTS | 11 | 00110011 | 00110011 | 10100010 | 1111110001100100 | 0000000010000000 | 0001111111011010 |
| 58HALT | 11 | 00000000 | 00000000 | 10100010 | 1111110001100100 | 0000000010000000 | 0001111111011010 |

| | ADDRESS LEVEL 6 | ADDRESS LEVEL 7 | CZSP |
|---|---|---|---|
| 35CTC | 0000000000000000 | 0000000000000000 | 1011 |
| 36 | 0000000000000000 | 0000000000000000 | 1011 |
| 37 | 1011011000011010 | 0000000000000000 | 1011 |
| 38CFZ | 1011011000011011 | 0000000000000000 | 1011 |
| 39 | 1011011000011100 | 0000000000000000 | 1011 |
| 40 | 1011011000011101 | 1111111000101010 | 1011 |
| 41CTS | 1011011000011101 | 1111111000101011 | 1011 |
| 42 | 1011011000011101 | 1111111000101100 | 1011 |
| 43 | 1011011000011101 | 1111111000101101 | 1011 |
| 44CTP | 1011011000011101 | 1111111000101101 | 1011 |
| 45 | 1011011000011101 | 1111111000101101 | 1011 |
| 46 | 1011011000011101 | 1111111000101101 | 1011 |
| 47CFP | 1011011000011101 | 1111111000101101 | 1011 |
| 48 | 1011011000011101 | 1111111000101101 | 1011 |
| 49 | 1011011000011101 | 1111111000101101 | 1011 |
| 50JFZ | 1011011000011101 | 1111111000101101 | 1011 |

TABLE IX-continued

| | ADDRESS LEVEL 6 | ADDRESS LEVEL 7 | CZSP |
|---|---|---|---|
| 51 | 1011011000011101 | 1111111000101101 | 1011 |
| 52 | 1011011000011101 | 1111111000101101 | 1011 |
| 53RET | 1011011000011101 | 1111111000101101 | 1011 |
| 54RTZ | 1011011000011101 | 1111111000101101 | 1011 |
| 55RTC | 1011011000011101 | 1111111000101101 | 1011 |
| 56 RFP | 1011011000011101 | 1111111000101110 | 1011 |
| 57 RTS | 1011011000011101 | 1111111000101111 | 1011 |
| 58HALT | 1011011000011110 | 1111111000101111 | 1011 |

respectively the names from left to right on the table.

Ready
Interrupt
Input
Instruction Register
A Register
Address level 0
Address level 1
Address level 3
Address level 6
Address level 7
Carry
Zero
Sign
Parity With reference to Table IX, the first two instructions are RST and ADA. These instructions are operative to set the program address level to zero and set the carry flag to reflect status of the A register. The next instruction is a jump true zero (JTZ). The instruction is transferred during time 5 since the zero flag is true. During the next two times, first the low address bits will be input and then the high order address bits. These bits are shown in the program address level zero during time 7. During time 8, a jump true carry (JTC) is executed. Because carry is in a false state, this instruction is not executed. The next instruction is a call true parity (CTP). This instruction will not be executed since parity is not true. The following instruction call is an unconditional call and will be executed. The program counter will continue to increment for the three cycles of the call. This is shown in address level zero. Because it is a call, the address level will be changed to address level 1 in the STACK. The inputs during times 15 and 16 are transferred to address level 1 and are shown during time 16. During time 52, a jump false zero is instituted. The jump false zero charge can be seen in address level 1. During the next instruction time 53, an unconditional return is executed. It may be seen that the address level 1 is updated but that program address controls returned to stack level 0. This is shown by looking at the address counter during time 54. The address level 0 counter was updated and address level 1 remains the same. The next instruction is a return true zero. This instruction will not be executed because the zero flag is at a zero state and control will remain at level zero. Thd next instruction is a return false parity. This instruction returns control from address level zero to address level 7 as may be seen during time 57 where in the address level 0 is not incremented but address level 7 is. Because the stack is an up-down counter, when address level 0 is reached, an additional return will transfer control back to level 7.

Again with reference to FIG. 25, the other combinations of U and V input signals is the situation where U and V are both logic 0's. For this situation, the NAND gate 227 is enabled providing a logic 1 input signal to the refresh counter and a logic 0 input to the gate of the transfer devices shown generally at 258. This signal enables the output to the refresh counter R1, R2 and R3 to be coupled respectively to the inverters 212*a*, 212*b*, and 212*c*. This will enable one entire row of the RAM to be refreshed. The refresh counter will increment one every time U and V are both selected as logic 0's. The counter counts from 0 to 7. This allows the eight rows in the RAM to be refreshed after eight count pulses. The instruction control is designed so at least one refresh occurs during an instruction. If no instructions are being executed because of a "wait" state or a "halt" condition in the CPU, the refresh counter will continually refresh the dynamic random access memory, ensuring that all data will remain valid. Table VIII illustrates when the refresh of each instruction cycle occurs. Referring to Table VIII, it may be seen that during fetch subcycle times S1, S2, S3, and S4, the registers $P_L$ or $P_H$ are always being accessed. Thus, refresh cannot occur at this time. During state 1 of execute, however, it may be seen that the RAM is never accessed. This is the time that refresh occurs.

FIG. 26 illustrates a clocked inverter utilized in accordance with the random access memory of the present invention. The inverter is used for the read and write lines of the RAM storage cells. The clock signal itsefl is used as the low voltage. When the clock is low, the output will be valid and will reflect the inverse of the input signal. If the clock is high, that is, logic 1, the output will always remain a 1 and the memory cell will not be addressed. The clocked inverter of the present invention provides several advantages. Illustrative of the advantages are the fact that the precharge conditional discharge technique of the present invention does not load the clock with as much capacitance as conventional precharge techniques. Further, since the clock does not carry discharge current, the clock noise is reduced. This is an advantage over conventional techniques were circuits are very sensitive to clock noise.

With reference to FIG. 27, the detailed logic of the stack pointer is illustrated. As may be seen, there are three outputs labelled S1, S2, S3. These outputs come from blocks labelled $\overline{T}$ which represents a toggle flip-flop, the logic of which is illustrated in FIG. 29. Operation of such a flip-flop is understood by those skilled in the art and need not be explained in further detail herein. The toggle flip-flop is also used in the refresh counter illustrated in FIG. 28.

SYSTEM INPUT/OUTPUT INTERFACE

This section describes the input/output interface shown in block diagram form at 16 in FIG. 1. The functional block diagram showing the various elements in the system timing is illustrated in FIG. 30. FIG. 31 shows the logic elements of the functional blocks illustrated in FIG. 30. The system interface includes interconnection of the CPU and, by way of example, external random access memory units. This interconnect is by a parallel 8-bit external bus. The interconnect of the CPU with 1k of memory of the external random access memory is illustrated in FIG. 32. As has been previously described, the external random access memory may be up to 64K bytes since 16 bits are used for addressing the memory. As understood by those skilled in the art, when an external memory of this size is used, the memory will be formed on a plurality of chips. A chip select signal from a memory interface circuit shown in FIG. 36 is supplied as an input to the external random access memory to select the required chips.

The CPU controls the system timing; thus, timing signal from the CPU are applied to an external timer which is illustrated in FIG. 35. The external timer has an output that is applied to external timing logic illustrated in FIG. 34. The external timing logic also receives an input from the CPU. The output of the external timing is connected to the interface control and timing block which synchronizes CPU/RAM/peripheral operation. External system inputs are applied to this block illustrated in FIG. 33, and system outputs are obtained therefrom. This circuitry supplies outputs to the external memory and to the memory interface.

An output truth table, Table XI, shows the five output states corresponding to changes in the READY or INTERRUPT input. Input lines $A_7 - A_0$ are separated into input and output terminals for the truth table.

TABLE XI

| | | OUTPUT | | | |
|---|---|---|---|---|---|
| | | INPUT<br>76543210 | RI<br>DN<br>YT | OUTPUT<br>76543210 | SECMI<br>YXYEN<br>N CMT<br>C L<br>H E S<br>TY |
| 0 | | 00000000 | 00 | 00000000 | 00111 |
| 1 | RDY | 00000000 | 10 | 00000000 | 00111 |
| 2 | | 00000000 | 10 | 11111111 | 11110 |
| 3 | | 00000000 | 10 | 00000000 | 01110 |
| 4 | | 00000000 | 10 | 00000000 | 01110 |
| 5 | | 00000000 | 10 | 00000000 | 01110 |
| 6 | | 00000000 | 10 | 00000000 | 01110 |
| 7 | | 00000000 | 10 | 00000000 | 01100 |
| 8 | | 00000000 | 10 | 00000000 | 01100 |
| 9 | INT | 11111111 | 11 | 00000000 | 01100 |
| 10 | | 11111111 | 11 | 00000000 | 01100 |
| 11 | | 11111111 | 11 | 00000000 | 01100 |
| 12 | | 11111111 | 11 | 00000000 | 01101 |
| 13 | | 11111111 | 11 | 00000000 | 10101 |
| 14 | | 11111111 | 11 | 00000000 | 00101 |
| 15 | | 11111111 | 11 | 11111111 | 00101 |
| 16 | | 11111111 | 11 | 00000000 | 00101 |
| 17 | | 11111111 | 11 | 00000000 | 11100 |
| 18 | | 11111111 | 11 | 00000000 | 01100 |
| 19 | | 11111111 | 11 | 00000000 | 01100 |
| 20 | | 11111111 | 11 | 00000000 | 01100 |
| 21 | | 11111111 | 11 | 00000000 | 01100 |
| 22 | | 11111111 | 11 | 00000000 | 01100 |
| 23 | | 11111111 | 10 | 00000000 | 01100 |
| 24 | | 11111111 | 10 | 00000000 | 01100 |
| 25 | INT | 11111111 | 11 | 00000000 | 01100 |
| 26 | | 11111111 | 10 | 00000000 | 01100 |
| 27 | | 11111111 | 10 | 00000000 | 01100 |
| 28 | | 11111111 | 10 | 00000000 | 01101 |
| 29 | INT | 11111111 | 11 | 00000000 | 10101 |
| 30 | | 11111111 | 10 | 00000000 | 00101 |
| 31 | | 11111111 | 10 | 11111111 | 00101 |

TABLE XI-continued

| | | OUTPUT | | | |
|---|---|---|---|---|---|
| | | INPUT<br>76543210 | RI<br>DN<br>YT | OUTPUT<br>76543210 | SECMI<br>YXYEN<br>N CMT<br>C L<br>H E S<br>TY |
| 32 | | 11111111 | 10 | 00000000 | 00101 |
| 33 | | 00111110 | 10 | 00000000 | 11100 |
| 34 | | 11111111 | 10 | 00000000 | 01100 |
| 35 | | 11111111 | 10 | 00000000 | 01100 |
| 36 | | 11111111 | 10 | 00000000 | 01100 |
| 37 | | 11111111 | 10 | 00000000 | 10100 |
| 38 | | 11111111 | 10 | 00000000 | 00000 |
| 39 | | 11111111 | 10 | 11111111 | 00000 |
| 40 | | 11111111 | 10 | 00000000 | 00000 |
| 41 | | 11111111 | 10 | 00000000 | 11000 |
| 42 | | 11111111 | 10 | 00000000 | 01000 |
| 43 | | 11111111 | 10 | 00000000 | 01000 |
| 44 | | 11111111 | 10 | 00000000 | 01000 |
| 45 | | 11111111 | 10 | 11111111 | 10000 |
| 46 | | 11111111 | 10 | 00000000 | 00010 |
| 47 | | 11111111 | 10 | 11111111 | 00010 |
| 48 | | 11111111 | 10 | 00000000 | 00010 |
| 49 | | 11111111 | 10 | 00000000 | 11010 |
| 50 | | 11111111 | 10 | 00000000 | 01010 |
| 51 | $\overline{RDY}$ | 11111111 | 00 | 00000000 | 01010 |
| 52 | | 11111111 | 00 | 00000000 | 01010 |
| 53 | | 11111111 | 00 | 00000000 | 01010 |
| 54 | | 11111111 | 00 | 00000000 | 01101 |
| 55 | | 11111111 | 00 | 11111111 | 10101 |
| 56 | | 11111111 | 00 | 00000000 | 00101 |
| 57 | | 11111111 | 00 | 11111110 | 00101 |
| 58 | | 11111111 | 00 | 00000000 | 00101 |
| 59 | | 11111111 | 00 | 00000000 | 00101 |
| 60 | | 11111111 | 00 | 00000000 | 00101 |
| 61 | RDY | 11111111 | 10 | 00000000 | 00101 |
| 62 | | 01000100 | 10 | 00000000 | 11100 |
| 63 | | 11111111 | 10 | 00000000 | 01100 |
| 64 | | 11111111 | 10 | 00000000 | 01100 |
| 65 | $\overline{RDY}$ | 11111111 | 00 | 00000000 | 01100 |
| 66 | RDY | 11111111 | 10 | 11111111 | 10100 |
| 67 | | 11111111 | 10 | 00000000 | 00000 |
| 68 | | 11111111 | 10 | 11111110 | 00000 |
| 69 | | 11111111 | 10 | 00000000 | 00000 |
| 70 | | 11111111 | 10 | 00000000 | 11000 |
| 71 | INT | 11111111 | 11 | 00000000 | 01000 |
| 72 | | 11111111 | 10 | 00000000 | 01000 |
| 73 | | 11111111 | 10 | 00000000 | 01000 |
| 74 | | 11111111 | 10 | 11111110 | 10000 |
| 75 | | 11111111 | 10 | 00000000 | 00000 |
| 76 | | 11111111 | 10 | 11111110 | 00000 |
| 77 | | 11111111 | 10 | 00000000 | 00000 |
| 78 | | 00111111 | 10 | 00000000 | 11000 |
| 79 | | 00000000 | 10 | 00000000 | 01000 |
| 80 | | 00000000 | 10 | 00000000 | 01000 |
| 81 | | 00000000 | 10 | 00000000 | 01000 |
| 82 | | 00000000 | 10 | 00000000 | 01000 |
| 83 | | 00000000 | 10 | 00000000 | 01101 |
| 84 | | 00000000 | 10 | 00000000 | 10101 |
| 85 | | 00000000 | 10 | 00000000 | 00101 |
| 86 | | 00000000 | 10 | 11000000 | 00101 |
| 87 | | 00000000 | 10 | 00000000 | 00101 |
| 88 | | 11000000 | 10 | 00000000 | 11100 |
| 89 | | 11111111 | 10 | 00000000 | 01100 |
| 90 | | 11111111 | 10 | 00000000 | 01100 |
| 91 | | 11111111 | 10 | 00000000 | 01100 |
| 92 | | 11111111 | 10 | 00000000 | 10100 |
| 93 | | 11111111 | 10 | 00000000 | 00100 |
| 94 | | 11111111 | 10 | 11000000 | 00100 |
| 95 | $\overline{RDY}$ | 11111111 | 00 | 00000000 | 00100 |
| 96 | RDY | 11111111 | 10 | 00000000 | 00100 |
| 97 | | 00111101 | 10 | 00000000 | 00100 |
| 98 | | 00111101 | 10 | 00000000 | 11100 |
| 99 | | 00111101 | 10 | 00000000 | 01100 |
| 100 | | 00111101 | 10 | 00000000 | 01100 |
| 101 | | 00111101 | 10 | 00000000 | 01100 |
| 102 | | 00111101 | 10 | 11111111 | 10100 |
| 103 | | 00111101 | 10 | 00000000 | 00000 |
| 104 | | 00111101 | 10 | 11111111 | 00000 |
| 105 | | 00111101 | 10 | 00000000 | 00000 |
| 106 | | 00111101 | 10 | 00000000 | 11000 |
| 107 | | 0111101 | 10 | 00000000 | 01000 |
| 108 | | 00111101 | 10 | 00000000 | 01000 |
| 109 | | 00000000 | 10 | 00000000 | 01000 |
| 110 | | 00000000 | 10 | 11111111 | 10000 |
| 111 | | 00000000 | 10 | 00000000 | 00100 |
| 112 | | 00000000 | 10 | 00011111 | 00100 |
| 113 | | 00000000 | 10 | 00000000 | 00100 |
| 114 | | 00000000 | 10 | 00000000 | 11100 |
| 115 | | 00000000 | 10 | 00000000 | 01100 |

TABLE XI-continued

| OUTPUT | | | | |
|---|---|---|---|---|
| | INPUT | RI DN YT | OUTPUT | SECMI YXYEN N CMT C L H E S TY |
| | 76543210 | | 76543210 | |
| 116 | 00000000 | 10 | 00000000 | 01100 |
| 117 | 00000000 | 10 | 00000000 | 01100 |
| 118 | 00000000 | 10 | 00000000 | 01100 |
| 119 | 00000000 | 10 | 00000000 | 01100 |
| 120 | 00000000 | 10 | 00000000 | 01100 |

With reference now to FIGS. 32*a* and 32*b*, interconnection of the CPU and 1k of memory of the random access memory is illustrated. As may be seen, only 8 external bus wires are needed for this interconnection. The CPU input/output section was described previously with respect to FIG. 9. As described therein, the CPU input/output lines occur along lines $A_0$ through $A_7$. These eight bus lines are interconnected with the various units of the external RAM. These various RAM memories are referenced generally by the numeral 301. Preferably, these memories are 1,024 × 1 dynamic random access memories. Techniques for fabricating RAMs are well known to those skilled in the art and need not be explained in detail herein. Circuitry for interfacing the RAM, refreshing it, etc., are described hereinafter with respect to FIGS. 37–44.

As may be seen, a chip select signal is applied to each of the units 301 to enable selection of the proper unit. An advantage of the interconnect system illustrated in FIGS. 32*a* and 32*b* is the fact that multiplexing the address, input and output simplifies interconnection since only eight memory bus lines are all that are required. If multiplexing is not used, it is necessary to route 26 bus lines. This is illustrated in FIG. 32*c*, which is a conventional way of accessing external memory.

The memory chip select is illustrated in FIG. 36. By using four 16K - output decode packages, it is possible to select from 1K to 65K of memory chips. The chip select input on the RAM is clocked so that the chip select will be sampled at the appropriate time. At all other times, the chip select output will be invalid.

FIG. 34 illustrates the external timing for the input/output control. The timing is generated from the output of the CPU and from the output of an external state timer described in more detail in FIG. 35. These signals are combined to select either one of the external storage registers or data inputs to the system from an external periphery.

FIG. 35 is the logic of the external timer. This timer counts the four states of the CPU. To ensure that the external counter runs in synch with the CPU, an output of the CPU is a synch signal which resets the timer every state 1. The external counter also will synch the external memory to the same time frame as the CPU. This assures that the external memory will input and output on the correct state.

FIG. 33 shows the interface logic used with the current sense/voltage input of the CPU. The connection to the CPU is shown at node 300 ($A_1$). For example, this connection may go to any of the $A_0$ through $A_7$ input lines to the CPU. Eight of the circuits illustrated in FIG. 33 are required for an 8-bus system. Node 300 is connected to the A outputs on the external memory and the A outputs on the CPU. During a low phase 1, the data selector 302 is enabled. Either input DATA, DMAH, DMAL, or M' is selected. The input DATA is used to load information from peripherals to the CPU or RAM. If the processor is halted, information may be loaded directly into the memory. The data must be present during state 3, and the control signal "store" must be a logic 1. When the processor is operating the input DATA is selected during the instruction time execute state 1 of an interrupt acknowledge, or the data time execute, state 1 of an external instruction, or store = "1", state 3.

The signal DMAL corresponds to eight low order address bits being selected for a direct memory access through the DMAL latch. The input is selected during execute state 2, or ready = "0", state 2, or store = "1", state 2.

The input DMAH corresponds to the eight high order bits for a direct memory access through the DMAH latch. Selection of the input is during execute, state 4, or ready = 0, state 4, or store = 1, state 4.

To load the memory when the CPU is halted, the input STORE is used. STORE must be a logic 1 from the start of state 2 to the end of the following state 1. The four state store will allow the location of memories addressed by DMAL and DMAH to memorize the byte present at the DATA input.

The output of the data selector 302 is amplified through the transistor 304. This enables all of the A lines of the external RAMs to be driven. During the low phase 2 of the clock, the CPU or RAM will output a current. This current is sensed by the sense amplifier shown generally at block 314. Such amplifiers are known to those skilled in the art and they need not be described in more detail herein. The low current is amplified to a TTL voltage level which is input to latches 306, 308, 310, and 312. These are latches which will contain valid information as to the input of the CPU. The M' register closes the current sense/voltage in loop of the CPU. The CDMA register is shown at 308. This register is a TTL latch for direct memory access and contains the byte of information located in the last byte of memory addressed by DMAL or DMAH. The register I' is shown at 310 and contains the last instruction fetched from the memory. The register A' is shown at 312. For each external instruction, this A' register will be updated with the contents of the internal CPU A register.

An example of the current sensing will be described by using the timing charts in Table XII. This table shows the times at which outputs from the CPU or inputs to the CPU will occur. Outputs always occur on phase 2 of a state and inputs occur on phase 1. By way of example, reference the cycle 2 of the EXT instruction. During a fetch subcycle, state S1', phase 2, the CPU will output the contents of the A register as a current. This current will be amplified by the sense amplifier, 314, FIG. 38, and will be an input to the latch 312, labelled CACC and also will be an input to M'. At the end of phase 2, when the data is valid on the sense amplifier 314, the signal CACC will clock in the results of the A register. This register will be updated for every external instruction.

An example of the closed loop current sense and TTL voltage in may be seen for the SHIFT instruction during S1' fetch. During phase 2, the CPU will output a current which corresponds to the contents of the $P_L$ register. This current will be an inversion of the true value. The loop will invert the output at point M'. During phase 1, the RAM will expect the contents of the address. During state 2, phase 1 time, $E_1$ and $E_2$ select the input $C_0$ for the data selector 302. This, it may be seen, is the contents of the M' register or the location desired for low order address and memory. During the phase 1 clock time, the data selector 301 will output the contents of the M' register, and it will be amplified and applied to node 300. This will be the input to the RAM as shown in Table XII fetch S2', phase 1. During the time S4' of a recall cycle, the high order address bits are input to the RAM. During phase 2 times, state S4' executes the data in the RAM address location $P_H P_L$ is output on the current sense lines. During the following execute state, phase 1, the instruction "shift" will be input into the CPU. During the execute phase of the instruction cycle, the CPU will not request information from the RAM. For purposes of programming, it is possible to have direct memory access while the CPU executes the instruction. This is done by using the DMAH and DMAL inputs. For example, during a recall condition, DMAL will occur during execute state S2', phase 1. This will be input to the data selector 302 to the $A_1$ line. The memory will accept this address. During the state time S4', the DMAH input to the data selector will be selected and the high order address will transfer to the memory. During the S4' execute phase 2 time, the RAM will output the location of the direct memory address location. The output B will be stored in the latch labelled DMA' (FIG. 33). The clock CDMA will clock in the output of the RAM. It will be stored there for use in the external system.

A truth table illustrating the logic status of the system signals Ready, Interrupt, Store, Execute, Synch, S1 = External State 1, S2 = External

TABLE XII

TIMING

| Symbol | Meaning |
|---|---|
| $P_1$ or L or DMAL | Low order address |
| $P_h$ or H or DMAH | High order address |
| I | Instruction |
| A | A Register |
| (A) | Input to A register (Data Input) |
| m | Output of memory location HL |
| $r_x$ | Contents of source register |
| B1 or B2 | Byte one or Byte two of data |
| D' | New data to the RAM location $P_hP_1$ or HL |
| D | Data from location $P_hP_1$ or HL or DMAHDMAL |

| Subcycle | | Fetch | | | | | | | | | | Execute | | | | | | | | | |
|---|---|---|---|---|---|---|---|---|---|---|---|---|---|---|---|---|---|---|---|---|---|
| State | | S1' | | S2' | | S3' | | S4' | | Wait | | S1' | | S2' | | S3' | | S4' | | Stop | |
| Ready | φ Cond. | 1 | 2 | 1 | 2 | 1 | 2 | 1 | 2 | 1 | 2 | 1 | 2 | 1 | 2 | 1 | 2 | 1 | 2 | 1 | 2 |
| | | | | | | | | | | | | Recall | | | | | | | | | |
| "1" | Memorize | | | $P_1$ | | D' | | $P_h$ | D | | | "O" | | DMAL | | | | DMAH | D | | |
| "1" | Recall | | | $P_1$ | | | | $P_h$ | D | | | "1" | | DMAL | | | | DMAH | D | | |
| "0" | | | | DMAL | | | | DMAH | | | | "1" | | | | | | | | | |

CPU Timing chart

| Subcycle | | Fetch | | | | | | | | | | Execute | | | | | | | | | |
|---|---|---|---|---|---|---|---|---|---|---|---|---|---|---|---|---|---|---|---|---|---|
| | | S1' | | S2' | | S3' | | S4' | | Wait | | S1' | | S2' | | S3' | | S4' | | Stop | |
| Inst. (I) | φ Cycle | 1 | 2 | 1 | 2 | 1 | 2 | 1 | 2 | 1 | 2 | 1 | 2 | 1 | 2 | 1 | 2 | 1 | 2 | 1 | 2 |
| $Lr_dr_x$ | 1 | | $P_1$ | | | | $P_h$ | | | | | I | | | | | | | | | |
| @$r_x$ | 1 | | $P_1$ | | | | $P_h$ | | | | | I | | | | | | | | | |
| SHIFT | 1 | | $P_1$ | | | | $P_h$ | | | | | I | | | | | | | | | |
| RET | 1 | | $P_1$ | | | | $P_h$ | | | | | I | | | | | | | | | |
| HALT | 1 | | $P_1$ | | | | $P_h$ | | | | | I | | | | | | | | | |
| RST | 1 | | $P_1$ | | | | $P_h$ | | | | | I | | | | | | | | | |
| RST | 2 | | | | | | | | | | | | | | | | | | | | |
| EXT | 1 | | $P_1$ | | | | $P_h$ | | | | | I | | | | | | | | | |
| EXT | 2 | | A | | | | | | | | | (A) | | | | | | | | | |
| @M | 1 | | $P_1$ | | | | $P_h$ | | | | | I | | | | | | | | | |
| @M | 2 | | L | | | | H | | | | | m | | | | | | | | | |
| $Lr_dM$ | 1 | | $P_1$ | | | | $P_h$ | | | | | I | | | | | | | | | |
| $Lr_dM$ | 2 | | L | | | | H | | | | | m | | | | | | | | | |
| $Lr_d$ | 1 | | $P_1$ | | | | $P_h$ | | | | | I | | | | | | | | | |
| $Lr_d$ | 2 | | $P_1$ | | | | $P_h$ | | | | | B1 | | | | | | | | | |
| @ | 1 | | $P_1$ | | | | $P_h$ | | | | | I | | | | | | | | | |
| @ | 2 | | $P_1$ | | | | $P_h$ | | | | | B1 | | | | | | | | | |
| $LMr_x$ | 1 | | $P_1$ | | | | $P_h$ | | | | | I | | | | | | | | | |
| $LMR_x$ | 2 | | L | | $r_x$ | | H | | | | | | $r_x$ | | | | | | | | |
| LM | 1 | | $P_1$ | | | | $P_h$ | | | | | I | | | | | | | | | |
| LM | 2 | | $P_1$ | | | | $P_h$ | | | | | B1 | | | | | | | | | |
| LM | 3 | | L | | B1 | | H | | | | | | B1 | | | | | | | | |
| CAL | 1 | | $P_1$ | | | | $P_h$ | | | | | I | | | | | | | | | |
| JMP CAL | 2 | | $P_1$ | | | | $P_h$ | | | | | B1 | | | | | | | | | |
| JMP CAL | 3 | | $P_1$ | | | | $P_h$ | | | | | B2 | | | | | | | | | |

TABLE XIII

| | R D Y | I N T | S T O R E | E X | S Y N C H | ST. SSSS 1234 | DATA 76543210 | SYSTEM DMAL 76543210 | DMAH 76543210 | INST. 76543210 | A' 76543210 | DMA' 76543210 |
|---|---|---|---|---|---|---|---|---|---|---|---|---|
| 0 | X | X | X | X | X | XXXX | XXXXXX-XX | XXXXXX-XX | XXXXXX-XX | XXXXXX-XX | XXXXXX-XX | XXXXXX-XX |
| 1 | 0 | 0 | 0 | 0 | 0 | 1111 | 00000000 | 00000000 | 00000000 | 11111111 | 00000000 | 11111111 |
| 2 | 1 | 0 | 0 | 0 | 0 | 1111 | 00000000 | 00000000 | 00000000 | 00000000 | 00000000 | 11111111 |
| 3 HALT | 1 | 0 | 0 | 1 | 1 | 1000 | 00000000 | 00000000 | 00000000 | 00000000 | 00000000 | 11111111 |
| 4 | 1 | 0 | 0 | 1 | 0 | 0100 | 00000000 | 00000000 | 00000000 | 00000000 | 00000000 | 11111111 |
| 5 | 1 | 0 | 0 | 1 | 0 | 0010 | 00000000 | 00000000 | 00000000 | 00000000 | 00000000 | 11111111 |
| 6 | 1 | 0 | 0 | 1 | 0 | 0001 | 00000000 | 00000000 | 00000000 | 00000000 | 00000000 | 11111111 |
| | LOAD THE PROGRAM | | | | | | | | | | | |
| 7 LA | 1 | 0 | 1 | 1 | 0 | 1000 | 00000110 | 00000000 | 00000000 | 00000000 | 00000000 | 11111111 |
| 8 | 1 | 0 | 1 | 1 | 0 | 0100 | 00000110 | 00000000 | 00000000 | 00000000 | 00000000 | 11111111 |
| 9 | 1 | 0 | 1 | 1 | 0 | 0010 | 00000110 | 00000000 | 00000000 | 00000000 | 00000000 | 11111111 |
| 10 | 1 | 0 | 1 | 1 | 0 | 0001 | 00000110 | 00000000 | 00000000 | 00000000 | 00000000 | 11111111 |
| 11030 | 1 | 0 | 1 | 1 | 0 | 1000 | 00111000 | 00000001 | 00000000 | 00000000 | 00000000 | 11111111 |
| 12 | 1 | 0 | 1 | 1 | 0 | 0100 | 00111000 | 00000001 | 00000000 | 00000000 | 00000000 | 11111111 |
| 13 | 1 | 0 | 1 | 1 | 0 | 0010 | 00111000 | 00000001 | 00000000 | 00000000 | 00000000 | 11111111 |
| 14 | 1 | 0 | 1 | 1 | 0 | 0001 | 00111000 | 00000001 | 00000000 | 00000000 | 00000000 | 11111111 |
| 15 LB | 1 | 0 | 1 | 1 | 0 | 1000 | 00001110 | 00000010 | 00000000 | 00000000 | 00000000 | 11111111 |
| 16 | 1 | 0 | 1 | 1 | 0 | 0100 | 00001110 | 00000010 | 00000000 | 00000000 | 00000000 | 11111111 |
| 17 | 1 | 0 | 1 | 1 | 0 | 0010 | 00001110 | 00000010 | 00000000 | 00000000 | 00000000 | 11111111 |
| 18 | 1 | 0 | 1 | 1 | 0 | 0001 | 00001110 | 00000010 | 00000000 | 00000000 | 00000000 | 11111111 |
| 19012 | 1 | 0 | 1 | 1 | 0 | 1000 | 00001010 | 00000011 | 00000000 | 00000000 | 00000000 | 11111111 |
| 20 | 1 | 0 | 1 | 1 | 0 | 0100 | 00001010 | 00000011 | 00000000 | 00000000 | 00000000 | 11111111 |
| 21 | 1 | 0 | 1 | 1 | 0 | 0010 | 00001010 | 00000011 | 00000000 | 00000000 | 00000000 | 11111111 |
| 22 | 1 | 0 | 1 | 1 | 0 | 0001 | 00001010 | 00000011 | 00000000 | 00000000 | 00000000 | 11111111 |
| 23ADB | 1 | 0 | 1 | 1 | 0 | 1000 | 10000001 | 00000100 | 00000000 | 00000000 | 00000000 | 11111111 |
| 24 | 1 | 0 | 1 | 1 | 0 | 0100 | 10000001 | 00000100 | 00000000 | 00000000 | 00000000 | 11111111 |
| 25 | 1 | 0 | 1 | 1 | 0 | 0010 | 10000001 | 00000100 | 00000000 | 00000000 | 00000000 | 11111111 |
| 26 | 1 | 0 | 1 | 1 | 0 | 0001 | 10000001 | 00000100 | 00000000 | 00000000 | 00000000 | 11111111 |
| 27EXT | 1 | 0 | 1 | 1 | 0 | 1000 | 01000001 | 00000101 | 00000000 | 00000000 | 00000000 | 11111111 |
| 28 | 1 | 0 | 1 | 1 | 0 | 0100 | 01000001 | 00000101 | 00000000 | 00000000 | 00000000 | 11111111 |
| 29 | 1 | 0 | 1 | 1 | 0 | 0010 | 01000001 | 00000101 | 00000000 | 00000000 | 00000000 | 11111111 |
| 30 | 1 | 0 | 1 | 1 | 0 | 0001 | 01000001 | 00000101 | 00000000 | 00000000 | 00000000 | 11111111 |
| 31HALT | 1 | 0 | 1 | 1 | 0 | 1000 | 11111111 | 00000111 | 00000000 | 00000000 | 00000000 | 11111111 |
| 32 | 1 | 0 | 1 | 1 | 0 | 0100 | 11111111 | 00000111 | 00000000 | 00000000 | 00000000 | 11111111 |
| 33 | 1 | 0 | 1 | 1 | 0 | 0010 | 11111111 | 00000111 | 00000000 | 00000000 | 00000000 | 11111111 |
| 34 | 1 | 0 | 1 | 1 | 0 | 0001 | 11111111 | 00000111 | 00000000 | 00000000 | 00000000 | 11111111 |
| | INTERRUPT | | | | | | | | | | | |
| 35 | 1 | 1 | 1 | 1 | 0 | 1000 | 11111111 | 00000111 | 00000000 | 00000000 | 00000000 | 11111111 |
| 36 | 1 | 0 | 0 | 1 | 0 | 0100 | 11111111 | 00000111 | 00000000 | 00000000 | 00000000 | 11111111 |
| 37 | 1 | 0 | 0 | 1 | 0 | 0010 | 11111111 | 00000111 | 00000000 | 00000000 | 00000000 | 11111111 |
| 38 | 1 | 0 | 0 | 1 | 0 | 0001 | 11111111 | 00000111 | 00000000 | 00000000 | 00000000 | 11111111 |
| 39 | 1 | 0 | 0 | 0 | 1 | 1000 | 00000101 | 00000111 | 00000000 | 00000000 | 00000000 | 11111111 |
| 40 | 1 | 0 | 0 | 0 | 0 | 0100 | 00000101 | 00000111 | 00000000 | 00000000 | 00000000 | 11111111 |
| 41 | 1 | 0 | 0 | 0 | 0 | 0010 | 00000101 | 00000111 | 00000000 | 00000000 | 00000000 | 11111111 |
| 42 | 1 | 0 | 0 | 0 | 0 | 0001 | 00000101 | 00000111 | 00000000 | 11111111 | 00000000 | 11111111 |
| 43 RST | 1 | 0 | 0 | 1 | 1 | 1000 | 00000101 | 00000000 | 00000000 | 11111111 | 00000000 | 11111111 |
| 44 | 1 | 0 | 0 | 1 | 0 | 0100 | 00000101 | 00000000 | 00000000 | 11111111 | 00000000 | 11111111 |
| 45 | 1 | 0 | 0 | 1 | 0 | 0010 | 00000101 | 00000000 | 00000000 | 11111111 | 00000000 | 11111111 |
| 46 | 1 | 0 | 0 | 1 | 0 | 0001 | 00000101 | 00000000 | 00000000 | 11111111 | 00000000 | 00000110 |
| 47 | 1 | 0 | 0 | 0 | 1 | 1000 | 00000101 | 00000000 | 00000000 | 11111111 | 00000000 | 00000110 |
| 48 | 1 | 0 | 0 | 0 | 0 | 0100 | 00000101 | 00000000 | 00000000 | 11111111 | 00000000 | 00000110 |
| 49 | 1 | 0 | 0 | 0 | 0 | 0010 | 00000101 | 00000000 | 00000000 | 11111111 | 00000000 | 00000110 |
| 50 | 1 | 0 | 0 | 0 | 0 | 0001 | 00000101 | 00000000 | 00000000 | 11111111 | 00000000 | 00000110 |
| 51 | 1 | 0 | 0 | 1 | 1 | 1000 | 00000101 | 00000001 | 00000000 | 11111111 | 00000000 | 00000110 |
| 52 | 1 | 0 | 0 | 1 | 0 | 0100 | 00000101 | 00000001 | 00000000 | 11111111 | 00000000 | 00000110 |
| 53 | 1 | 0 | 0 | 1 | 0 | 0010 | 00000101 | 00000001 | 00000000 | 11111111 | 00000000 | 00000110 |
| 54 | 1 | 0 | 0 | 1 | 0 | 0001 | 00000101 | 00000001 | 00000000 | 11111111 | 00000000 | 00111000 |
| 55 | 1 | 0 | 0 | 0 | 1 | 1000 | 00000101 | 00000001 | 00000000 | 11111111 | 00000000 | 00111000 |
| 56 | 1 | 0 | 0 | 0 | 0 | 0100 | 00000101 | 00000001 | 00000000 | 11111111 | 00000000 | 00111000 |
| 57 | 1 | 0 | 0 | 0 | 0 | 0010 | 00000101 | 00000001 | 00000000 | 11111111 | 00000000 | 00111000 |
| 58 LA | 1 | 0 | 0 | 0 | 0 | 0001 | 00000101 | 00000001 | 00000000 | 00000110 | 00000000 | 00111000 |
| 59 | 1 | 0 | 0 | 1 | 1 | 1000 | 00000101 | 00000010 | 00000000 | 00000110 | 00000000 | 00111000 |
| 60 | 1 | 0 | 0 | 1 | 0 | 0100 | 00000101 | 00000010 | 00000000 | 00000110 | 00000000 | 00111000 |
| 61 | 1 | 0 | 0 | 1 | 0 | 0010 | 00000101 | 00000010 | 00000000 | 00000110 | 00000000 | 00111000 |
| 62 | 1 | 0 | 0 | 1 | 0 | 0001 | 00000101 | 00000010 | 00000000 | 00000110 | 00000000 | 00001110 |
| 63 | 1 | 0 | 0 | 0 | 1 | 1000 | 00000101 | 00000010 | 00000000 | 00000110 | 00000000 | 00001110 |
| 64 | 1 | 0 | 0 | 0 | 0 | 0100 | 00000101 | 00000010 | 00000000 | 00000110 | 00000000 | 00001110 |
| 65 | 1 | 0 | 0 | 0 | 0 | 0010 | 00000101 | 00000010 | 00000000 | 00000110 | 00000000 | 00001110 |

TABLE XIII-continued

| | R D Y | I N T | S T O R E | E X | S Y N C H | ST. SSSS 1234 | DATA 76543210 | SYSTEM DMAL 76543210 | DMAH 76543210 | INST. 76543210 | A' 76543210 | DMA' 76543210 |
|---|---|---|---|---|---|---|---|---|---|---|---|---|
| 66 | 1 | 0 | 0 | 0 | 0 | 0001 | 00000101 | 00000010 | 00000000 | 00000110 | 00000000 | 00001110 |
| 67 | 1 | 0 | 0 | 1 | 1 | 1000 | 00000101 | 00000011 | 00000000 | 00000110 | 00000000 | 00001110 |
| 68 | 1 | 0 | 0 | 1 | 0 | 0100 | 00000101 | 00000011 | 00000000 | 00000110 | 00000000 | 00001110 |
| 69 | 1 | 0 | 0 | 1 | 0 | 0010 | 00000101 | 00000011 | 00000000 | 00000110 | 00000000 | 00001110 |
| 70 | 1 | 0 | 0 | 1 | 0 | 0001 | 00000101 | 00000011 | 00000000 | 00000110 | 00000000 | 00001010 |
| 71 | 1 | 0 | 0 | 0 | 1 | 1000 | 00000101 | 00000011 | 00000000 | 00000110 | 00000000 | 00001010 |
| 72 | 1 | 0 | 0 | 0 | 0 | 0100 | 00000101 | 00000011 | 00000000 | 00000110 | 00000000 | 00001010 |
| 73 | 1 | 0 | 0 | 0 | 0 | 0010 | 00000101 | 00000011 | 00000000 | 00000110 | 00000000 | 00001010 |
| 74 LB | 1 | 0 | 0 | 0 | 0 | 0001 | 00000101 | 00000011 | 00000000 | 00001110 | 00000000 | 00001010 |
| 75 | 1 | 0 | 0 | 1 | 1 | 1000 | 00000101 | 00000100 | 00000000 | 00001110 | 00000000 | 00001010 |
| 76 | 1 | 0 | 0 | 1 | 0 | 0100 | 00000101 | 00000100 | 00000000 | 00001110 | 00000000 | 00001010 |
| 77 | 1 | 0 | 0 | 1 | 0 | 0010 | 00000101 | 00000100 | 00000000 | 00001110 | 00000000 | 00001010 |
| 78 | 1 | 0 | 0 | 1 | 0 | 0001 | 00000101 | 00000100 | 00000000 | 00001110 | 00000000 | 10000001 |
| 79 | 1 | 0 | 0 | 0 | 1 | 1000 | 00000101 | 00000100 | 00000000 | 00001110 | 00000000 | 10000001 |
| 80 | 1 | 0 | 0 | 0 | 0 | 0100 | 00000101 | 00000100 | 00000000 | 00001110 | 00000000 | 10000001 |
| 81 | 1 | 0 | 0 | 0 | 0 | 0010 | 00000101 | 00000100 | 00000000 | 00001110 | 00000000 | 10000001 |
| 82 | 1 | 0 | 0 | 0 | 0 | 0001 | 00000101 | 00000100 | 00000000 | 00001110 | 00000000 | 10000001 |
| 83 | 1 | 0 | 0 | 1 | 1 | 1000 | 00000101 | 00000101 | 00000000 | 00001110 | 00000000 | 10000001 |
| 84 | 1 | 0 | 0 | 1 | 0 | 0100 | 00000101 | 00000101 | 00000000 | 00001110 | 00000000 | 10000001 |
| 85 | 1 | 0 | 0 | 1 | 0 | 0010 | 00000101 | 00000101 | 00000000 | 00001110 | 00000000 | 10000001 |
| 86 | 1 | 0 | 0 | 1 | 0 | 0001 | 00000101 | 00000101 | 00000000 | 00001110 | 00000000 | 01000001 |
| 87 | 1 | 0 | 0 | 0 | 1 | 1000 | 00000101 | 00000101 | 00000000 | 00001110 | 00000000 | 01000001 |
| 88 | 1 | 0 | 0 | 0 | 0 | 0100 | 00000101 | 00000101 | 00000000 | 00001110 | 00000000 | 01000001 |
| 89 | 1 | 0 | 0 | 0 | 0 | 0010 | 00000101 | 00000101 | 00000000 | 00001110 | 00000000 | 01000001 |
| 90 ADB | 1 | 0 | 0 | 0 | 0 | 0001 | 00000101 | 00000101 | 00000000 | 10000001 | 00000000 | 01000001 |
| 91 | 1 | 0 | 0 | 1 | 1 | 1000 | 00000101 | 00000111 | 00000000 | 10000001 | 00000000 | 01000001 |
| 92 | 1 | 0 | 0 | 1 | 0 | 0100 | 00000101 | 00000111 | 00000000 | 10000001 | 00000000 | 01000001 |
| 93 | 1 | 0 | 0 | 1 | 0 | 0010 | 00000101 | 00000111 | 00000000 | 10000001 | 00000000 | 01000001 |
| 94 | 1 | 0 | 0 | 1 | 0 | 0001 | 00000101 | 00000111 | 00000000 | 10000001 | 00000000 | 11111111 |
| 95 | 1 | 0 | 0 | 0 | 1 | 1000 | 00000101 | 00000111 | 00000000 | 10000001 | 00000000 | 11111111 |
| 96 | 1 | 0 | 0 | 0 | 0 | 0100 | 00000101 | 00000111 | 00000000 | 10000001 | 00000000 | 11111111 |
| 97 | 1 | 0 | 0 | 0 | 0 | 0010 | 00000101 | 00000111 | 00000000 | 10000001 | 00000000 | 11111111 |
| 98 EXT | 1 | 0 | 0 | 0 | 0 | 0001 | 00000101 | 00000111 | 00000000 | 01000001 | 00000000 | 11111111 |
| 99 | 1 | 0 | 0 | 1 | 1 | 1000 | 00000101 | 00000111 | 00000000 | 01000001 | 00000000 | 11111111 |
| 100 | 1 | 0 | 0 | 1 | 0 | 0100 | 00000101 | 00000111 | 00000000 | 01000001 | 00000000 | 11111111 |
| 101 | 1 | 0 | 0 | 1 | 0 | 0010 | 00000101 | 00000111 | 00000000 | 01000001 | 00000000 | 11111111 |
| 102 | 1 | 0 | 0 | 1 | 0 | 0001 | 00000101 | 00000111 | 00000000 | 01000001 | 00000000 | 11111111 |
| 103 | 1 | 0 | 0 | 0 | 1 | 1000 | 00000101 | 00000111 | 00000000 | 01000001 | 01000010 | 11111111 |
| 104 | 1 | 0 | 0 | 0 | 0 | 0100 | 00000101 | 00000111 | 00000000 | 01000001 | 01000010 | 11111111 |
| 105 | 1 | 0 | 0 | 0 | 0 | 0010 | 00000101 | 00000111 | 00000000 | 01000001 | 01000010 | 11111111 |
| 106 | 1 | 0 | 0 | 0 | 0 | 0001 | 00000101 | 00000111 | 00000000 | 01000001 | 01000010 | 11111111 |
| 107 | 1 | 0 | 0 | 1 | 1 | 1000 | 00000101 | 00000111 | 00000000 | 01000001 | 01000010 | 11111111 |
| 108 | 1 | 0 | 0 | 1 | 0 | 0100 | 00000101 | 00000111 | 00000000 | 01000001 | 01000010 | 11111111 |
| 109 | 1 | 0 | 0 | 1 | 0 | 0010 | 00000101 | 00000111 | 00000000 | 01000001 | 01000010 | 11111111 |
| 110 | 1 | 0 | 0 | 1 | 0 | 0001 | 00000101 | 00000111 | 00000000 | 01000001 | 01000010 | 11111111 |
| 111 | 1 | 0 | 0 | 0 | 1 | 1000 | 00000101 | 00000111 | 00000000 | 01000001 | 01000010 | 11111111 |
| 112 | 1 | 0 | 0 | 0 | 0 | 0100 | 00000101 | 00000111 | 00000000 | 01000001 | 01000010 | 11111111 |
| 113 | 1 | 0 | 0 | 0 | 0 | 0010 | 00000101 | 00000111 | 00000000 | 01000001 | 01000010 | 11111111 |
| 114 HALT | 1 | 0 | 0 | 0 | 0 | 0001 | 00000101 | 00000111 | 00000000 | 11111111 | 01000010 | 11111111 |
| 115 | 1 | 0 | 0 | 1 | 1 | 1000 | 00000101 | 00000111 | 00000000 | 11111111 | 01000010 | 11111111 |
| 116 | 1 | 0 | 0 | 1 | 0 | 0100 | 00000101 | 00000111 | 00000000 | 11111111 | 01000010 | 11111111 |
| 117 | 1 | 0 | 0 | 1 | 0 | 0010 | 00000101 | 00000111 | 00000000 | 11111111 | 01000010 | 11111111 |
| 118 | 1 | 0 | 0 | 1 | 0 | 0001 | 00000101 | 00000111 | 00000000 | 11111111 | 01000010 | 11111111 |
| 119 | 1 | 0 | 0 | 1 | 0 | 1000 | 00000101 | 00000111 | 00000000 | 11111111 | 01000010 | 11111111 |
| 120 | 1 | 0 | 0 | 1 | 0 | 0100 | 00000101 | 00000111 | 00000000 | 11111111 | 01000010 | 11111111 |
| 121 | 1 | 0 | 0 | 1 | 0 | 0010 | 00000101 | 00000111 | 00000000 | 11111111 | 01000010 | 11111111 |
| 122 | 1 | 0 | 0 | 1 | 0 | 0001 | 00000101 | 00000111 | 00000000 | 11111111 | 01000010 | 11111111 |

state 2, S3 = External State 3, S4 = External State 4, Data Input, DMAL, DMAH, Instruction Register I', A' Register and DMA' Register wherein a program to add two numbers is loaded into memory, is shown in Table XIII.

EXTERNAL MEMORY ENABLING LOGIC

A block diagram of the basic elements of the external memory is shown in FIG. 37. The external memory system in accordance with the present invention provides several advantages. The memory includes a slave timer (FIG. 38) which enables multiplexing of address/data/input/output information. The circuitry also includes a refresh counter for use in the external memory such that refresh will be done automatically. An additional advantage of the circuit is that as a part of the external memory, an address register latch (such as illustrated in FIG. 41) is included. This type of circuitry is conventionally provided external to the memory, thus requiring more interconnects, more space, and resulting in lower reliability. The output of the address register latch is applied to an address decode such as shown in FIGS. 43*a* and 43*b*. The decode receives an input from the external bus and also from a chip enable circuit shown in FIG. 39. Input/output logic described in FIG. 40 receives an input from the slave timer and also receives recall instructions. The external storage may be either random access or serial access memory and receives its inputs from the decode circuitry, the refresh counter (if a random access memory is utilized) and from the input/output logic.

With reference to FIG. 38, there is illustrated the slave timer of the external memory. The timer receives an input signal $\overline{SI}$ which is a synch input ensuring that the slave timer operates in synchronism with the CPU master timer. The slave timer counts the four states of, by way of example, the random access memory. During state 1, the RAM will automatically refresh. The refresh circuitry will be described in more detail hereinafter with reference to FIG. 42. During state 2, the RAM will accept low order address bits. During state 3, it will accept data and during state 4, it will accept high order address and output the data location. When the synch signal $\overline{S_I}$ is a logic 0, nodes 412 and 414 will be set at a logic 1. This is the first state time. The counter illustrated is a conventional Johnson counter and will count through the Johnson states. Such counters are well known to those skilled in the art and detailed operation need not be included herein.

FIG. 39 illustrates the chip select sample and hold circuitry utilized in accordance with the external memory of the present invention. This circuit is necessary since the chip select signals will continually change and it is necessary to clock in the correct chip signal at the appropriate time. During the counter time $\overline{C_0C_1}$, shown at node 416, the input chip select (CS) will be clocked if the signal at node 416 is a logic 0. A logic 0 at node 416 will provide a logic 1 at one input of the AND gate 417. If the chip select signal CS is a logic 1, the output of the AND gate 417 will also be a logic 1. This will ensure that the output of the NOR gate 419 is a logic 0. This logic 0 will be inverted by the inverter 421 after phase 2 of the clock providing a logic 1 output signal CS'. If the signal $\overline{C_0C_1}$ now becomes a logic 1, AND gate 423 will recirculate the chip select signal CS' until a new sample signal is received; i.e., when the signal $\overline{C_0C_1}$ again becomes logic 0.

The input/output logic is illustrated in FIG. 40. One of the inputs to the input/output interface is the recall control signal R. If the recall signal R is a logic 0, and the chip select CS' (reference FIG. 39) is a logic 1, then the output of NAND gate 420 will be a logic 0. This will enable the AND gate 422. The output 406 of the shift register will be transferred to the data in line 424 of the external memory. If the signal CS' is a logic 0, then the output of the NAND gate 420 will be a logic 1. This will select output path 400 and the output will be transferred through the AND gate 425 and the NOR gate 427 back to the input line 424. If the control signal recall R is a logic 1 and the signal CS' is a logic 1 and the signal $\overline{C_0}C_1$ is a logic 1, then the output of the NAND gate 403 will be a logic 0. This will form one input to the OR gate 431. The other input to the OR gate 431 is an inverted signal of the output line 400. For this situation, the signal on line 400 will be transferred to the input/output pin of the RAM. The input line 424 and the output line 400 come from the data storage cell selected in the external memory.

From the above, it may be seen that data will be output if the signal $\overline{C_0}C_1$ is a 1, R is a 1, And CS' is a 1. Data will be input when signal R is a 0, and the signal CS' equals a 1. Data will be circulated when R is a 1 or a 0 and CS' is a 0.

FIG. 41 shows the address latch used in conjunction with the external memory of the present invention. It is a sample and hold latch and operation of this latch is similar to the temporary storage register which was described in detail with reference to FIG. 18. The first address bits $A_{X0}$ through $A_{X4}$ will be held in the sample and hold registers until the address bits change again. The data will be clocked in during the time $\overline{C_0}C_1$ = logic 1, and will be clocked through RAM pins $A_0$–$A_4$. Bits $A_5$, $A_6$, and $A_7$ will be clocked through a series of inverters 431 so that they are delayed and will be present as outputs at the same time as the outputs $A_{X0}$, $A_{X1}$, etc. The low order address bits $A_0$–$A_7$ will be clocked in during state 2. During the state 4 time, the remaining two high order address bits necessary to address the 1024 × 1 bit external memory will be clocked through logic inputs $A_0$ and $A_1$. They will be transferred through a phase 1 delay to address lines $A_{Y3}$ and $A_{Y4}$. Thus, it may be seen that using only an 8-bit bus, the ten bits necessary to address the external memory are provided.

FIG. 43A shows the address multiplexer associated with the external memory. The address lines $A_{X0}$ through $A_{X4}$ will be decoded as soon as they are sampled in the sample and hold storage register. This enables a faster decoding for the first and second level Y decode illustrated in FIG. 43B. The first level Y decoder will decode bits $A_{Y0}$ through $A_{Y2}$ while the second level Y decoder will decode the bits $A_{Y3}$ and $A_{Y4}$.

FIG. 42 shows the RAM refresh counter logic. The refresh counter is used to automatically refresh the 32 rows of memory present in the RAM. During every state 1, one row is refreshed. This has the advantage in that it is unnecessary to halt the CPU in order to refresh the dynamic external memory. During state 2, the memory will expect low order address bits. During state 3, data stored in the memory must be present. During state 4, the memory will expect high order address bits. The inputs will all be on phase 1. During state 2, the memory will output if the location requested at the chip select input at a low logic level. During state 1, the memory will neither accept inputs nor will it output data, as this is the refresh state. With reference to table X, the logic names assigned to the external memory and function of each is described.

FIG. 44 illustrates typical MOS clocks $\phi_1$ and $\phi_2$ and TTL clocks $\phi_1$, and $\phi_2$.

The external read only memory illustrated in FIG. 1 by block diagram is preferably a 1024 × 8 memory. Conventional read only memories may be utilized. Such memories are well known in the art and need not be explained in greater detail herein. Typically, the ROM would contain fixed subroutine programs.

With reference to FIG. 45, a different embodiment of the present invention is described. In this embodiment, there is described a system which includes simultaneous operation of two CPU's such as described in accordance with the present invention commonly sharing the external memory and external memory interface circuitry in accordance with the present invention.

TABLE X

| EXTERNAL RAM LOGIC NAMES | |
|---|---|
| Inputs: | |
| $A_7$-$A_0$ | $A_7$ through $A_0$ are the address input lines. Eight low order address bits are clocked on low $\phi 1$ of state two. Two high order address bits, $A_0$, $A_1$, are clocked on low $\phi 1$ of state four. True data is input. |
| I/O | Data is clocked on low $\phi 1$ of state three. The I/O line is connected to the A line of the bit desired. True data is input |
| $\overline{\text{Chip Select}}$ | During low $\phi 1$ of state four, $\overline{\text{Chip Select}}$ is clocked. A low (logic "O") will select the 1k of memory desired. |
| Recall | Recall at a high (logic "1") will allow data to be recalled from a memory location without the contents being destroyed. Recall must be high during all states but state one. If recall is low during state one, the data clocked on the previous state three will be stored in the location specified by the previous state two and state four. |
| $\overline{\text{Synch}}$ | The internal RAM state counter is synchronized by the external state counter. A low signal during the external state one is input. |
| Output: | |
| I/O | Dats is output on the I/O pin during low $\phi 2$ of state four if the $\overline{\text{Chip Select}}$ is low during state four. The date output is inverted. |

Since the processor only accesses the memory during a fetch subcycle and not during the execute subcycle, it is possible to have a second CPU access the same memory while one CPU is executing. Such a circuit arrangement is illustrated in FIG. 45. The common external memory is shown at block 500. This memory, as illustrated in FIG. 1, includes a ROM and a RAM or serial access memory. The two CPU's are illustrated at 502 and 504, respectively. Preferably, the CPU's are each formed on a single chip. EAch CPU has separate external timing and latching circuits 506 and 508. FIG. 34 previously described, illustrates the external timing that may be used. The latches may be similar to those illustrated in FIG. 31. The two CPU's 502 and 504 share the common external time 514. This timer, for example, may be the same as that described in FIG. 35. The timer must be in synch with both CPU's to ensure that the CPU's are operating out of phase. This is accomplished by using interrupt inputs. Whenever one CPU is interrupted, such as, for example, by interrupting CPU 504 with an interrupt B signal 530, the interrupt signal will transfer the READY input A to the CPU 502 to a low value. This will cause CPU 502 to go into a "wait" mode of operation when the CPU reaches the end of a fetch subcycle. The WAIT mode of operation of the CPU has been previously described herein. When the CPU 502 is in a wait mode, gate 522 will provide a signal to the latch 526 that a wait state has been reached. The latch 526 is reset by the gate 522. The CPU 504 will be interrupted by the interrupt request signal B. This will provide a signal to the interface circuitry 512 (which is common to both of the CPU's 502 and 504) that an interrupt request is being acknowledged. When the CPU 504 recognizes interrupt, it will output an interrupt acknowledge signal. This output will be applied to gate 534 which will provide a signal to the latch 528 that the interrupt has been recognized and that CPU 502 may start operation again. When the signal is applied to the latch 528, the ready line on the CPU 502 will be set to a logic 1 and during the proper time, the CPU will start its execution cycle. The advantage in using the dual CPU's is the fact that a programmer can break his program into two sections so that they would be executed quickly and at the end of each, when both CPU's finish executing their sections, the program may be merged into a common result. Other advantages include the fact that two programs can be executed simultaneously using a common memory which may contain common data sections. It is understood, of course, that the RAM sections must be programmed so that the CPU's do not destroy each other's information

What I claim is:

1. In a calculating system which includes a central processor unit connected to a memory unit spaced from said processor, said memory unit being connected to said processor by a parallel bus system that sequentially transmits data between said processor unit and memory unit, circuit means for detecting an output current on said bus and for generating a voltage input signal for said bus, comprising:

a. first gating means connecting said memory unit with said bus for selectively generating a current on said bus corresponding to data which is to be transmitted from said memory unit to said processor;

b. a multi-phase clock system having first and second clock phases connected to said processor and memory unit for controlling transmittal of data therebetween;

c. means for sensing the current on said bus during said first clock phase;

d. a latch responsive to the output of said sensing means, said latch being enabled during said first phase and being set at the termination thereof to a selected state responsive to said output;

e. a logic gate for receiving the output of said latch, having a control terminal responsive to a second phase of said clock, said gate being operative to transfer said latch output during said second phase;

f. voltage generating means coupled to said gate and said bus for generating a voltage signal on said bus responsive to the output level of said logic gate; and g. second gating means responsive to said second phase for transferring said voltage signal to said processor.

2. Circuit means as set forth in claim 1 wherein said first and second gating means comprise insulated gate field-effect transistors respectively having gates for receiving said first and second clock signals.

3. A circuit as set forth in claim 2 wherein said means for sensing the current on said bus comprises a differential amplifier.

4. A circuit as set forth in claim 3 wherein said logic gate comprises a data selector having control terminals for receiving logic control signals and input terminals for receiving input data, high order address data, low order address data, and the output of said latch, said data selector operable to transfer one of said inputs to said voltage generating means responsive to said logic control signals during said second clock phase.

5. A circuit as set forth in claim 4 wherein said voltage generating means comprises an emitter follower transistor, having a base electrode for receiving the output of said data selector, an emitter electrode coupled to a first bias source, the emitter also being coupled to said bus, and a collector electrode connected to a second bias source.

6. In a computing system which includes a central processing unit in combination with a plurality of external memory units, wherein said processing unit includes, in spaced apart regions on a single chip, a parallel arithmetic logic unit in a first region, a random access memory unit in a second region, an instruction register in a third region, and a control circuitry in a fourth region, interconnected on said chip in a fifth region by a common parallel internal bus, logic circuitry for precharging said internal bus prior to entering data on said bus, and for selectively providing output signals corresponding to data stored on said bus, comprising in combination:

a. a first logic gate having an output terminal connected to said bus and first and second input terminals for receiving logic signals, the logic level of said output terminal selectively variable responsive to the logic level of signals at said input terminals;

b. first and second transfer gates connected to series coupling said bus to circuit ground, respectively having control electrodes, the juncture between said gates defining a node for receiving input data and for providing output data, said first transfer gate being connected to said first input terminal and said second transfer gate being connected to circuit ground, said first transfer gate having its control electrode connected to a first clock phase of a multi-phase clock system whereby responsive to said first clock phase, input data present at said node is transferred to said first terminal of said first logic gate;

c. a third transfer gate for coupling a first voltage source to said bus during said first phase of said clock system to charge said bus to a reference potential;

d. logic means coupled to said second input terminal of said first logic gate responsive to said first phase of said clock system and a first control signal for selectively discharging said bus system; and e. a second logic gate having an output connected to said control electrode of said second transfer gate, having a first input connected to said bus and a second input disposed for receiving a second control signal responsive to which said second transfer gate is selectively shunted to ground, thereby providing an output signal at said node corresponding to data stored on said bus.

7. Logic circuitry as set forth in claim 6 wherein said first and second transfer gates comprise series connected first and second insulated-gate-field-effect-transistors.

8. Logic circuitry as set forth in claim 7 wherein said third transfer gate comprises a third insulated-gate-field-effect-transistor having its source and drain connected between said first voltage source and said bus, having its gate electrode connected to said first phase.

9. Logic circuitry as set forth in claim 8 wherein said first transfer gate is further characterized by an insulated-gate-field-effect transistor having one electrode for receiving said input data, its other electrode connected to said first input terminal of said first logic gate, and having its gate electrode connected to said first phase of the clock, whereby during said first phase said input data is transferred to said first terminal of said first logic gate and stored there to control the logic level output of said first logic gate to correspond with the logic level of said input data.

10. Logic circuitry as set forth in claim 9 wherein said logic means comprises a logic NAND gate having its output connected to said second input terminal of said first logic gate having one input connected to said first clock phase and having a second input coupled to one electrode of a fourth insulated-gate-field effect-transistor, the other electrode of which is disposed for receiving said first control signal and the gate of which is connected to said first phase, whereby during said first phase one input of said NAND gate is a logic zero, producing an output to said first logic gate that is a logic one, thereby controlling the output thereof to a logic zero, said fourth transistor transferring said first control signal to the other terminal of said NAND gate during said first phase, said control signal being stored there such that at the termination of said first phase the inputs of said NAND gate are logic ones, producing a logic zero output and enabling said first logic gate to selectively discharge said bus depending upon the logic level of the signal present at the other input terminal of said first logic gate.

11. Logic circuitry as set forth in claim 10 wherein said first logic gate comprises a logic NOR gate.

12. Logic circuitry as set forth in claim 11 wherein said second logic gate comprises a logic NAND gate.

13. In a calculating system which includes, on a single chip, a central processing unit having an arithmetic logic unit, a random access memory unit, an instruction register, and control circuitry in spaced apart regions on said chip and interconnected by a common parallel bus system on said chip, means for precharging said bus system during a first phase of a multi-phase clock system and selectively discharging said bus system during an interval between said first phase and a subsequent second phase of said clock system responsive to enable signals generated by said control circuitry, comprising in combination:

a. first gating means for coupling a voltage source to said bus system during said first phase of said multiphase clock system to charge said bus to a reference potential;

b. a first logic gate having an output terminal connected to said bus, and having first and second input terminals for receiving logic signals, the logic level of said output terminal selectively variable responsive to the logic level of signals present at said input terminals;

c. second gating means connected to said first input terminal of said first logic gate for applying an input signal thereto corresponding to the desired logic level of said bus; and d. a second logic gate having an output connected to said second input terminal of said first logic gate, said second logic gate having a first input that is said first phase of said clock signal, and a second input that is a control signal for providing an enable signal to said first gating means for selectively discharging said bus.

14. A bus system precharge means as set forth in claim 13 wherein said first gating means comprises a first insulated-gate-field-effect-transistor having its source and drain connected between said bus system and said voltage source, and having its gate electrode disposed for receiving said first phase clock.

15. A bus system precharge means as set forth in claim 14 wherein said first logic gate comprises a logic NOR gate.

16. A bus system precharge means as set forth in claim 15 wherein said second gating means comprises a second insulated-gate-field-effect-transistor, having one electrode connected to one input to said NOR gate, its other electrode disposed for receiving said input signal, and its gate electrode connected to said first phase clock.

17. A bus system precharge means as set forth in claim 16 wherein said second logic gate comprises a logic NAND gate.

18. A bus system precharge means as set forth in claim 17 including a third insulated-gate-field-effect-transistor having one electrode connected to one input of said NAND gate, a second electrode disposed for receiving said control signal, and its gate electrode connected to said first phase clock.

19. In a data processing system wherein binary data is transmitted from a first data processing station to a second spaced data processing station over a common parallel bus system, responsive to first and second clock signals from a multiphase clock source, the combination comprising:

a. means connected to said first station for selectively generating currents on respective lines of said bus system responsive to said first clock signal, said currents corresponding to output data which is to be transmitted therefrom;

b. differential amplifier means coupled to said bus system for detecting said currents and providing output signals responsive thereto;

c. logic means responsive to said first clock signal for receiving said output signals and providing logic output signals corresponding thereto;

d. voltage generating means connected to said bus for generating voltages thereon; and e. gating means connecting said voltage generating means and said logic means, said gating means having a control electrode for receiving said second clock signal whereby responsive thereto said logic output signals are connected to said voltage generating means enabling transmission of voltage signals corresponding to said output data to said second processing station.

20. A data processing system as set forth in claim 19 wherein said voltage generating means comprises an emitter follower transistor, having its base connected to said logic means, its emitter connected to said bus, and its collector connected to a voltage source.

21. A data processing system as set forth in claim 20 wherein said current generating means comprise:

a. a logic gate having a first input for receiving said output data, a second input for receiving a control signal, and an output terminal the logic level of which is selectively variable to either a first or second logic level responsive to the signals at said inputs; and b. a transfer gate having a control electrode for varying the conduction state thereof, said control electrode connected to the output of said logic gate, said transfer gate electrically connected to said bus whereby responsive to said logic gate output being said first logic level, said transfer gate generates a current on said bus corresponding to a binary "1" and responsive to said logic gate output being said second logic level, said transfer gate is effective to inhibit current flow in said bus, lack of current corresponding to a binary zero.

22. A data processing system as set forth in claim 21 wherein said logic gate comprises a logic NAND gate.

23. A data processing system as set forth in claim 22 wherein said transfer gate comprises an insulated-gate-field-effect-transistor having its gate electrode connected to the output of said NAND gate, having one electrode connected to said bus and the other electrode connected to circuit ground.

* * * * *